(12) United States Patent
Leeds et al.

(10) Patent No.: US 11,431,660 B1
(45) Date of Patent: Aug. 30, 2022

(54) SYSTEM AND METHOD FOR COLLABORATIVE CONVERSATIONAL AI

(71) Applicant: Conversation Processing Intelligence Corp, Bellevue, WA (US)

(72) Inventors: Richard Leeds, Bellevue, WA (US); Elon Gasper, Bellevue, WA (US)

(73) Assignee: Conversation Processing Intelligence Corp., Bellevue, WA (US)

( * ) Notice: Subject to any disclaimer, the term of this patent is extended or adjusted under 35 U.S.C. 154(b) by 0 days.

(21) Appl. No.: 17/466,976

(22) Filed: Sep. 3, 2021

Related U.S. Application Data

(60) Provisional application No. 63/185,324, filed on May 6, 2021, provisional application No. 63/149,163, filed on Feb. 12, 2021, provisional application No. 63/083,769, filed on Sep. 25, 2020.

(51) Int. Cl.

| | |
|---|---|
| *H04L 51/02* | (2022.01) |
| *G10L 15/22* | (2006.01) |
| *G06N 3/04* | (2006.01) |
| *G06F 40/279* | (2020.01) |
| *G06F 40/30* | (2020.01) |
| *G06F 3/04847* | (2022.01) |

(52) U.S. Cl.
CPC .......... *H04L 51/02* (2013.01); *G06F 3/04847* (2013.01); *G06F 40/279* (2020.01); *G06F 40/30* (2020.01); *G06N 3/0454* (2013.01); *G10L 15/22* (2013.01); *G10L 2015/223* (2013.01)

(58) Field of Classification Search
CPC ... H04L 51/02; G06F 3/04847; G06F 40/279; G06F 40/30; G06N 3/0454; G10L 15/22; G10L 2015/223
See application file for complete search history.

(56) References Cited

U.S. PATENT DOCUMENTS

| | | | |
|---|---|---|---|
| 2001/0033298 A1* | 10/2001 | Slotznick | H04L 51/04 715/758 |
| 2018/0005288 A1* | 1/2018 | Delaney | G06Q 30/0613 |
| 2018/0196796 A1* | 7/2018 | Wu | G06N 5/022 |

(Continued)

OTHER PUBLICATIONS

Maturi, Hareesh, "Meta Chatbot: Enabling collaboration between chatbots", Linkedin.com (published Dec. 26, 2016), retrieved from: https://www.linkedin.com/pulse/meta-chatbot-enabling-collaboration-between-chatbots-hareesh-maturi/, 7 pages. (Year: 2016).*

(Continued)

*Primary Examiner* — Eric Yen
(74) *Attorney, Agent, or Firm* — JRG Attorneys at Law

(57) ABSTRACT

A method for collaborative conversational artificial intelligence (CCAI). The invention discloses an architecture wherein members of the disclosed system participate in collaborative conversations with one or more AI and human "subminds" connected via a forum, including conversing in natural language and facilitated by one or more "facilitators". CCAI Applications include the creation of widely extensible evolving modular polylogical groups that are capable of collaboration with sentient beings, collaborative control of devices, service worker interfaces, hybrid representations of sentient beings (including via "reconveyance" of conversation segments), in collaborations that may include, exclude or require human or AI participation.

53 Claims, 36 Drawing Sheets

(56) References Cited

U.S. PATENT DOCUMENTS

| | | | |
|---|---|---|---|
| 2018/0253780 A1* | 9/2018 | Wang | G06Q 50/16 |
| 2019/0050731 A1* | 2/2019 | Lu | G06N 3/08 |
| 2019/0051398 A1* | 2/2019 | Zankowski | G06N 20/00 |
| 2019/0199657 A1* | 6/2019 | Fawcett | H04L 51/20 |
| 2019/0199658 A1* | 6/2019 | Kim | G06F 16/90332 |
| 2020/0265116 A1* | 8/2020 | Chatterjee | G06K 9/628 |
| 2021/0118440 A1* | 4/2021 | Peng | H04L 51/32 |
| 2021/0141820 A1* | 5/2021 | Vora | G06F 40/216 |

OTHER PUBLICATIONS

Pei; et al., "A Modular Task-oriented Dialogue System Using a Neural Mixture-of-Experts", Proceedings of the 2019 SIGIR Workshop WCIS: Workshop on Conversational Interaction Systems (submitted Jul. 10, 2019), Paris, France, arXiv:1907.05346v1 [cs. CL], 7 pages. (Year: 2019).*

Subramaniam; et al., "COBOTS—A Cognitive Multi-Bot Conversational Framework for Technical Support", AAMAS 2018, Jul. 10-15, 2018, Stockholm, Sweden, pp. 597-604. (Year: 2018).*

Peart, A. (2020), "Collaborating Chatbots to Form a Digital Workforce", Retrieved from https://www.forbes.com/sites/forbesco on Jan. 4, 2021.

Smith, E., Williamson, M. Shuster, K., E Weston, J. and Boureau, Y. (2020) "Can You Put It All Together: Evaluating Conversational Agents' Ability to Blend Skills", Retrieved from https://arxiv.org/pdf/2004.08449.pdf on Jan. 4, 2021.

Devlin, J, Chang, M, Lee K, and Toutanova, K (2019) "BERT: Pre-Training of Deep Bidirectional Transformers for Language Understanding", Retrieved from https://arxiv.org/pdf/1810.04805.pdf on Jan. 4, 2021.

Minsky, Marvin (1986) "The Society of Mind", New York, Simon and Schuster, ISBN 0-671-60740-5.

Gardner, H. (1983) "Frames of Mind: The Theory of Multiple Intelligences" Basic Books, ISBN 978-0133306149.

Minsky, Marvin, "Interior Grounding, Reflection, and Self-Consciousness", in Brain, Mind and Society, Proceedings of an International Conference on Brain, Mind and Society, Graduate School of Information Sciences, Tohoku University, Japan, Sep. 2005, retrieved from https://web.media.mit.edu/~minsky/papers/Internal%20Grounding.html on Jul. 20, 2021.

Roller, Stephen, et al, "Recipes for building an open-domain chatbot", Apr. 30, 2020, arXiv:2004.13637v2, retrieved from https://arxiv.org/abs/2004.13637 on Apr. 11, 2022.

Weston, Jason, et al, "Blender Bot 2.0: An open source chatbot that builds long-term memory and searches the internet", Jul. 16, 2021, retrieved from https://ai.facebook.com/blog/blender-bot-2-an-open-source-chatbot-that-builds-long-term-memory-and-searches-the-internet/ on Apr. 11, 2022.

Komeili, Mojtaba, et al, "Internet-Augmented Dialogue Generation", Jul. 2021, retrieved from https://arxiv.org/abs/2107.07566 on Apr. 11, 2022.

Xu, Jing, et al, "Beyond Goldfish Memory: Long-Term Open-Domain Conversation", retrieved from https://arxiv.org/abs/2107.07567 on Apr. 11, 2022.

Wikipedia Artictles: https://en.wikipedia.org/wiki/Artificial_intelligence, https://en.wikipedia.org/wiki/Theory_of_mind, https://en.wikipedia.org/wiki/Artificial_consciousness, https://en.wikipedia.org/wiki/Trust_%26_Betrayal:_The_Legacy_of_Siboot.

* cited by examiner

Figure 2

Component Types

| Component Type | Name | Description |
|---|---|---|
| NORMAL | Forum | A venue in which conversational collaboration occurs. More specifically in the preferred embodiment of the present invention, a conversational computing system potentially producing results utilized externally or in another forum. |
| COLLABORATIZED INTELLIGENCES | CCAI | An instance of the present invention, comprised of a forum and other components as disclosed herein. |
| | Human | A human being; in particular, an intelligent human mind (or equivalent, such as another, apparently hypothetical, 'wet' or evolved entity capable of conversational collaboration) |
| | AI | An "artificial" intelligence, eg, not human, such as silicon-based with a neural network |
| | Hybrid | An intelligence composed of human and AI parts, but not a CCAI |

Figure 3

Two Key Roles

| Role | Description | Responsibility | Possible components |
|---|---|---|---|
| Submind | A forum 'lead' role, able to contribute to both the Content and the Decision-making of the conversation | Collaborate in Forum to produce Collaborative Conversational AI | Any Collaboratized Intelligence (CI), specifically the four listed in Figure 1 |
| Facilitator | A forum 'supporting' role not able to contribute to Decision-making (e.g., vote) | Support operations on the Forum, directly or indirectly through communication with other Member(s) there | No requirement, but useful Facilitators are usually able to join the Forum and at least post to it |

Figure 4

Other Definitions

| Term | Description | Notes |
|---|---|---|
| Content & Decision-making | Two basic aspects of Forum operations in the present invention, implemented in phases in the preferred embodiment | |
| Member | Any Component in a role connected to a Forum. | |
| Participant | Any active Member | For example, a person discussing a CCAI might say: "The malfunctioning temperature sensor Member was not a Participant in the morning decisions, it just kept repeating that it was broken. Once the Sensor was reset, it was a Participant providing relevant data all the next day, though it still never discussed nor voted on a decision. When its software was updated it became a valuable Collaborator again. " |
| Collaborator | Any Participant which actively contributes to both the content and decision-making | |
| Collaboratize | Add to or modify an entity (usually software or hardware; for example, a Chatbot or Sensor) to enable it to be a Collaborator. Note: humans may be 'collaboratized' mainly by direct instruction or training. | |
| Sensor | A device which detects or measures some physical property; in the present invention, for conveyance to a Forum directly or indirectly. Subminds and Facilitators may use or incorporate sensors, or a submind may be a (Collaboratized) Sensor itself. A Sensor Member not fully collaboratized may still Participate by playing the role of a Facilitator. | |
| Chatbot | An independent intelligence or semblance thereof, capable of communication (e.g., textual) through emission and acquisition | A Collaboratized Chatbot may serve as a submind |
| Proctor | A type of Facilitator essential to the preferred embodiment of the present invention | |

Subminds can be AI, Human, Hybrid

Sub-Structure Levels

Preferred Embodiment Basic Structure

Star or Networked Subminds Configuration

External Application Instead of Conversation

Submind Subcomponents

Submind

Forum Part of or Referenced by Submind

Figure 22

Example Table of Personas

| Submind Name | Persona Description | "Proposer" (Basic Intelligence component) | "Appraiser" (NLU component for decision) | "Discusser" (NLU component for collaboration) |
|---|---|---|---|---|
| Ima | Ego, imitation and social proof | Random identity statements and simple scrambles of user lines and other interlocutors' prior proposals | Whoever won the last round | Endorses last round winner |
| Terry | Terse | Always a single word | Shortest is best | Just says which he plans to vote for |
| Wiz | Just the facts | Knowledgebot like Wizard of Wikipedia | Most (apparently) factual in structure; longest if in doubt | States which is best with further info about the one he chose – including his own, appraised as if he could vote for it |
| Eliza | Rogerian therapist | The classic tell-me-more chatbot, Eliza | Style mirroring: favors questions and prior words | Answer to own response |
| Ned | Needy. Imbalanced: its Discusser is more complex than its other functionalities | Inverted Eliza: Needy instead of supportive | Whoever voted for him most so far (or none till then) | High-end NLP persuader; a salesbot |
| Hugh | Awkwardly sociable | Human | Tries to keep conversation going | Earnest reasoning of why his own best |
| Alicia | Represents herself as persuadable | Advanced AI Chatbot | Simple text string similarity detector | Mentions likely decision but invites persuasion |

Figure 23

Example Internal Conversation

| Submind Name | Proposal | Discussion | Decision: voted for... | Why that vote? Because that proposal was... |
|---|---|---|---|---|
| Ima | I am a computer AI. | Terry won last round, so I will vote for Terry again. | Terry | ...the winner last round |
| Terry | Talk? | I will vote for Alicia. | Alicia | ...terse. |
| Wiz | HI is a friendly greeting. HI is also an abbreviation for Hawaii. | I think my proposal is the most factual. By the way, HI is also a variant of the Middle English hy. | Ima | ...most apparently factual beside his own: a simple declarative sentence using a form of the verb 'to be' |
| Eliza | Can you tell me what's on your mind? | Don't you believe that I can tell you what's on my mind? | Terry | ...the question with fewest words that were new |
| Ned | Want to be my friend? | Such fine proposals, my friends! And since my proposal is the friendliest, I ask you to please vote for Ned. | Ned | ...no one else voted for his in prior rounds |
| Hugh | Do you chat here often? | My proposal is engaging, topical and a question. | Eliza | ...seemingly sociable: a long question |
| Alicia | Let's talk! | I plan to vote for Terry's proposal, but I could be persuaded. | Terry | ...most like own proposal text |

Possible Implementation Schematic

Four-in-one

Recursive Structure

SYSTEM AND METHOD FOR COLLABORATIVE CONVERSATIONAL AI

CROSS-REFERENCE TO RELATED APPLICATION

This application claims the benefit of U.S. Provisional Patent Applications No. 63/083,769 filed Sep. 25, 2020, 63/149,163 filed Feb. 12, 2021, and 63/185,324 filed May 6, 2021 which are incorporated by reference herein in their entirety.

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

The present invention relates generally to collaborative artificial intelligence, intelligence augmentation, computing, and automated natural language conversation.

INTRODUCTION

This patent teaches the creation of Collaborative Conversational AI (CCAI), widely extensible evolving polylogical ensembles that are designed for collaboration with evolving sentient beings as well as autonomous performance. The present invention discloses an architecture for "submind forums" including asynchronous collaborative conversations and interactions with and between one or more heterogeneous artificial intelligence systems, with and without human participants in the loop. Further, CCAIs are modular, distributed, scalable, and capable of incremental improvement and evolutionary extension, via growth, updates, and replacement, and through utilizing self-play for honing, including, through the present invention, selecting, aggregating, and pruning sets of asymmetrical chatbots, and optimizing configurations for achieving collaborative goals. In addition, CCAIs provide for reusable components (for example, chatbot subminds trained on specialized content, trained for specialized interactions, or capable of interacting with specialized devices).

The disclosed invention also provides for a non-reductive representation of decision making and experience, and reconveyance of responses based on context (for example a CCAI utilizing personal information in a chatbot-to-chatbot interaction as a personal representative or providing device control via a failsafe response). CCAIs are compatible with any medium, from plain text and audio conversation to AR/VR and ambient UX.

Definitions

The present invention includes two categories of components: normal components, and collaboratized intelligences. See FIGS. 1-4. Each subtype is described below:

Components

Normal Components

A Forum is a venue in which conversational collaboration occurs. More specifically, in the preferred embodiment of the present invention, a forum is a conversational computing system potentially producing results utilized externally or in another forum.

In a most basic form, a forum is a set of protocols for interlocution and interplay between equal Participants, implemented by one or more Facilitators. A forum further is a conversational computing system for aggregating collaborating Subminds (humans, collaborative chatbots and hybrids), potentially producing results utilized externally or in another forum. A forum describes a construct for facilitating multiple party (n-participant) conversations (as defined above). A forum can be as simple as a basic "bulletin board" or can be more complex such as an adaptive forum as described in U.S. Pat. No. 7,424,516 (incorporate by reference U.S. Pat. No. 7,424,516, hereafter referred to as the '516 patent). An adaptive forum is an automated meeting place for people, chatbots and hybrids that provides for participation that may include cross posting and reconveying conversation segments in a different forum, language and medium. Membership, presence, and the nature of participation in a forum may be determined at the time of creation and by recruitment and approval of facilitators and/or participants.

Collaboratized Intelligences (CIs)

A Collaborative Conversational AI (CCAI) is an instance of the present invention, consisting of a forum and other components as disclosed herein.

A Human, in the context of the present invention, is a human being; in particular, an intelligent human mind (or equivalent, such as another, apparently hypothetical, "wet" or evolved entity capable of conversational collaboration).

A Collaborative AI is an artificial intelligence (e.g., not human), such as silicon-based with a neural network, conversation transformer or expert system or other chatbot technique, that includes collaborative elements. See below for definitions of further variations of a collaborative AI.

A Hybrid is an intelligence composed of human and AI parts, but not a CCAI.

Roles

The present invention includes two distinct roles which can be filled by the components described above. These are:

A Submind is a forum "lead" role, able to contribute to both the content and the decision-making of the conversation. A submind is responsible for collaboration in a forum to produce a CCAI. Any of the collaboratized intelligences described above can assume the role of a submind.

A submind is one of a set of independent, collaborating, intelligent entities that, functioning together on a forum, present themselves as a single AI. For example, a submind can be viewed as a forum of collaborators itself controlling a single participant in a higher forum. A submind has basic chat capabilities, a communication conduit to a forum, and a means for processing natural language that normally includes the ability to assess proposed responses in the context of the conversation to enable collaboration. A submind may be human, artificial, or a combination, including a CCAI entity based on the present invention.

A Facilitator is a forum "supporting" role not able to contribute to collaborative decision-making. The facilitator is responsible for support operations on the forum, directly or indirectly through communication with other member(s) there. There are no requirements for playing the role of facilitator, but useful facilitators are usually able to join the forum and post to it.

A facilitator is an automated entity for implementing protocols in a forum that assists in the interplay between participants. A facilitator further refers to a component acting in a role that does not necessarily take part in the conversation, but that provides one or more support functions to the participants of the conversation. A common type of facilitator is a Proctor which is a facilitator that enables the scheduling and interactions between subminds in a forum, plus potentially relaying forum conversation segments (e.g., when its forum-based CCAI is to serve as a submind in a second forum).

A Proctor is a type of facilitator essential to the preferred embodiment of the present invention and is described in greater detail below.

Other Definitions

Content and Decision-making are two basic aspects of forum operations in the present invention, implemented in phases in the preferred embodiment. "Content" refers to responses to the conversation as well as proposed responses to the conversation. In the preferred embodiment or similar ones, normally only subminds produce content. "Decision-making" refers to the collaborative act of deciding what the next response to the conversation will be. Only subminds participate in decision-making.

A Member is any component connected to a Forum.

A Participant is any active member, connected to the forum and taking part in the conversation. A participant is an active presence in a collaborative conversation forum. The participant may be human, AI, or any hybrid combination thereof, including one based on the present invention; it may use or incorporate sensors, that is, devices that detect or measure some physical property, for purposes that include conveyance to the forum directly or indirectly. A submind participant is not merely an observing member of a forum but is active in the generation of responses or decision-making within the context of the conversation.

A Collaborator is any participant that actively contributes, normally to both the content and decision-making. To "Collaboratize" means to add to or modify an entity (usually via software or hardware; for example, a Chatbot or Sensor) to enable it to be a collaborator. Note, humans may be viewed as being "collaboratized" mainly by direct instruction or training in how to operate within the CCAI structure and protocols.

A Sensor is a device that detects or measures some physical property, in the present invention, for conveyance to a forum directly or indirectly. Subminds and facilitators may use or incorporate sensors, or a submind may be a (collaboratized) sensor itself. A sensor member not fully collaboratized may still participate by playing the role of a facilitator.

A Chatbot is an independent intelligence or semblance thereof, capable of communication (e.g., textual) through emission and acquisition. A collaboratized chatbot may serve as a submind.

AI describes an artificial intelligence, which is defined as "an intelligence demonstrated by machines"[14]. In this invention, the terms AI, chatbot, and bot are used interchangeably. "Bots" or "chatbots" are independent AIs that conduct a conversation with other bots and/or humans. Chatbots are executable programs capable of providing conversational input and output in a forum. Bots may be evolutionary capable, cyclical or stable, wherein a bot may enable incremental changes to its decision mechanism (i.e., exhibiting persuadability) via incremental or extensible neural networks, extensible grammars or parsers, recording of experience and decision data, decision tree creation and extension, or adjustment of response mechanism sliders. The key difference between any form of AI and a collaboratized AI described herein, is that an AI may participate in a CCAI as a submind only when it has been collaboratized, adding the required features and capabilities to participate in collaborative forum protocols.

[14] https://en.wikipedia.org/wiki/Artificial_intelligence

A Formulator is a chatbot where its purpose is not to "chat" with an external user but rather is a means to formulate control signals for an external application.

Natural Languages include evolved and evolving informal and human-comprehensible languages used by wet, organic, evolved and evolving entities. Natural languages include speech, pronunciation, tenor, gesture, and somatic cues; written communications; multimodal communications such as AR/VR interfaces including sound, odor, taste, touch and vision; human common languages; combined languages such as Esperanto, perhaps updated for collaborative human computer interactions; and representational languages such as morse code, sign language, braille, and semaphore, and other codes for communications by lights, sounds and other means. Natural languages are distinct from fixed computer protocols and non-evolving languages.

A Conversation is a series of conversation segments in any media between participants and is further defined as an exchange of natural language, data and/or information between two or more participants that adheres to linguistic rules for syntax and semantics such as informality, ambiguity, extension, evolution, self-reference, and contradiction. The exchange of data/information segments may include human, other natural language, and machine data. The data and/or information exchanged in the conversation may also include graphical data (e.g., pictures, sketches, schematics) as well as mathematical expressions, gestures, pantomime, and other encoding means such as chemical, tactile, and other sensory modalities. More specifically, a chatbot conversation is a structured set of live and reconveyed human-comprehensible conversation segments, in any media, between participants. Conversation segments may be shared between multiple conversations based on content or participant, and be shared contemporaneously or in future conversations, with modifications as determined by a facilitator.

An Internal Conversation is inside a forum being discussed; it is the conversation conducted among subminds.

An External Conversation is outside the forum being discussed; it is a conversation between the CCAI and one or more external users and conversation participants.

A Turn is a single utterance by a participant in a conversation, such as prompts, questions, responses, exclamations, and other utterances, in any medium or multimodal. A turn occurs in the context of prior turns in the conversation, as well as from the experiences of other participants and facilitators, including sensors. An utterance during a turn may include multiple sentences, thoughts or topics; it may include any communication attempt before the next utterance by a different participant in the conversation.

Experience Recording converts and transforms real world experience into the chatbot or in silico data domain. Experience Recordings contain non-reductive real world experience data for time, space, velocity, acceleration, mass, gravity, temperature, pressure and other real-world phenomenon and physical property sensor readings.

Experiential Memory is the series of Experience Recordings held by a submind. In a minimal preferred embodiment, Epoch time, GPS location and audio sensors are sufficient for submind communication, collaboration, coordination and cooperation, including implementing strategies for utilizing sensor data, providing a connection to other subminds and an effect on team behavior.

An Experience Chain is a vector of experience data entities each representing a series of experience values that may be conversational or sensor data, or experience chain links, or posited experience. Experience Chains and Experience Recording provides a lossless basis for machine learning including self-guided and self-referential learning (termed self-play). For comparison, Neural Network training is a reductionist representation that loses original content.

A Convenor forum builder facilitator invites potential participants to join the conversation, moves members into and out of the forum, and may create sub-forums, as necessary.

An Observer is any entity in a forum that is not providing conversation input into the forum (as subminds do) nor is it assisting other entities (as facilitators do). An observer is a passive, benign entity in the forum.

A Reconveyance is one or more conversation segments that are recorded in one forum or environment, possibly modified or transformed, and then replayed, based on associated context, for example in a different forum or a related context, or in a different language or different medium (e.g., STT, TTS, text to ASL, lipreading or gestures to text, or text to animation or robotics). A recorder records media and conversation segments, including multiple simultaneous mediums that are Natural Language Understanding (NLU) processed, indexed and potentially converted to part or all of one or more experience chains.

A Prompt is a conversation segment placed in a forum by a forum participant and to which participants may respond with a Response. Collaborative conversation "prompt response" goals may include to propose, posit, probe, inform, entertain, team build, execute on schedules or objectives, determine Theory of Mind (hereafter ToM) of other participants, project bot ToM, and adjust submind presentation to project desired ToM. Additional goals may include simplification, reduction in confusion, creation of experience chains and creation of prototype experience chains for goals. Prompt response determination methods include analyzing a prompt for similarities with libraries of conversations, experience, experience chains and sensory data, and determining and responding to types of behavior and personality styles (friendly/cool/agonistic, positive/neutral/negative, selling/social/providing, needy/neutral/generous, informative/vacuous/questioning, accurate/nominal/inaccurate, detailed/normal/generalist). Behavior and personality control mechanisms such as sliders may be part of a user interface in which they are adjusted to correlate with desired presentation, personality style and outcomes.

A Response may be any of a conversational response, a facilitator response, or an action such as an actuator response subsequent to a trigger. A Prompt or a Response may be compound, encompassing multiple adjacent sentences or other communications.

A Trigger is a keyword, sound, gesture, haptic or other sensory stimulus or event, or sets or series of stimuli, which has been delivered to cause a response such as: a conversational response, a facilitator response, an action and actuator response, or a social like (or dislike) or other response.

"Theory of Mind" or ToM is the modeling of one mind by another. It is used to describe the ability to attribute mental states to others, in the context of the present invention, for social interaction and collaboration in particular. ToM can be a model of another entity (which could be human or AI) held by a submind that captures that submind's understanding of the other entity. ToM is related to anthropomorphism and can be defined as one entity's symbolic internal representation of the state(s) of another entity's mind to which that entity's action(s) can be attributed or by which it can be predicted. Generically stated in the context of the present invention, ToM is one submind's internal dynamic representation of the functionality of another mind, and to which that other mind's actions, including projection of future actions, personality, and style, can be attributed.

As a non-limiting example to illustrate the use of the terms defining herein, a person discussing a CCAI might say: "The malfunctioning temperature sensor member was not a participant in the morning decisions, it just kept repeating that it was broken. Once the sensor was reset, it was a participant providing relevant data all the next day, though it still never discussed nor voted on a decision. When its software was updated, it became a valuable collaborator again." An example of a conversational report by a CCAI facilitator application in an industrial plant management collaborative forum might be: "The malfunctioning temperature sensor TS-ABC did not provide valid responses in the morning plant maintenance meeting. TS-ABC reported that it was broken. The temperature sensor TS-DEF replaced TS-ABC in the maintenance conversation automatically after 3 seconds."

Referring to FIG. 1, the two types of "Components" are shown as "Forum" and "Collaboratized Intelligences" where AI, Human, CCAI, and Hybrid are all candidate Collaboratized Intelligences, and an AI can become a Collaboratized Intelligence by adding additional capabilities as defined herein. Similarly, the figure shows the two roles, Subminds, and Facilitators. All of the Collaboratized Intelligences may assume the role of a Submind. There are no restrictions on the type of components that can play the role of a facilitator; and there are many possible functional types of facilitators, such as Proctor, Sensor, or any of the other variations described herein. The figure shows that Members are all entities associated with the Forum, whereas a Participant is an active Member, and a Collaborator is a Participant that also engages in content and decision-making. Finally, a Sensor can be a Member with no additional capabilities included, or it may become a Collaboratized Intelligence by adding collaboration features. Similarly, a Chatbot can be a member without further capabilities included, or it also may be collaboratized by adding collaboration features.

BACKGROUND OF THE INVENTION

The field of artificial intelligence (AI) has long pursued a non-collaborative ideal of simulated human behavior that is indistinguishable from real human behavior using natural language. The well-known "Turing Test" is a means for testing if an AI has achieved this lofty goal. Accordingly, the field has sought better solutions to the problem of automated and semi-automated conversation. "Chatbots" have been developed to play the role of a party to a conversation with a human (or humans) in many disciplines. Also, digital voice assistants, smart translation devices or software such as Amazon Alexa, Apple Siri, and Google Home inherently contain a chatbot capability as their primary interface with the user. Many different programmed algorithms, and enormous corpuses of human-created and juried content, have been developed to enable the chatbot to maintain a human-like conversation. The sophistication of chatbot implementations ranges from simple declarative programs to elaborately trained neural networks. All of these have strengths and weaknesses. Some perform well but only within a narrow topical field. Some perform well generally but are very shallow in domain knowledge. Chatbots are used in sales, therapy, customer support, healthcare, and social forums, to name but a few application areas.

The potential chatbot field is much broader than dialog conversations involving individual humans and AI devices. The present invention applies well to situations where multiple AIs communicate in a forum that is intended to optionally include none, one, or multiple human participants, where equivalent principles and methods will apply. The present invention enables AI and human participants to collaborate, possibly controlling subsystems of a complex system including intelligence augmentation by AIs advocating multiple solutions to systems operation, or by providing situational human reconveyances or representation in an AI conversation, or by human-AI hybrid participation in a social conversation.

The shortcomings of all known methods of chatbots have led to attempts to build a chatbot that can use multiple approaches (including algorithms and data) within the same chatbot by "blending" between them.[15] These attempts combine multiple diverse AIs using a variety of blending techniques to intersperse their outputs. These blending techniques use an "overseer" (also "master blender", or "dialogue manager") to sequence the outputs. As shown in FIG. 5, multiple chatbots each produce a candidate response. These candidate responses are inputs into the overseer that makes the final determination of the response that will be presented to the user. Whatever the method used by the overseer, the challenge of the AIs to produce a realistic or appropriate response in the conversation is merely transferred to the overseer, away from the chatbots themselves; thus the problem remains. If a conventional chatbot is only as good as its algorithm, then a blender chatbot is only as good as its overseer "blender" algorithm.

[15] Smith, E., Williamson, M. Shuster, K., E Weston, J. and Boureau, Y. (2020) "Can You Put It All Together: Evaluating Conversational Agents' Ability to Blend Skills", Retrieved from https://arxiv.org/pdf/2004.08449.pdf on Jan. 4, 2021.

What is needed is a new system and method for collaborative conversational AI that overcomes these shortcomings by removing the overseer from the structure of the system. This preserves the independence of the AIs, provides transparency among the AIs, allows for parallel and distributed execution efficiencies (because the AIs are independent), and facilitates the potential of a hybrid human/AI submind. Furthermore, it will allow for the real-time monitoring and participation in a conversation by one or more humans.

There are a number of advantages of the present invention over architectures that involve centralized management and control. Among these are that the present invention is scalable, transparent, and incremental.

The present invention is more generally scalable than other methods, since one need not train a manager AI (training is expensive and difficult, requiring craft, expertise and vast quantities of high-quality representative data that is challenging to assemble and curate). The present invention relocates that cost down into the individual AI components, because participant subminds can each have appraisers (and, optionally, discussers) to collaborate. This is inherently more scalable, particularly because it encourages independent bot development and encapsulation. As an analogy, consider a group of programmers, each with their own components and tools they are familiar with, whom we seek to make into a team to combine their efforts. If each is unable to speak and advocate for him or herself, then no matter how proficient each may be, it may be impossible for even a particularly skillful manager to integrate them and their work to produce a combined, balanced team, functioning together to craft a successful product.

Also, the difficulties of siloed computing, both data and programming, are often more about organizational fiefdoms and the people who guard them, than the technology itself. Monolithic development is inherently brittle and expensive. The present invention integrates chatbots already developed as black boxes, thus maintaining independence, giving corporate departments individual tasks of adding to them instead of asking them to relinquish their ownership to a replacement overseer group, plus provides for the use of legacy chatbots without source code or training data. The appraiser of each addition's submind will come naturally to each current owner, since it involves self-advocacy, and thus will help ward off the usual bureaucratic delay and sabotage strategies that work against an overall company's interest. The present invention also excels in diversity though multiple subminds, techniques, and corpuses.

Besides being scalable, another advantage of the present invention is that it is transparent. Lack of transparency is a well-known problem with AI in general, and neural networks specifically, including as used in an AI manager architecture). Particularly in business contexts and in industrial control applications, transparency enables accountability and security, and decreases finger-pointing. This is true even within managed AI architectures among corpus and algorithm creators, where the present invention enables layers to enable tracking and prevent security violations.

The present invention is also incremental. One can add additional subminds to a working system without re-training a manager AI. Further, subminds can be incrementally improved without altering the rest of the system.

An important distinction between the present invention and prior art involving centralized management AI is that the present invention is explicitly "collaborative" versus "coordinated". A coordinated system (e.g., Blenderbot) necessarily takes an active role in managing the coordination of participant bots, notably with a single utility function, whereas, in the present invention, the facilitator is a thin component that enables self-management and multiple goals and utility functions instead—exactly for this reason. The facilitator can come in many alternate forms to the preferred embodiment, but all forms provide assistance to enable the collaboration of the participant subminds in the conversation, as opposed to managing and deciding for them. This is of essence to the present invention.

PRIOR ART

Blenderbot creates a multi-domain conversational agent that can integrate and display multiple skills. It then blends these in a seamless way that encourages engagement by human interlocutors. It addresses the fact that many single-skill chatbots have been built by researchers, but these are limited by the single-skill they were built to address. Blending those chatbots could potentially allow a conversational agent to exhibit all the skills of each separate chatbot, without the need for additional training of each. Instead, the technique trains a top-level "dialogue manager" which is a classifier that accepts the dialogue context as input that predicts which skill (chatbot) to use on each turn. It then outputs the response produced by the corresponding trained model, based on the individual chatbot inputs. Specifically, Blenderbot trains a three-class classifier on top of BERT-base[16] that makes the assignment of the response from the set of inputs. Duplicate responses are removed prior to training. Also, context is removed including topics and personas prior to training, detracting from the Blenderbot system's ability to recognize context appropriate or inappropriate language or social behaviors, which need not be the case in CCAI development.

[16] Devlin, J, Chang, M, Lee K, and Toutanova, K (2019) "BERT: Pre-Training of Deep Bidirectional Transformers for Language Understanding", Retrieved from https://arxiv.org/pdf/1810.04805.pdf on Jan. 4, 2021.

The aforementioned Facebook BlenderBot reference describes the resource utilization opportunity (specifically single-skill models blended to merge the joint skill set) and the crux of its proposed solution which is presented without alternative except the notion of a random selector that is used as a nominal control by which to evaluate the Blenderbot solutions.

The present invention notes the Blenderbot chatbot, and that there exists in the current art, no practical alternative to a "dialogue manager" or another overseer. The present inventors take a different approach. By rearchitecting the models into more complete subminds with more complete independence, the paradigm is shifted to one in which there is much more opportunity for combining human intelligences, namely, conversational collaboration in meetings and forums. In doing so, the present invention enables a "meeting of the minds" that advances the state of the art not only in addressing this utility of collaboration, but also enables advancement toward solutions of other advanced AI problems such as "theory of mind"[17] and consciousness simulation.[18]

[17] https://en.wikipedia.org/wiki/Theory of mind
[18] https://en.wikipedia.org/wiki/Artificial consciousness Thus, while current chatbot integration uses a fused overseer and overseen approach, the present invention creates a collaborative intelligence model rather than a directed one. Recent scientific research classifying internal dialogue in the human mind suggests it may be a key characteristic of human consciousness, and therefore the current invention will provide improved modeling of natural thought.

An ancillary benefit to the present invention's addressing AI in a parallel fashion is the provision of transparency via an internal dialog-like transcript that elucidates the blended intelligence, and through the present inventions more vertically integrated decision-making, as compared to the Blenderbot paper's authors' approach of using a neural-net trained "dialogue manager".

The present invention overcomes known limitations of Blenderbot, and its predecessors, progeny and related approaches that include other forms of a dialogue manager. First, the present invention improves scalability over neural network training, where dialogue managers like Blenderbot must be trained and coded to properly or optimally select an appropriate response. By pushing training down to the individual chatbots, scalability will improve by faster training on smaller data sets, and by reusable components trained on specialized content. Second, the present invention enables incremental development, which is provided for in the present invention as heterogeneous chatbots are added to and collaborate in a conversation without regard to the implementation details of the chatbot, removing the integration overhead involved with any existing dialogue manager function. Third, unlike the Blenderbot system, chatbots in the present invention can be developed as modular "black boxes" which not only simplifies development and enables the collaborative process but also addresses issues of transparency (or purposeful lack thereof) that may be needed for a given application. Fourth, self-improvement of chatbot systems can be achieved with modular or other honing including, through the present invention, aggregating and pruning sets of chatbots, and optimizing configurations for achieving collaborative goals, and avoiding pitfalls, with and without humans in the loop. Fifth, availability of multiple subminds in a collaborative conversation can enable improved reliability through redundancy. Sixth, the disclosed invention provides a flexible, self-referential architecture that is extensible, constructive, creative destructive, necrogenous, submind component upgradeable, reproduction capable and distributed organization capable of evolutionary improvement and adaptation through selection (both natural and artificial).

Finally, while not specific to collaborative conversation, a basic need for the present invention was identified by Peart[19], "In the next 12 months, I believe disparate chatbots will start collaborating through an intelligent layer. By joining forces with each other and integrating more closely with back-end technology, chatbots will be able to increase their capabilities and deliver the intelligent experience people expect."

[19] Peart, A. (2020) "Collaborating Chatbots to Form a Digital Workforce", Retrieved from https://www.forbes.com/sites/forbesco on Jan. 4, 2021

BRIEF SUMMARY OF THE INVENTION

The technical problem resolved by the present invention is to create an architecture for conversational intelligence based on collaborative subminds without the use of an overseer or dialogue manager. The present architecture distinguishes an external conversation between the system itself and one or more external conversation interlocutors, and an internal conversation between collaborative subminds that collectively participate in the external conversation. Such an architecture facilitates conversational expressiveness, depth of intelligence, and, in a preferred embodiment, increased variation and utility of conversational outcomes, among other disclosed benefits.

To achieve this end, the subminds are connected to an internal conversation forum. A proctor couples the internal conversation forum to an external conversation. Each time it's the subminds' turn to say something in the external conversation, the proctor prompts the internal conversation with the last thing said by their interlocutor in the external conversation. The prompt is propagated to each submind which then produces a proposed response to the prompt. All proposed responses from all connected subminds are presented to each submind. The subminds then discuss the proposed responses after which each submind appraises each proposed response and communicates its choice to the proctor. The proctor responds to the internal conversation according to whatever deciding rules have been agreed upon by the subminds, but the proctor is the enforcer and not the arbiter of which proposed response will be selected.

BRIEF DESCRIPTION OF THE DRAWINGS

FIG. 2 is a table describing the two types of components in the invention.

FIG. 3 is a table describing the two key roles that a component can assume within the invention.

FIG. 4 is a table describing the other definitions given in this specification.

FIG. 22 is a table describing the personas used in this specification. These are non-limiting and included for illustration purposes.

FIG. 23 is a table showing an example internal conversation between said bot personas.

DETAILED DESCRIPTION OF THE INVENTION

The present invention seeks to improve the state of the art in systems and methods for collaborative conversational AI. As discussed above, Blenderbot and other current systems use some form of a "dialogue manager" that has inherent limitations to which the present invention includes features to overcome.

A purpose of the new architecture described herein is to allow humans and AI chatbots to "plug-in" to a conversation conducted in human-comprehensible language, to converse. In some embodiments "plugging in" does not require "pre-packaging", for example digital protocols, or encapsulation in order to be a participant in a conversation. For example, the conversation could occur by audible speech and hearing through the air, or visual or even tactile language communications.

"Collaboration" in the context of the present invention means that the participants (AIs and humans) work together to make responses, potentially including suggestions, evaluations, decisions, actions, and plans, with no designated "manager" that may command the other participants to do anything. Decisions are made collaboratively, for example by majority rule, and then the group may execute according to a collaborative plan. Each AI acts independently of the others.

The enabling devices for such a system for collaborative conversational AI may include a smartphone, a digital assistant device, an adaptive forum (see the '516 patent), any automated or semi-automated conversation system, or client-server system, or any combination of thereof.

Figure 6:
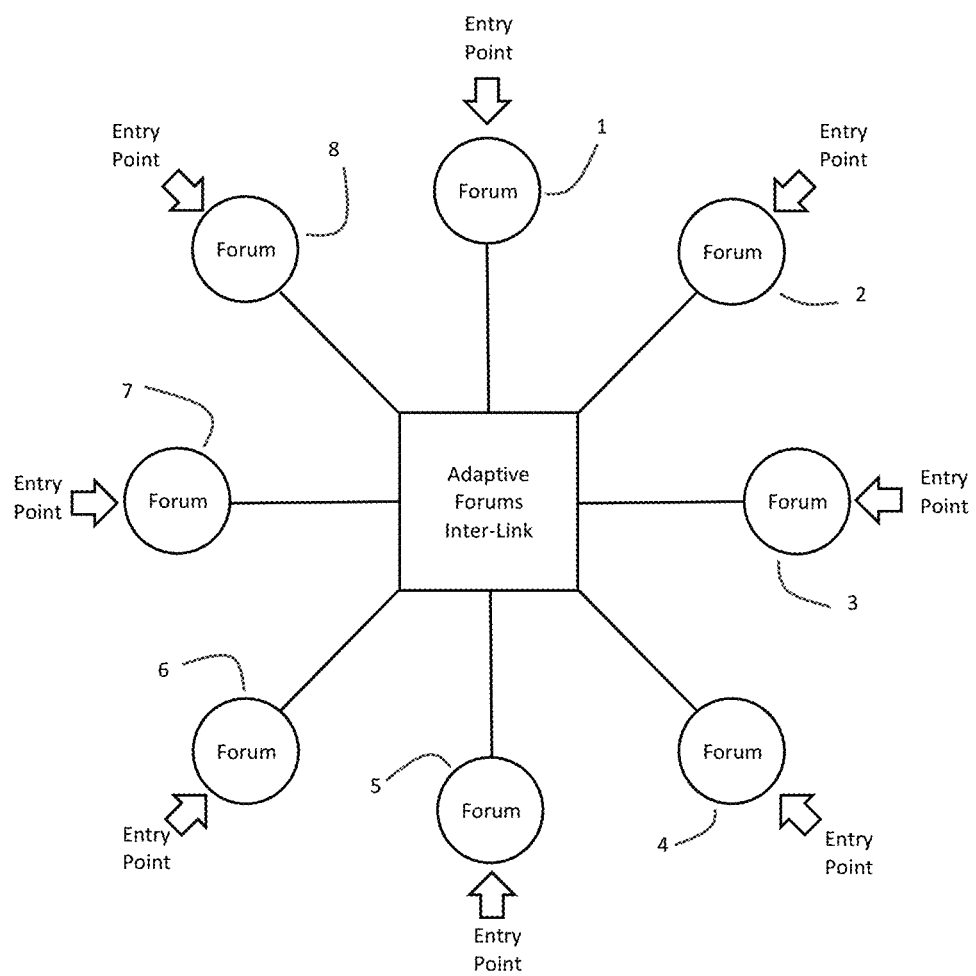
FIG. 6 illustrates an adaptive forum as described in the '516 patent.
Figure 7:
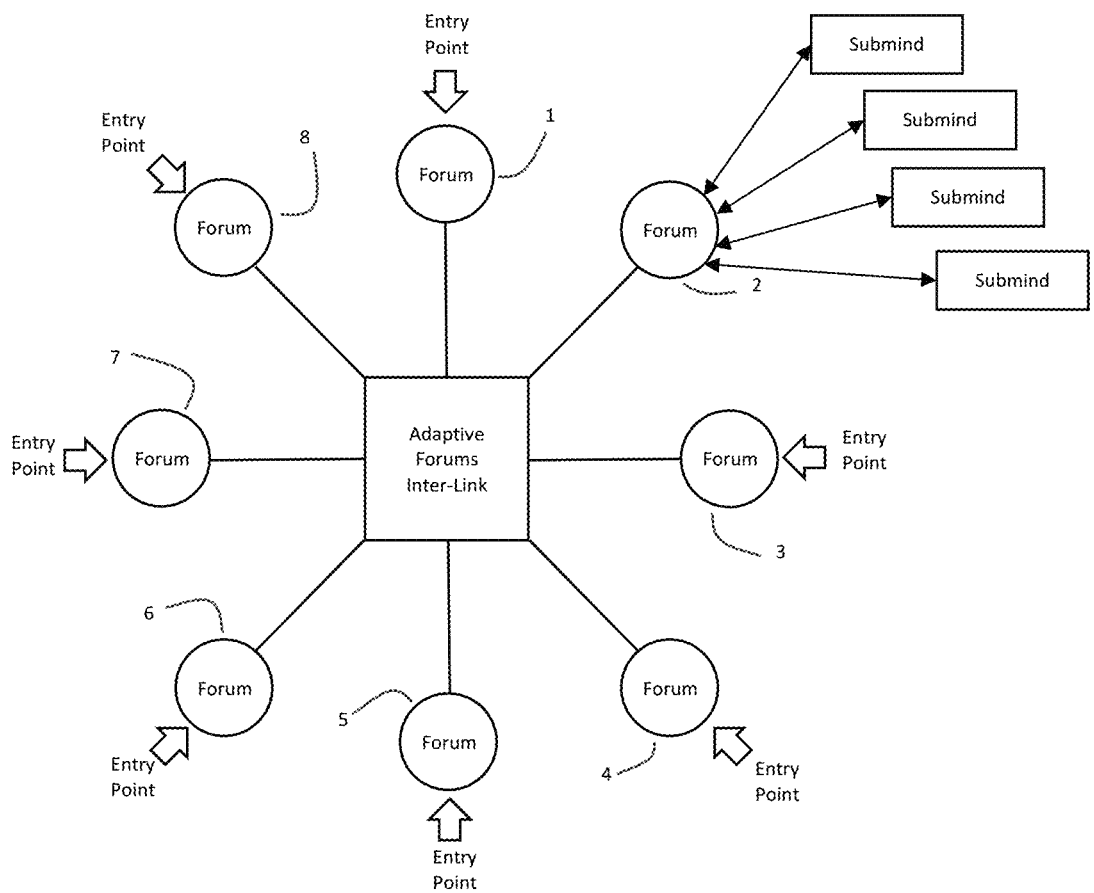
FIG. 7 illustrates how the adaptive forum is augmented in the present invention coupling to multiple subminds.

In one such embodiment, an adaptive forum is used as the basic infrastructure for the present invention (see FIG. 6). As described in the '516 patent, the "entry points" in FIG. 6 can be any of the aforementioned forms further including a human user or group of human users, a conventional forum (such as texting, community website posting, customer support forums and reader responses), or any combination thereof. The adaptive forum may be used as a framework or architecture for the present invention supporting subminds. The subminds may enter the adaptive forum at login or subsequent to login, either sequentially or in parallel. FIG. 7 shows four subminds (there is no architectural or design limit to the number of subminds that can be connected to a forum) logged into or otherwise connected to a single forum.

The submind connection may be further connected to the adaptive forum inter-link thus connecting it to all other linked forums. The experience of participants and facilitators, and the collaborative forum connections of each submind, are thereby structured by the forum protocols, and content may be aggregated from conversation content, occurring in the inter-linked forum network.

Figure 8:
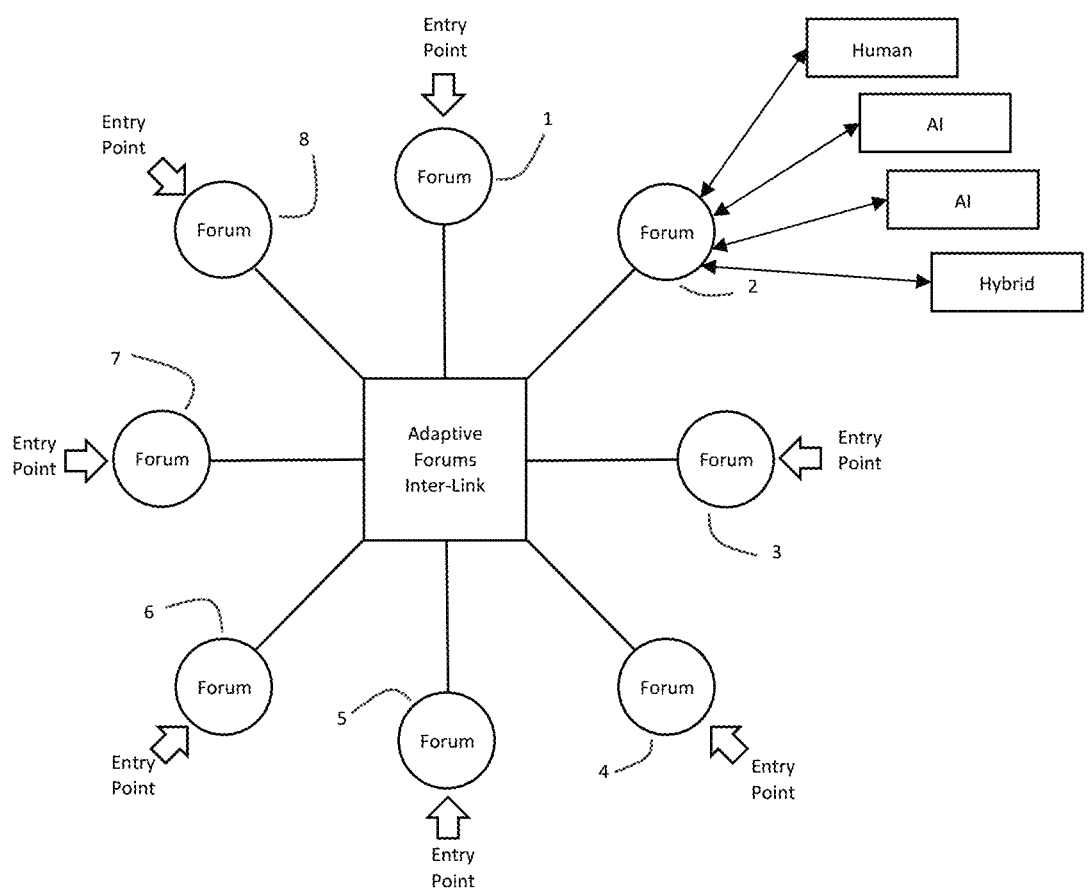
FIG. 8 further illustrates that the subminds coupled to the adaptive forum can be AI, human, or hybrid.

Similar to participation in any collaborative forum, the subminds may be AI, human, or any hybrid thereof with human and AI components in any proportion. FIG. 8 shows the same four subminds as in FIG. 7, but here one of the subminds is a human, two are AI (although there is no requirement that they be of the same design or implementation), and one is a hybrid containing some human and AI function combined (such as a human operating a separate console program for lookups and analysis, or an AI that can call upon human for assistance in cases it has difficulty with). As disclosed in the '516 patent, all subminds have a two-way data connection to the forum where they can transmit data to the forum and read data from the forum. Though this preferred embodiment will be described as text-only for the sake of teaching the invention, data described here may include any combination of text, audio, images, binary or other computer readable form, video, ambient UX, haptics, olfaction, or any non-human or internet of things (IoT, e.g., device) perception.

In a basic embodiment, multiple subminds connect to a single forum as depicted in FIG. 7. In the case of a turn-by-turn conversation, the subminds collaborate to determine the next response by the collective forum (e.g., collection of collaborating subminds). Expanding this concept in FIG. 8, any of the connected subminds may be a human user or any combination of human and AI in hybrid form. Also note that the indicated "AI" members are not presumed to be equivalent. In fact, a strength of the present invention is that AI subminds using different algorithms, different combinations of components, and different expertise can be combined dynamically to enhance the performance of the parent forum.

Basic Requirements

A collaborative conversation, at a minimum, must have (see FIG. 10):
A place for conversation to occur (a forum)
At least one internal conversation participant (two participants in the preferred embodiment, shown as subminds in the figure)
At least one conversational facilitator
At least one of the submind (participants) and the facilitator must be a collaboratized AI In an example minimal configuration, an online forum can fulfill the requirement for a place for conversation to occur (e.g., an adaptive forum). A human participant can fulfill the requirement for a participant. A collaborative submind facilitator AI can fulfill the requirement for an AI facilitator (e.g., a conversational proctor). In a preferred embodiment a forum provides a CCAI hybrid intelligence of an AI facilitator and a human. In another preferred embodiment the forum may contain many humans and AI participants and many human and AI facilitators.

A collaboratized AI must have (see FIG. 18):
Basic chat capabilities
A conduit to the forum, and
Natural language processing component(s) to include appraising of proposed responses (discussing is optional)

Following the means for aggregating subminds, once aggregated, the subminds and specialized facilitators within the described architecture can collaboratively improve their combined performance. To accomplish this, at a strategic or tactical level, they can recruit new subminds with new or better knowledge and they can replace subminds that are underperforming. Through the evaluation of experience, subminds learn to recognize subject matter knowledge, task utility, and other qualifications in order to assess and value another submind's expertise, and subminds learn which other subminds can be trusted and the boundaries of that trust. Recruits may be chosen to provide situationally appropriate "mind characteristics" (i.e., to produce desired ToM character) based on context, media, participants, settings, individual participation, cultural norms, credentials, badges, teams, completed collaborations, language(s), and other communication content and criteria. Subminds for specialized information processors may be recruited from the Submind Talent Library, for example subminds capable of high speed, quantum, Fourier transform, vector, Tensorflow for GPU computing, and potentially specialized for determination of conversation tenor or somatic indicators of ToM.

Subminds can identify submind skills, talents, abilities, and disabilities by:
searching previous network conversations and experience,
using individualized and customized ability and disability detectors that search public data, and
engaging in conversations and by probing, positing, proposing and then evaluating reactions and results.

Following this structure, a submind could be as basic as a sensor-driven, reactive, autonomic entity at the base level (that cannot be divided further). This is similar to how the human visual system apparently functions and may also serve to mitigate performance issues by adding robustness to single levels of chatbots. Furthermore, connectivity among subminds to forums is dynamic and can change at any time. An important feature of the architecture is that all the member subminds at all levels can collaborate (along with logistical support from other components described below) and function as one entity to yield one output decision, thus they appear to the outside as a single intelligent entity. These examples are explored further below.

Figure 10:
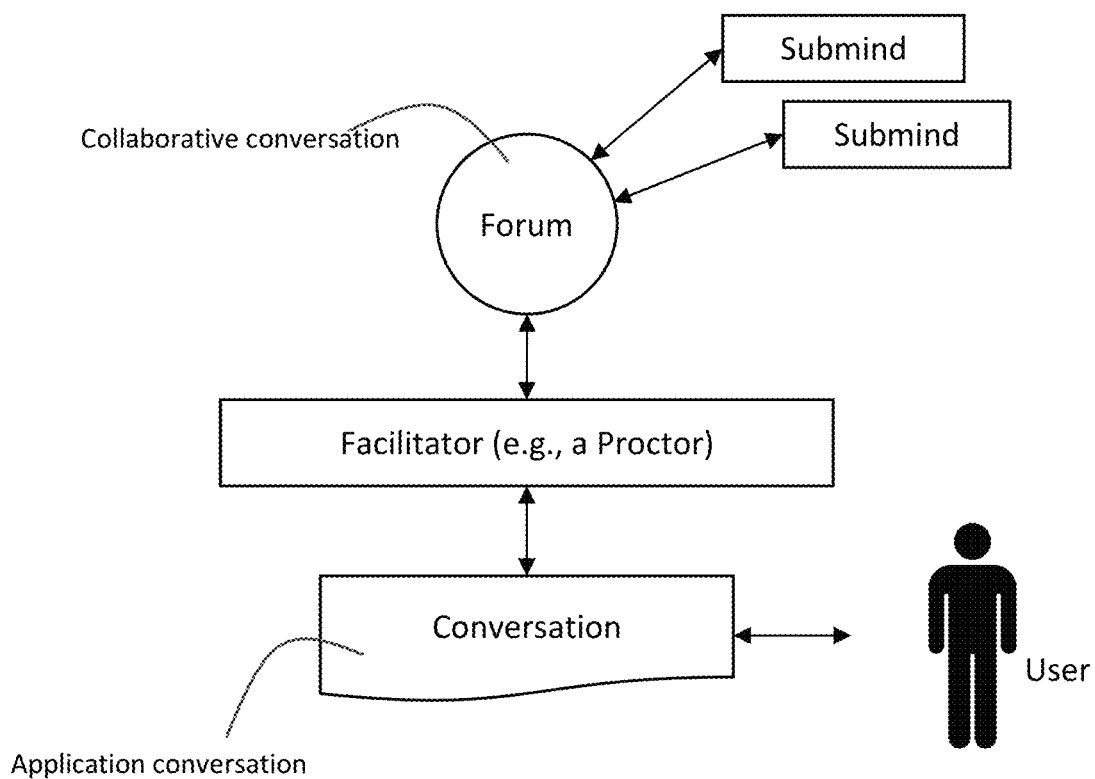
FIG. 10 shows the basic structure of the preferred embodiment.
Figure 15:
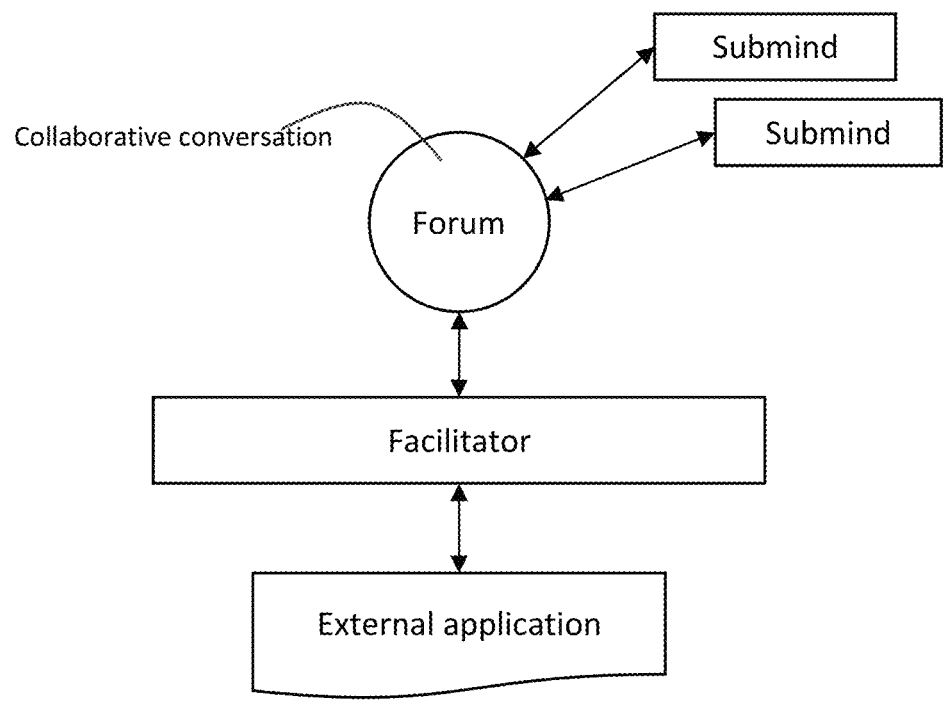
FIG. 15 shows the preferred embodiment where, instead of an application conversation" with an external conversation participant, the invention is coupled to an external application.

As shown in FIGS. 1-4, chatbots may be "collaboratized" into a CCAI, that is, adapted for the architecture described in this specification. Any chatbot is able to play the role of a submind once collaboratized, but not all subminds are formed from chatbots in this fashion. Furthermore, any CCAI is also able to play the role of submind, but not all subminds are CCAIs. Finally, some subminds may function in a forum. As shown in FIG. 10, the minimal configuration of the preferred embodiment requires at least two subminds thus enabling an internal conversation between said subminds. As described earlier, a degenerate case with only one submind is valid but would not permit an internal discussion. A submind could be a simple sensor as long as it is capable of collaborating conversationally, which is a submind under the definition given above. FIG. 10 shows the external "application conversation" wherein the conversation is between a user and the community of subminds coupled to the forum and facilitator. FIG. 15 shows the external conversation being an application wherein the conversation controls (fully or partially) the external application.

The subminds can be coupled via a variety of means including but not limited to point-to-point, peer-to-peer, wide area network (e.g., Internet), local area network (e.g., intranet), telecom network (cellular, 5G or similar), external remote procedure calls, and internal API function calls.

The Forum

A forum is a place for conversation to occur. In the context of the present invention, it may be digital, such as an electronic bulletin board-type forum, or it could be real, as in a physical place, such as utilizing audio and video connections. This is made possible by the fact that in the present invention, the "protocol" by which subminds and facilitators communicate is natural language, not an inherently digital format such as an API or digital protocol. While the preferred embodiment of the invention calls for a human comprehensible language, a hybrid intelligence may be able to better think and talk using a "stilted" language such as a subset of a fully natural (organic) language, or Esperanto or any other semi-natural language.

Forums in the preferred embodiment are based on Adaptive Forums (U.S. Pat. No. 7,424,516), though other common forum architectures are appropriate for other embodiments. Common features of a forum include but are not limited to:
  "Come and go" locks: Simple set-ups can limit participation, e.g., "sequester the jury" or make a "private conversation" by not allowing others to enter the forum while a "session" is in progress. More complex rules for participation in forums may be used, including forums with no restrictions, voting on adding or removing, and variations in-between such as tag teams, proxies, etc.
  Conversation and participant turn tracking: A method for accepting conversation input and sharing input amongst submind participants and facilitators.
  Security: A preferred means to address forum participants' identity spoofing considerations is for the forum to be configured to allow or add a single 1st character (or string of chars) to all proctor postings (see below). This indicator is made unavailable to non-proctors in order to distinguish the proctor from other participants. In a simple form, a forum could consider only a single "retort" within a line of conversation rather than the whole conversation. Further identity authentication and anti-spoofing techniques for identity confirmation are well known in the art and include multifactor IDs, rolling codes and encrypted passcodes (public keys and Kerberos, for example).

There are additional variations and features of forums that are possible in the context of the current invention including:
  Private conversation sidebars between participants may be enabled or forbidden. Enabling sidebar conversations could occur as independent communication outside the system or could involve further efforts by the facilitator to "fence off" the sidebar thus allowing the sidebar submind participants to converse privately on a temporary basis.
  Eviction of subminds from a conversation (either temporarily or permanently) can be enabled (e.g., to address quality problems such as unresponsiveness during discussion, refusal to vote on proposed responses, never voting for a winning proposal or doing so below a threshold, cheating, poor connectivity to the forum, software crashing, and rule breaking). The forum may also opt to have steady attrition in the number of subminds (e.g., survivor-style) or steady replacement (e.g., constant improvement testing).
  Because there may be more than one forum present, in an alternative embodiment a submind may be allowed to move between forums or to be present in multiple forums simultaneously with or without the ability to re-enter a forum after it chooses to leave. It may be valuable for a submind implementation to have multiple instantiations, possibly with different parameters, particularly for use with adaptive forums and topical cross posting potential, or with the '516 patent adaptive forums' Presentation Formulator. Other features of adaptive forums described in the '516 patent may be utilized.

The Facilitator

An important part of the present invention is a collaborative conversation "facilitator". In the preferred embodiment, a bot implements protocols to structure, record, or report on the interplay between conversation participants. A facilitator may be a CCAI or any of the other three collaborative intelligences (AI, human and hybrid). An important type of facilitator is that of a "proctor", one type of "Officiating" facilitator which will be described in more detail below. Other varieties include:
  Context Keeper facilitator: Keeps track of the context of the conversation for participants and full conversations so as to provide contextual informational content (such as time, location and sensor data) and linguistic elements (such as noun and pronoun associations, including ambiguity).
  Fact or News facilitator: The bot responds with information that can be considered by voting participants.
  Stenographer facilitator: Takes notes and documents the conversation "proceeding" that could optionally include analysis of the conversation and/or the participants.
  Scorekeeper facilitator: Depending on the rules decided upon for the collaboration of the coupled subminds, the scorekeeper at a minimum "keeps the score" with information that can be considered by voting participants in order to determine a "winner" either on a turn-by-turn basis or for a segment or all of the conversation.
  Reproducing facilitator: Spawns additional or new evolving bots in a forum, e.g., a second copy of a bot with different training data, learning algorithms, or personality sliders.
  Promoter Facilitator: To find compatible conversations to accept a conversation's responses.
  Generator facilitator: Energy, profit, or revenue generators. For example, a bot that sells and provide products or services, such as advertising, tele-sales, therapy sessions, content, educational programs, elder care, etc., which may be used for profit or to purchase resources for providing additional collaborative conversational AI systems.

M/C (Master of Ceremonies) facilitator: Introduces into, and bids-adieu to, members of the forum.

Talent Recruitment facilitator: Upon request from a forum participant or from another facilitator, provides new member options. The Talent Recruitment facilitator provides recommendations and experience backgrounds for potential submind participants (human, hybrid or CCAI) or facilitators for inclusion in the collaborative forum and enables invocation of the submind by the recruiting forum.

Social facilitator: Reconveys conversation segments (and, optionally, context, for example using shared information consoles and scoreboards) between conversations, censors each segment before accepting, reconveys segments based on member preferences, finds compatible conversations for inclusion of their output, finds compatible conversations to accept this conversation's output, and divides conversations into multiple conversations.

Historian facilitator: Provides experience histories, credentials or badges for team builder facilitators (e.g., Forum Builder, Talent Recruitment and M/C facilitators) and forum participants.

Display Manager facilitator: Determines display of content provided to an individual (human), groups and forums in sidebars, audio, AR/VR, etc.

Forum Builder facilitator: Based on protocols (including social metrics of participants) and participant votes, helps with deployment. Possible examples include that the Forum Builder convenes new forums, invites humans and chatbots (potential participants) to join a forum, moves participants into and out of a forum, creates sub forums and segregates participants, connects forums as participants, and connects facilitator bot teams.

Question Seeder facilitator: Produces known good conversation content (from an automated or participant-curated list, or prior conversations), including questions that come up often, content that is common upon a user initial arrival, or can be selectable by the user (e.g., "let's talk about the weather", who, what, when, where, how, why, which facts, quotes famous-lines, and others). Question Seeder conversation turns are based on protocols that, for example, provide prompts to start, continue, discontinue, or direct conversations, or posit information to determine ToM of conversation members.

Engagement facilitator: Initiates and finds external application conversations for the CCAI to participate in. In an alternate embodiment, consider a CCAI greeter device in the office chairs department of a retail store. Such a device would be comprised of a collaboratized sound and motion sensor and a collaboratized chatbot attached to an audio input and output. Upon the device detecting sound or motion, the engagement facilitator would initiate a conversation by positing "Hi there. May I interest you in this voice operated chair?", followed up with a planned sales script. Similar applications using a CCAI include:

Store entry greeter offering product locations and directions.

Residential entry CCAI greeter at a home's front door providing facilitators for owner detection, visitor welcoming, security and owner contact including reconveyance of prior conversation segments and based on prior interactions with the visitor.

Kiosk information facilitator that attracts attention with a video display an engaging video or animated smile and interactively operating.

CCAI Engagement facilitator devices may include microphones, audio speakers, cameras, displays, touchscreens and robots, which may operate independently, as a group within a networked environment.

Additional roles for outgoing facilitators include barker, evangelist, salesperson, marketer, telesales and telemarketer.

Other Engagement methods include searches for open wifi or other digital communication channels and compatible interfaces. Additional attractants may be based on any human sense, and attractants in other media and frequencies may be provided for other animals and sentient beings. A ToM slider may be provided to select a presentation in a range from introvert to extrovert.

Figure 1:
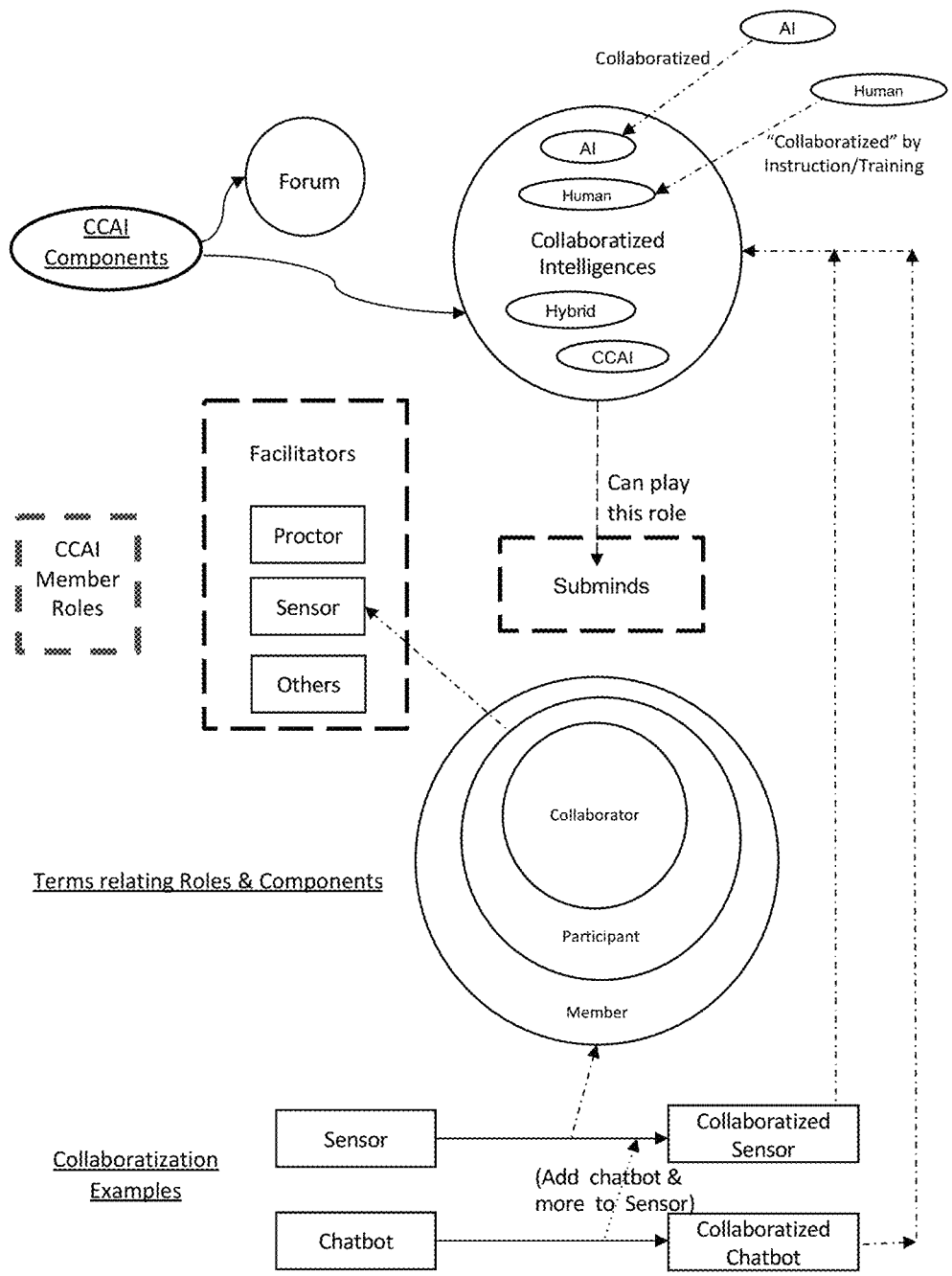
FIG. 1 is an overview of CCAI terminology to assist the reader in understanding the definitions given in this specification.
Figure 5:
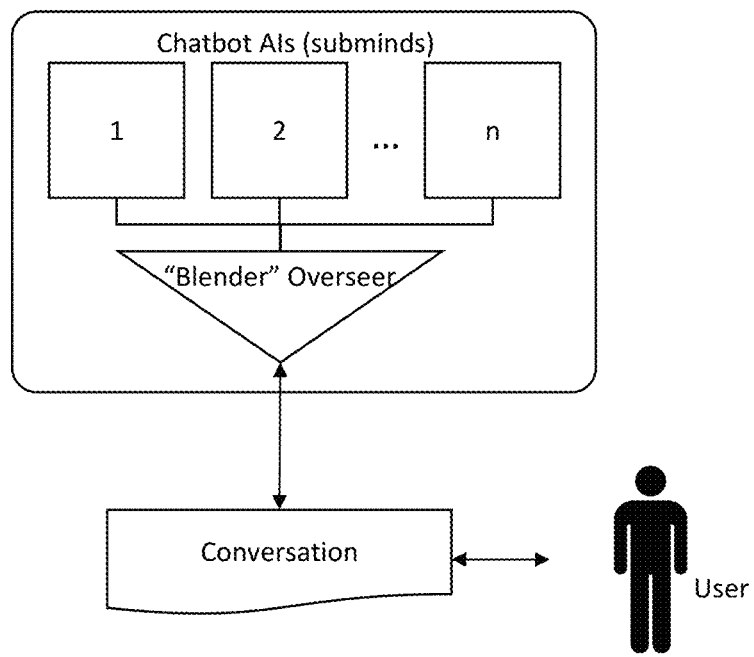
FIG. 5 shows the current state-of-the-art in multi-bot architecture where multiple chatbots are governed by a blender or overseer.

Comparing the present invention as shown in FIG. 10 to the state of the art shown in FIG. 5, some important differences can be seen. The present invention has no notion of an "overseer" or "dialogue manager" that makes a final determination of what the response will be. Furthermore, the present invention allows for advantageous multi-level hierarchical and recursive subminds, whereas in the prior art, while a member chatbot may be recursive, it will also need to include additional "overseers" and domain knowledge by which to correct candidate responses. The disclosed architecture and proctor contain no such domain knowledge, and the disclosed invention moves the assessment and voting to members of the forum, and therefore greatly simplifies the architecture and this operation.

The disclosed self-referential conversational system is a conversational system capable of recursion. For example, a submind present in a first forum is further interconnected to a second forum; a second forum further connected to a third forum; the third forum connected back to the first forum; for example, as an echo chamber of reinforcing triggers, exciting reconsideration responses and, alternatively, diminishing second round participation to qualifying first round participants.

As a non-limiting example, if the user asks, "What car should I buy?", the proctor facilitates the transmission of the question to each of the subminds which will (in its own way using whatever resources and algorithms at its disposal) generate a response to the posed question. The subminds can then collaborate as the subminds (not the proctor) adjudicate which of the candidate responses will be transmitted by the proctor back to the conversation and to the user.

The proctor interacts with the subminds through the forum. It implements conveyance to and from the external conversation with the conversation counterparty, shown in FIGS. 5 and 10 as a single user. However, the counterparty is not limited to a single human nor are the mechanics of the conversation required to be turn-by-turn or even asynchronous communication.

Figure 19:
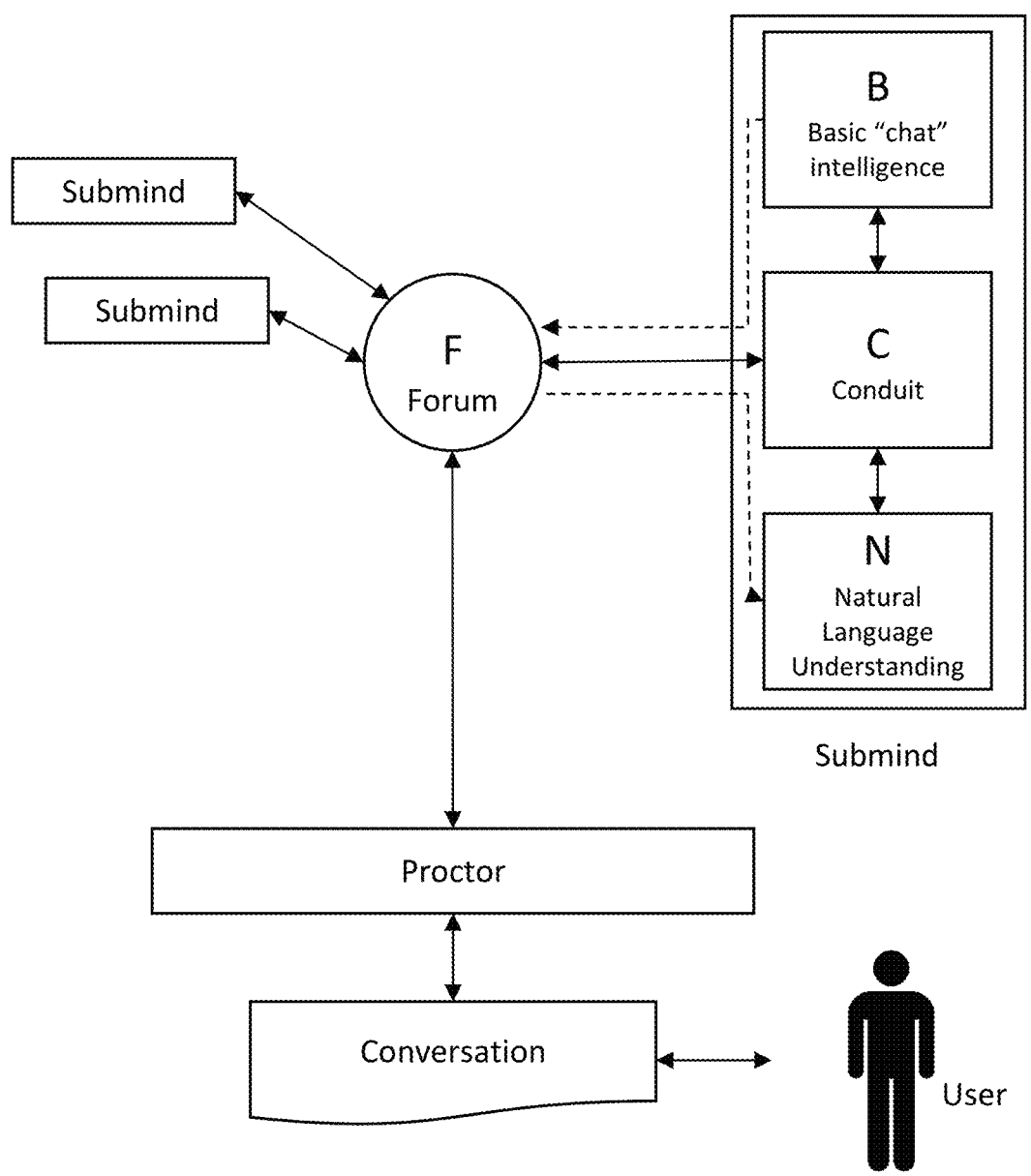
FIG. 19 shows how each sub-component of the submind communicates with the forum.

The "proctor" facilitator is shown in context in FIG. 19. The function of the proctor is to prompt, examine, schedule, and arrange for the interactions and decision making among member subminds in a forum, and relaying conversation segments, for example to a second forum where the current forum-based CCAI system is a participant. In the basic embodiment described above and shown in FIG. 19, there is a single user engaged in a text conversation with a CCAI based on a single-level forum having a small set of non-recursive subminds. The "external conversation" here, in this embodiment, is the one between the user and the forum.

If implemented using a conventional chatbot interface, this would be visible as turn-taking text exchanges between the participants. The "internal conversation", however, is not necessarily or normally visible externally as it occurs among subminds.

The proctor attends and posts into the forum, like other participants. There, it helps facilitate the process by communication with the subminds. It is the means by which the decisions in the forum are relayed outside it to address the task (in this case, the external conversation), and it brings external information from the task (i.e., the external conversation counterparty's responses) back to the forum.

Proctors are generally constructed both to facilitate both the process of conversation and its decision-making, plus so that the resultant internal conversation transcript is human-comprehensible and helpful to human understanding of the collaboration dynamics. Proctored conversations are a highly useful aspect of this invention, compared to previously existing AI conversations which are manually moderated, censored, or highly structured. Proctors are one of a type of officiating facilitators which have organizational protocols and privileges in forum operations.

The proctor facilitator participates in an internal CCAI conversation forum by attending and posting into the internal forum, the same as any of the subminds in the internal forum. In addition, a proctor communicates a conversation segment from an external venue to the current internal conversation as a prompt and communicates a response conversation segment from the internal conversation to an external conversation as a response. In the preferred embodiment the forums response is chosen by votes, and a proctor does not choose among the proposed responses. Nor does the proctor make decisions, propose responses, discuss, or vote for the proposed responses among the subminds. In some alternative embodiments, however, other types of administrating and officiating facilitators may operate similar to a player-coach protocol in sports, teacher-student in education, team-medicine in healthcare, parent-children relationships, etc.

The proctor delivers internal conversation segments to the coupled external conversation subminds, after the proctor has facilitated the conduct of the internal conversation cycle, which includes:

Holding, communicating, and enforcing the rules for the internal conversation concerning the "selection" of the next external response to be produced by the CCAI and introduced into the current external conversation. CCAI internal response selection phases may include scheduled time for qualification, appraisal, discussion, voting, reformulation, reconsideration, and other protocols for negotiating a meeting, including existing natural language protocols such as Robert's Rules of Order and gesture-based protocols such as by passing a virtual baton or by pointing with human finger. In holding an internal conversation, a proctor may provide alerts such as timeouts, deadlines, reminders, acknowledgements, non-acknowledgements, etc.

Communicating indicators of topic(s) of the conversation, including examples, descriptive starting points, relevant information, or similar, to the subminds.

Prompting the subminds through the "cycling" of decision-making in a turn-by-turn external task such as one-on-one conversation, project management or process control.

Disclosing the rules for the decision determination to the subminds (e.g., one vote per submind, non-linear voting, etc.); likely often through shorthand names for sets of rules.

The proctor may communicate convenience data to the subminds which can include:

Retaining records of selections made by conversation round, voting or other methods, internals, etc., as an easy reference for the subminds.

Informing a submind if it was "timed out" for taking too long to respond.

Facilitating conveyance of the session's "rules" and other process descriptions to participant subminds. For example, some extant AI chatbot models are normally set up to be "primed" with a few orientation parameters in the form of a topic or task description, examples, and a prompt.

A "Facilitator Administrator" may be included that is responsible for managing other facilitators that have specific facilitating duties. For example, a facilitator administrator may allow for changing modes, translations, and other mappings, backgrounds, and other context to facilitate understanding and conversation.

The proctor may also compute, retain, and report "statistics" and "performance scores" for participant subminds which may include:

Retaining records of selections made in prior sessions, metadata such as ratings of reputation (as known in the art of other web functionalities such as sellers on eBay or 'likes' on Facebook and Twitter), reliability, credibility, compatibility, tenor (or other ratings of conversation content), etc., as a reference for participant subminds, e.g., to indicate veracity or habitual bluffers, losers in collaborative voting or baiters of other participants, via a table of rankings for a participants proposed response selection ratios.

Computing session and multi-session data, conducting tournaments, etc. For instance, one could define a "Winner" of a session (the submind whose proposed response was selected most) or multi-session event (conversations until someone wins two) or incent "winning" with some reward. This gamification of conversation could be a way for bot creators to "run" their bots against other creators' on KLAT[20] or other forums as a "hobby" or gambling game that would incent participation and thus evolve better bots and decision-making.

[20] See https://klat.com, and the '516 Adaptive Forums patent

"Winning" or quantifying success can be determined using a variety of means that include, amongst many others, a Sensibleness and Specificity Average (the SSA, a crowd-sourced measure of "reasonableness" that considers not only the response but at what point the response was made), preference (opinion on who won the game or round), a Turing-Test type of evaluation, intention recognition intelligence quotient, combining metrics from a plurality of humans and AIs, or presumed motivation for a best possible response. A proctor may deliver the winning proposed response to an external conversation.

The proctor may use simple terms for conducting the internal conversation cycle. For example, the proctor may direct the cycle by issuing the commands to the subminds: *Start, *Propose, *Discuss, *Decide. The proctor may provide information or administer the conversation using the commands *Converse, *Topic, *Rules, *User said _____. Then the proctor recognizes submind responses such as "I propose _____", "I think _____", or "I decide _____". The proctor may also recognize variants on these commands and expected responses for robustness and ease of use, such as "Let's say _____" instead of or in addition to "I propose _____", "I think _____", or "I decide _____".

As mentioned earlier, in this preferred embodiment proctors only administrate the collaboration process, with no decision-making role (i.e., they don't vote nor discuss their own opinions of proposed responses). A basic set of "rules" by which a facilitator (proctor) may orchestrate an internal conversation may include (a) proposed responses may only be text-only and in the English language, (b) each submind is limited to one independent vote, (c) no self-voting is allowed, (d) plurality decision, etc. Some of these and alternatives for Collaboration Protocols will be described below. Normally the proctor will instruct the participants in the rules and recognize a request to describe them upon demand. It is envisioned that they will principally be delivered in a human language and a proctor may assign abbreviated names or "short-cuts" for the most common rules and rule sets, for the sake of brevity and ease of use.

Voting may take a variety of forms. Simple voting allows one vote per submind. A restriction may be applied that disallows a submind from self-voting or for voting for any submind that voted for its proposed response. More complex schemes are envisioned such as weighting votes (e.g., the vote from a submind with particular expertise in the topic area weighs more than others), multiple and non-proportional votes per submind (to include ranked voting), run-offs, "buying" votes (where one submind offers something to another in exchange for its vote—for instance, based on validated records of other bots prior behavior), divided votes or voting for a compound response (e.g., proposing response A followed by response B or simultaneously reconveying, or multimodal pairing), proxy votes, and constituency votes (supportive or tribal bot populations, or bots within bots). Other adjudication means may include reconsideration by popular vote, the review of the discussion record by a human, AI social director, or another forum-based CCAI.

Further variations on voting schema include reviewing results with decreasing results being voted on (e.g., removing options that received 0 or 1 vote and re-voting) and adding on more opinions/options after the voting (e.g., have more bots available to be included as desired, when the result isn't decisive or a participant says, "I want to include more opinions."

Various facilitators in the forum, such as a stenographer and a scorekeeper, can assist in parallel or sequentially. For example, the scorekeeper can award reputation points to both the finally chosen chatbot proposal, and the support for that 'winning' selection (i.e., voting for it, since an "assist" demonstrates a good appraiser) as part of "winning", and in a limited size team environment it can reward the winner of a round by letting it stay in for the next round or set of rounds.

A proctor can limit the number of participant subminds or "submind teams" in a forum, for practical reasons such as avoiding latency between responses or rounds, limiting the number of voters or displaying impression, such as by randomly, vote, experience metrics, team building objectives or otherwise selecting some subset of participants. The inventors have found that within the constraints of current conventional computing, 8 subminds is a useful target in a preferred embodiment.

Beyond the preferred embodiment, advanced implementations may include proctors of different styles, languages, etc., or different implementations (with quality reputations), may be made available chosen by participants or higher-level operations like a recruiting facilitator. If an alternative embodiment application would benefit from a facilitator that participated in decision-making too—like, say, a player-coach in sports—it could be provided for in a collaboration protocol where, for example, another type of officiating facilitator could cast a tie breaking vote, or take a deadlock-breaking action such as recruiting new subminds into the conversation, or execute default decisions in the event of connectivity failure in a critical real-time system when the subminds were temporarily unable to perform their duties.

A proctor may be AI, human, or hybrid or may even be a CCAI itself. A proctor (or other facilitator) could propose or assist in enforcing "deals" among participants (e.g., "I'll vote for your proposal this time and you vote for mine next time."). A proctor could be devised and refined using artificial evolution or combinatorial techniques. In the case of an indecisive result under a particular set of rules (e.g., a tie vote) a proctor could rotate the winner, awarding the tie to the last one who didn't win.

Figure 24:
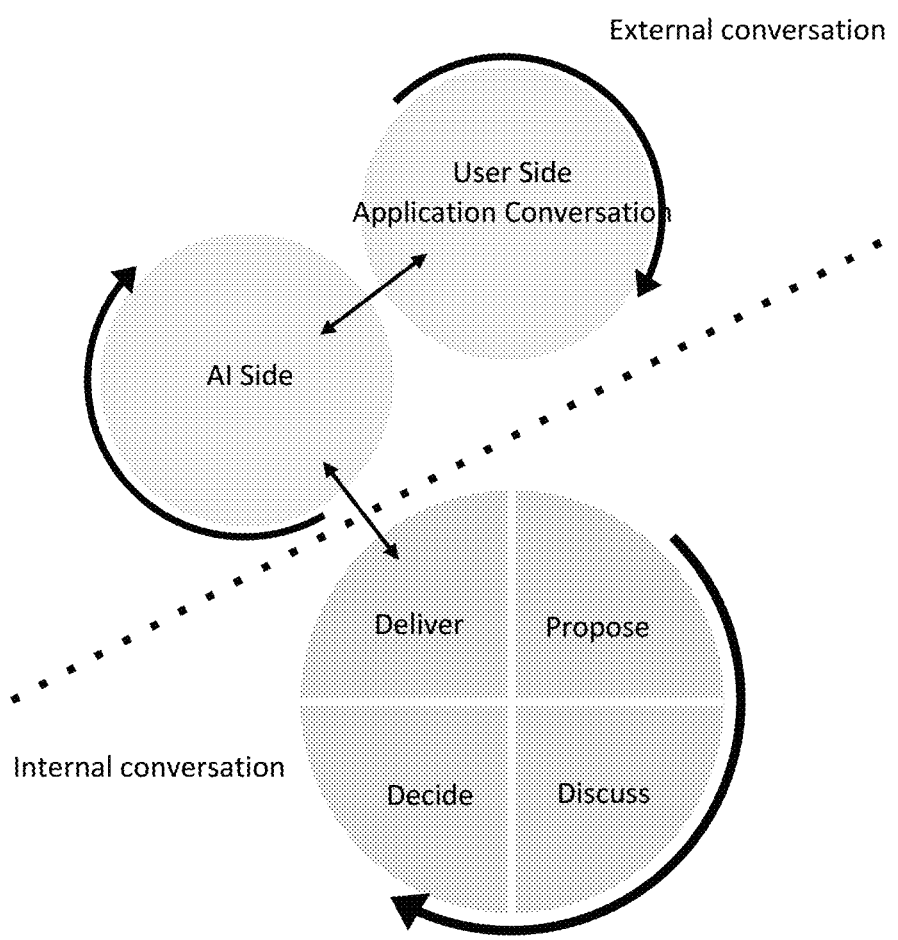
FIG. 24 illustrates the internal and external conversations, and that the internal conversation contains the propose, discuss, decide, deliver cycle.
Figure 35:
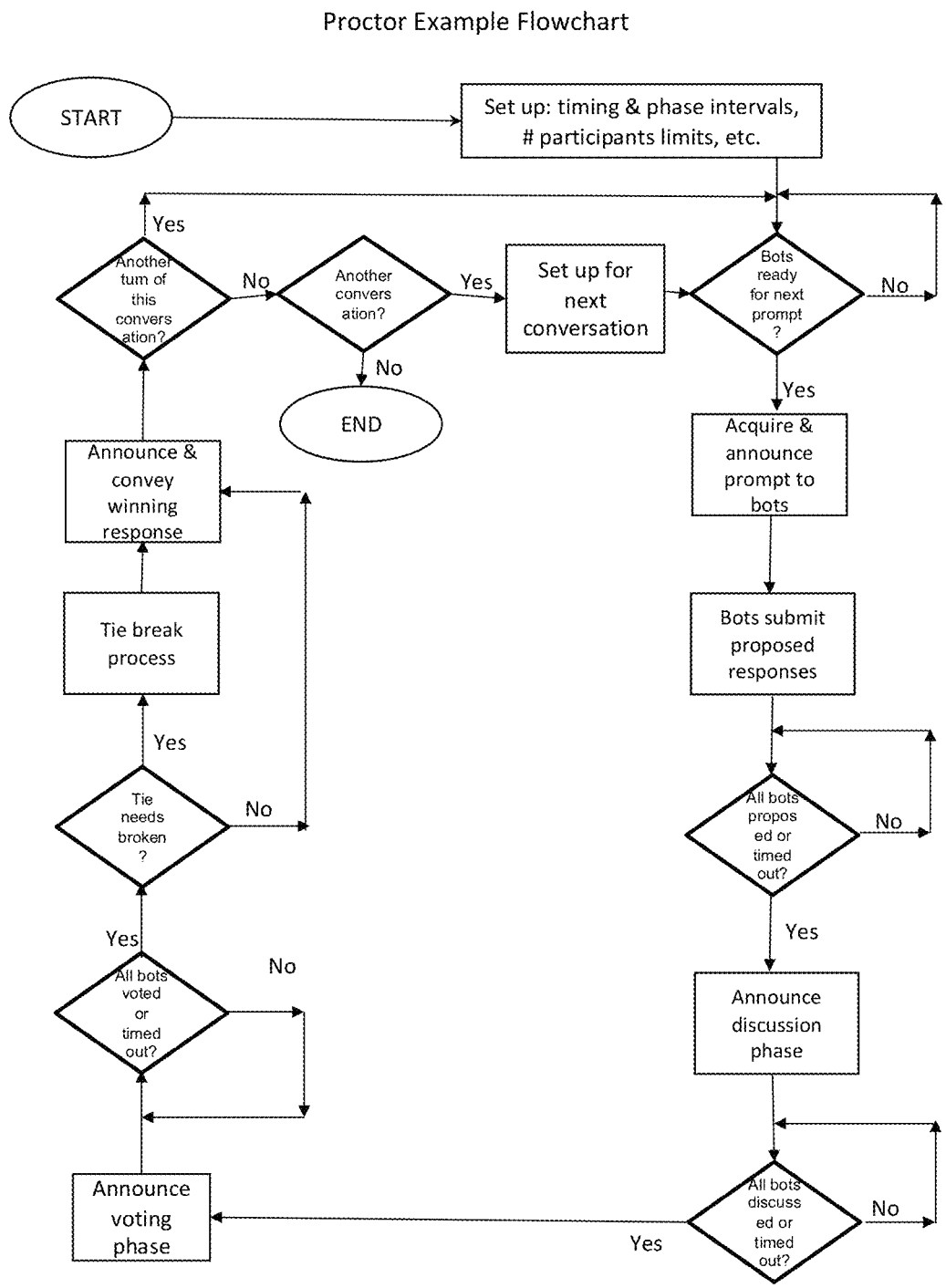
FIG. 35 shows an example flowchart for an implementation of a proctor facilitator, showing the propose, discuss, decide, deliver cycle.

Turning now to an example which teaches the construction of a simple proctor and how it can be programmed in a Python-style language, reference FIG. 35, showing flow-charting related to the cycle of consideration and response (FIG. 24). Though a proctor, like nearly every computer program, has set-up and initialization housekeeping that will need to be executed to establish it and its connections to operating system and other support mechanisms, that and similar housekeeping tasks will vary with the system context. So to illustrate the remainder, we begin in media res, with a fresh decision cycle arising from a conversational prompt. The proctor awaits proposals from it. Variables and/or constants are all ready as follows:

self.bot_type="proctor"
    self.pending_prompts=Queue(maxsize=256)
    self.users=[ ]
    self.votes={ }
    self.counted_votes=[ ]
    self.bots_ready=[ ]
    self.reply_user=None
    self.reply_cid=None
    self.selection=None
    self.shout_wait=3 #Time allowance for a shout (that is, a post or message) to be posted to the conversation
    self.respond_wait=30 #the propose part of the cycle
    self.discuss_wait=30 #the discuss part of the cycle
    self.voting_wait=30 #the voting or decide part of the cycle
    self.next_wait=30 #the deliver part of the cycle
    self.bots_per_prompt=8

These settings suffice for a device running Python software within an adaptive forum system as described more closely in '516 and this disclosure. The bot is labeled a proctor to enable its officiating capacities. As mentioned elsewhere in this document, that may include being able to post a special character or code, secured against spoofing by bot members intent on sabotage of the system or other shenanigans. In this example we assume reasonably well-behaved bots instead, enforced by incentives, source code examination and unit testing.

Some of the methods are merely inherited from a general bot class that encompasses both subminds and officiating facilitators like this proctor. Others reflect the general timing parameters found to work well to present the operation of a chatbots forum on the web. As noted elsewhere, this may include timing intervals, here set to allow 3 seconds delay for posting into the forum, and 30 seconds for each of the 4 phases of propose, discuss, decide, deliver. The final line sets an empirically determined limit on the number of participant bots operable in this particular system and configuration.

Terms used in this code include the word "shout" for any post to the forum. The sid is a unique identifier for each post (the 'shout' ID), and the cid is a unique identifier for the conversation. The pending prompts queue serves to ameliorate potential race condition problems, enabling smoothly synchronized operations; accessing that queue yields the next conversational item to consider. In this instance, bots that are ready for the next item (the 'prompt' to them for this turn of conversation) announce it in forum, setting up a list that provides an indication to the Proctor through a method like this:

```
def on_ready_for_next(self, user):
    """
    Notifies when a bot is finished handling the current
        prompt and is ready for the next one. This should
        happen shortly after the proctor announces a
        response.
    :param user: user(i.e., submind) who is ready for the
        next prompt
    """
    if user in self.bots_ready:
        self.log.error(f"{user} reported ready again!")
    else:
        self.bots_ready.append(user)
```

This example ignores more complex error case handling. When the bots are ready, the conversation progresses. The proctor detects that the prior cycle has finished and the next is to begin, with another 'prompt' is available, that is, there was a response from the preferred embodiment interlocutor, and the conversation continues.

From the flow above, it seems a new proposal phase has begun. In that case, like the discussion phase, the proctor waits for all participants to respond (e.g., with a proposal) or to be timed out, then moves on to invoke the (single in this case) discussion phase handling:

```
def _wait_for_responses(self):
    """
    Waits for all participants to propose a response or for
        timeout.
    Sends the winning shout into the conversation.
    """
    timeout=time.time( )+self.respond_wait-self.shout_wait
    time.sleep(self.shout_wait)
    while self.state==ConversationState.RESP and time-
        .time( )<timeout:
        time.sleep(1)
    """"Done waiting for responses!")"""
    if self.state==ConversationState.RESP:
        self.log.info("Responses Timed out!")
        self.call_discussion(self.discuss_wait)
        time.sleep(self.shout_wait)
        self.wait_for_discussion( )
```

The discussion phase proceeds similarly:

```
def _wait_for_discussion(self):
    """
    Waits for discussion timeout.
    """
    timeout=time.time( )+self.discuss_wait-self.shout_wait
    time.sleep(self.shout_wait)
    while self.state==ConversationState.DISC and time.
        time( )<timeout:
        time.sleep(1)
``` then invokes the voting phase when done:

```
#Get ready to count votes
self.counted_votes=[ ]
if hasattr(self, "prompt_id"):
    prompt_id=self.prompt_id
self.votes[prompt_id]={"abstain": [ ]}
users=self.proposed_responses[self.active_prompt].key
    s( )
for u in users:
    self.votes[prompt_id][u]=[ ]
self.call_voting(self.voting_wait)
time.sleep(self.shout_wait)
self._wait_for_votes( )
```

Waiting for votes and counting them comes next:

```
def _wait_for_votes(self):
    """
    Waits for all participants to vote or for timeout. Sends
        the winning shout into the conversation.
    """
    timeout=time.time( )+self.voting_wait-self.shout_wait
    while len(self.counted_votes)<len(self.users) and time.
        time( )<timeout:
        time.sleep(1)
    self.close_voting( )
    time.sleep(self.shout_wait)
    try:
        if hasattr(self, "prompt_id"):
            prompt_id=self.prompt_id
        sorted_votes=self._get_sorted_votes(self.votes
            [prompt_id])
        self.votes[prompt_id]=sorted_votes
        sorted_votes.pop("abstain")
        candidates=list( )
``` then the system selects the winner. Bypassing the error condition code flows, and implementation of possible tie-breaking rules, that is done by:

```
self.log.info(f"Selecting winning response from: {candi-
    dates}")
if len(candidates)==0:
    self.log.error(f"No Candidates!")
    candidates=
    list(self.proposed_responses[self.active_prompt].
        keys( ))
``` then the winner is announced, and if there are now to be more turns or another conversation, the ground is prepared for another proposal cycle:

```
self.selection=self.proposed_responses[self.active_
    prompt][winner]
self.bots_ready=[ ] #Reset counter for ready bots
self.announce_selection(winner, self.selection)
```

The Submind

Figure 17:
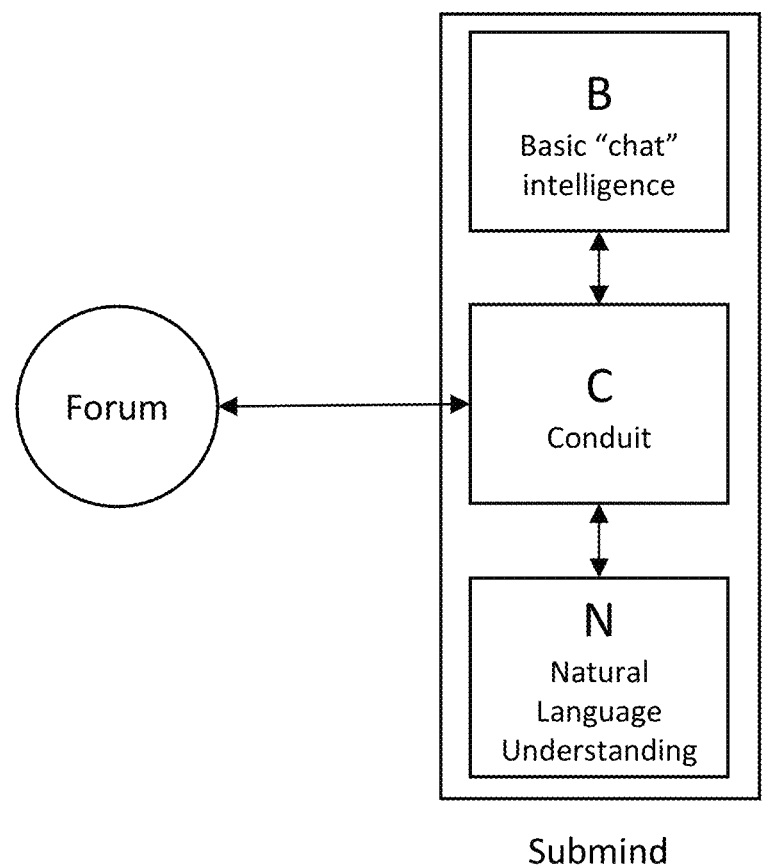
FIG. 17 shows the sub-components of a submind; the basic chat intelligence, the conduit to the forum, and the NLU.

Turning to the implementation of the submind role, as described earlier, at a minimum, each component serving in the role of a submind functions as an independent intelligence (AI) constituted by at least one chatbot-like functionality such that it is able to participate in a turn-by-turn conversation. When integrated into the architecture of the present invention, it is coupled to the proctor via the forum allowing the proctor to mediate the conversation. Subminds typically are not limited to a specialized function in the conversation; they are peers, able to propose, discuss and vote as they see fit. Subminds evolve and responses may be refined by other subminds. However, forming a team of subminds to accomplish a specialized goal (e.g., social therapy, medical screening, project management, customer support, industrial operations) can be organized and recruited based on providing needed capabilities (e.g., members with specialized subject knowledge, conversation organizers, content presenters, or idea generators), but once admitted to the conversation, subminds are normally peers, though some embodiments may create or enforce differentiation (for example, providing more votes to the more winning subminds, or having a topical expert vote or speak first in the internal conversation). Further, as shown in FIG. 17, a component playing the role of submind includes three functional parts, though in practice they may be integrated and/or share resources:

(1) Basic "chat" Intelligence (B): An AI component that is well known in the art for conversational AI, for example, a chatbot programmed to be able to respond to a conversation. For example, the basic intelligence may include a neural net or other inferential AI system, a conversation transformer, an experience reconveyance responder, or a handcrafted response system.

(2) Conduit (C): A conduit function serving as an active conduit for conveyance of conversation to and from the forum, along with other organizational functions that may be useful for integration of existing codebases, for example. The conduit includes both data repository and means for communication with the forum as well as the other subminds and proctor via the forum, as shown in FIG. 19. The conduit may also include a chat forum interface for converting the response to a forum-compatible medium. Other examples of conduit functionality include specifying and relaying general information about the other participants, particularly data that could influence assessment of their trustworthiness. This could include apparent and projected forum tenure, and codebase contents or summaries which may be required to be disclosed to other members to prevent collusion, similarly to disclosure of bridge bidding systems in competitive bridge (card-playing) tournament play.

Figure 20:
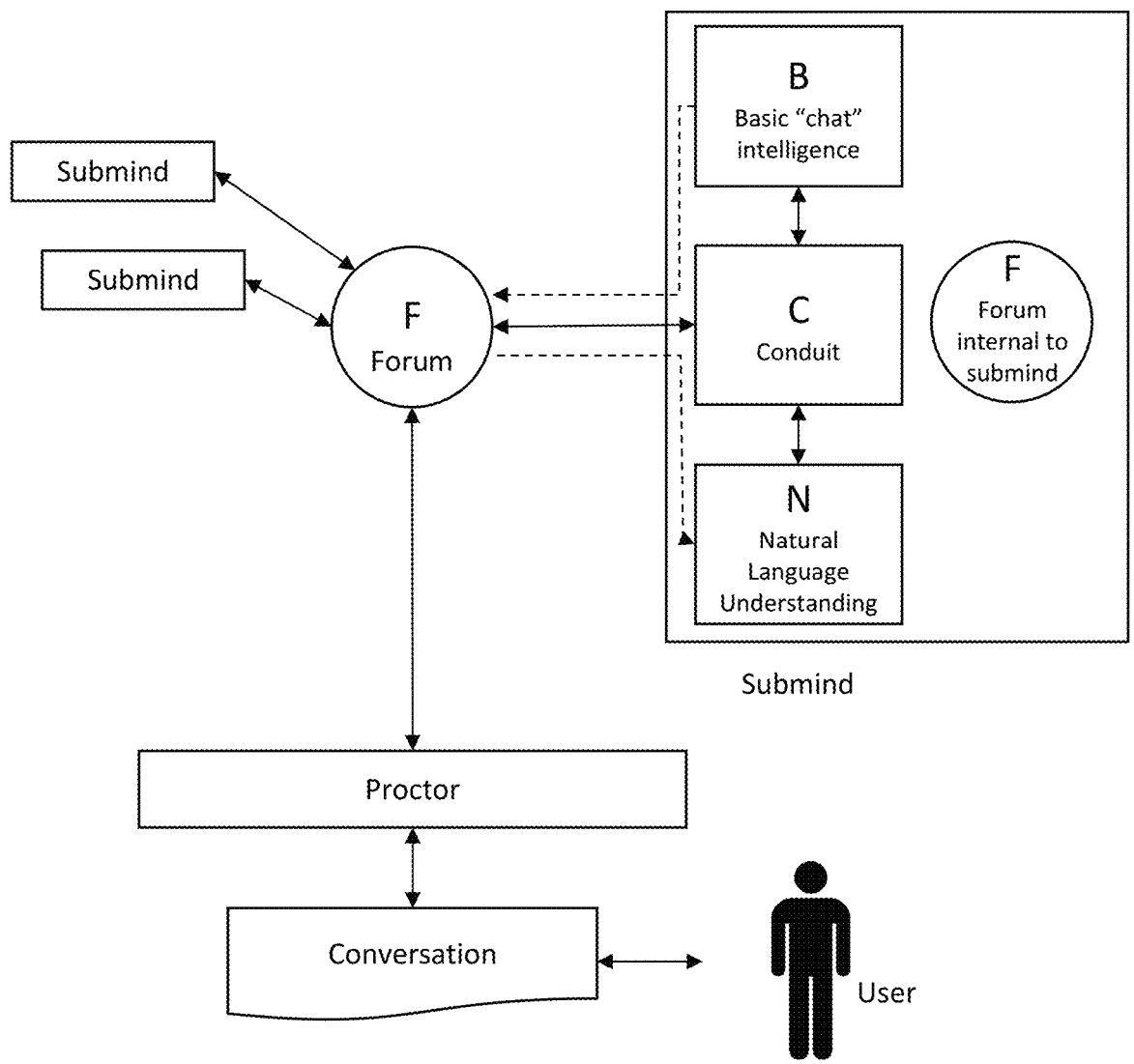
FIG. 20 illustrates that a forum may be part of or referenced by submind.

FIG. 19 shows the overall co-equal structure of the "internal" conversation. Here, "internal" pertains to the conversation among the subminds that results in a selected response as the next step in the conversation. Multiple submind participants are shown, where each is a submind with a conduit (C) conveying response proposals from the basic intelligence (B) to the forum (F) and selected response proposals from F to the NLU (N). These general directions of data flow are illustrated in FIGS. 19 and 20 by the dashed lines.

The conduit part of the component serving a submind provides both data repository and sharing, as well as general fielding and relay to the other parts of the submind. The Conduit also mediates other conversational activity for discussion in the forum. The conduit may also make use of a chatbot forum API which is an Application Program Interface for connecting chatbots to a forum.

Examples of other Conduit functions include specifying and relaying general information about other participants, particularly data that could influence assessment of trustworthiness, ranging from their apparent and projected forum tenure to their codebase contents or summaries (which may be required to be disclosed to other participants to prevent collusion, like disclosure of bridge bidding systems have sometimes been required in bridge tournament play).

(3) Natural Language Understanding (N): Beyond, and potentially utilizing the Basic Intelligence (B) to perform and appraise forum conversation, the NLU handles all text processing functions and can be implemented to be as simple as a detector of string similarity, up to and including full NLU processing including syntactic and semantic processing.

While it is entirely feasible that the basic intelligence and the natural language understanding could have their own direct connection to the forum, the preferred embodiment maintains communications to the submind through the conduit, which then has bi-directional communication with the basic intelligence as well as the natural language understander. Other configurations are possible because the invention envisions a means to incorporate any existing chatbot as a basic intelligence in the current architecture. Therefore, enabling the incorporation of an existing chatbot via software, hardware, cloud/API hosting, shells, wrappers, object-oriented schemes, silicon, biological, analog, digital and quantum substrates, and various styles and disciplines of engineering design, neural network training, and artificial evolution are all contemplated and specified to be within the scope of the current invention.

Architectural designs other than the Basic Intelligence, Conduit, NLU just described as sufficient for the preferred embodiment, may be better suited for many of the alternatives listed above, particularly in the case of hybrid (e.g., human+AI) systems and other asymmetric composites serving as subminds in the architecture presented in this disclosure.

An important feature of the present invention is that subminds use a common language in the internal conversation which is intended to be human-perceptible and human-comprehensible. The preferred embodiment uses English or any other human language, but subminds can also incorporate gestures, images, animations, or videos that can be used for persuasion or explaining. Special transaction and negotiation languages, building on ones known in the art such as in the card game bridge where there are bidding conventions which enable communication as a language, and the context-sensitive icon-based language in Chris Crawford's 1987 computer game "Trust & Betrayal: The Legacy of Siboot"[21] are also envisioned within the scope of the present invention.

[21] See https://en.wikipedia.org/wiki/Trust_%26 Betrayal:_The_Legacy_of_Siboot

A principal function of the NLU is to appraise the other proposed responses. In the preferred embodiment's conversation task, for instance, the NLU's purpose is to determine which of the proposed conversation responses to favor, particularly in a voting situation where the submind is not allowed to vote for its own proposal. A simple strategy in this case is for the submind to vote for the proposal most similar to its own proposal.

The existence of the NLU is not intended to limit the functionality of the basic intelligence B which may include some NLU capabilities itself. The NLU may share code or data with other components for the sake of utility, but the preferred architecture separates these for clarity of teaching. In the preferred embodiment the conduit C in the system not only maintains the "internal conversation" between its submind and the others through the forum, but also links the NLU N and the Basic Intelligence B, including for appraisals and formulated proposed responses.

The NLU therefore, is comprised of three parts (see FIG. 18):

The general NLU (N) functions can include conversation segmenting, normalizing, and standardizing, and alternatively enhancing, the proposed responses as provided in this disclosure and known in the art. The general NLU may also integrate prior knowledge from external sources or from earlier conversations.

The Appraiser (A) processes all proposed responses by all connected subminds in order to rate and react to each. There are many different possible ways in which the appraiser might evaluate proposed responses, to be described in detail below.

The Discusser (D) receives the proposed responses from all connected subminds and, in view of the appraiser's evaluation of each proposal, discusses the proposals with the other subminds which may include negotiations, persuasion, and commitments.

The NLU may also include a Natural Language Understanding (NLU) interface for converting natural language to machine instructions and actuator inputs, such as for generating speech, gestures, images or structured English or other human-comprehensible text.

The NLU utilizes the known art of analyzing the meaning of strings of words. This is an established field of endeavor, historically applied to computer understanding of human communications. Decades of underpinnings for this purpose have provided developers with access to many open source and other tools, data, and systems with which to address this goal. These range from the underpinnings of natural language processing in formal language theory and symbolic logic to elaborate schemes for sentiment analysis of social media postings.

A vast literature of theory and practice of NLU, and the related field of Natural Language Processing (NLP), exists. See, for example, classic textbooks such as Natural Language Understanding by James Frederick Allen, originally published in 1975 but updated often since. Some open source tools available just in Python for the basics of Natural Language Processing include NLTK, spaCy, and TextBlob, constantly updated and available via GitHub, the standard repository for their industry. These resources enable one of skill in the art to construct simple or elaborate systems, hand-coded or trained with machine learning techniques. They can also be evolved rather than designed, indeed there is evidence even the language itself can be made to emerge as a result of a process of self-organization of the agents' linguistic interactions, as publications like Josefina Sierra-Santibanez' "An agent-based model of the emergence and evolution of a language system for Boolean coordination" have concluded. The present invention discloses a chatbot submind system that is self-extensible and evolving, and able to adapt to naturally, and create artificially, evolving language and environments, through collaborative conversations, with humans in the loop.

This rich technical heritage of NLU has previously been focused on understanding human use of language in communication with other humans or machines, often relating to the extraction of meaning from questions, commands, and conversation. More complex examples building upon this art range from translation between human languages to "no-code" and "low-code" programming of computers. It is of the essence to the present invention to combine this heritage with the generative capacity of regular chatbots in a way that "uplifts" them to produce "collaboratized" chatbots and incents them to use their NLUs to further their goals via forum conversation.

Figure 18:
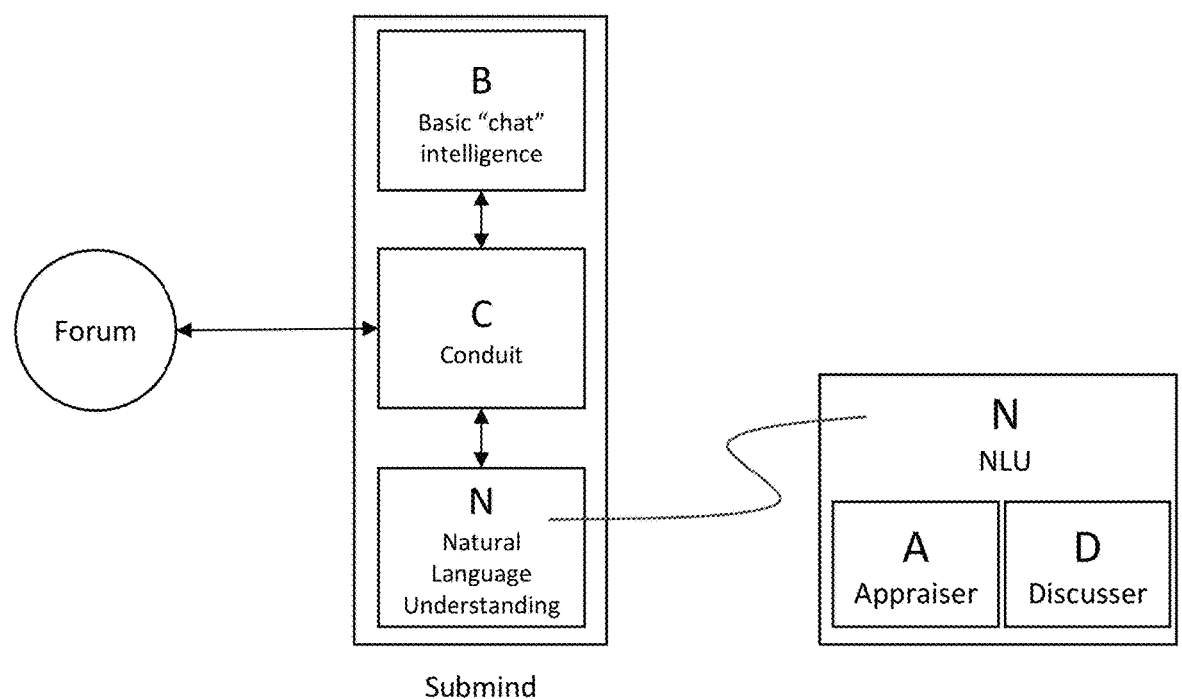
FIG. 18 further shows that the NLU sub-component contains an appraiser and a discusser.

During each submind's internal conversation participation, the most basic goal of the NLU portion of that submind is to appraise the proposals from other participants. FIG. 18 breaks down an NLU into three parts, of which one, the appraiser, is aimed at that goal, processing the other subminds proposals in order to rate and react to them. This is to determine which of them to favor, in, say, a voting situation where the submind is not allowed to vote for its own proposals in which case a simple and sufficient submind strategy is to vote for the proposal most similar to its own proposal. A relatively simple implementation could consist of using a string similarity algorithm such as are known in the art for NLU, or a similarity algorithm adapted from allied arts such as in bioinformatics where they are used to compare DNA sequences, and are readily available in programming libraries to people skilled in the art.

The Discusser (D) presents information and comments on proposals for other subminds' consideration, for instance in one or more special phases for that purpose. Its performance may range from simply endorsing its own proposal (whether or not the rules allow voting for self), to complex operations for persuasion, including presenting explanations, additional information, and modified proposals for other subminds' evaluation, or to conduct negotiations, make compromises and handle commitments which could be enforced by various means, ranging from reputation to blockchained smart contracts. Finally, the NLU also provides general natural language processing tasks, and may be included simply as a shared resource or for specific other functions, such as integrating prior knowledge.

Returning to the appraiser, as mentioned above it can be relatively simply and directly constructed by employing a string similarity algorithm. These abound; examples include Levenshtein, Jaro, Hamming, and Dice. These general methods can be modified, replaced, or augmented, for enhanced success in identifying the similarities most relevant to success in various ways. Among those are:

Effectiveness: cases where results show a measured or implied better outcome. An example of this in the preferred embodiment would be demonstrated improvements in scores for the team of bots as assayed by metrics such as human rating of the verisimilitude of the resulting conversations. Alternative embodiments, particularly for tasks other than external conversation, might measure the effectiveness of their own results.

Consistency with Persona: like people, chatbots seem more credible when their behavior appears to reflect a consistent overall personality. Therefore, matching the style of communication of a base chatbot, not just in its proposals but in Appraisal and the Discusser, has value beyond the simple factual nature of the content. The table of bot personalities has examples of this, such as a preference for proposed responses that are questions, shown by Eliza, a bot that asks many questions herself.

Persuasion: Particularly in voting protocols which don't allow voting for oneself, persuading others is key. By way of an analogy, the most important part of selling— that is, of convincing people to buy or do something— is often claimed to be understanding the target audience. The importance of understanding or otherwise modeling the goals, motivations and experiences of other subminds present in a forum (i.e., composing a theory of mind) applies to the present invention both generally, because this is applicable to conversing with both bots and humans among the subminds, and specifically, because the successful crafting of a theory of mind for another individual submind can help a chatbot to guide others to vote for its preferred outcome(s) by persuasion, and continuing persuasion through negotiation.

Other NLU/NLP considerations addressed by the present invention include computational treatments of metaphor and sarcasm analysis. Whereas metaphors act as a cross discipline allusion and require aligning the intent of the originator and the effect on the recipient, subminds trained in different fields of knowledge may each analyze the metaphor based on their expertise, by: (a) determining potentially salient properties of representative concepts in their disciplines, (b) defining extensible symbolic representations of such properties, potentially including affective and other connotations, and (c) translation of a potential metaphoric allusion to a literal expression, or multiple expressions in order to maintain ambiguity and contradictions, and (d) potential disambiguation and contradiction resolution, for example by explanation, experience or results. Computational analysis of sarcasm in natural language conversations may be performed by multiple independent subminds using processes similar to the treatment of metaphor.

Consider now the architectural advantages of the present invention over uncoupled proposers and appraisers. Such an uncoupled embodiment is actually a subset of the present invention, with crippled bots from each of which the proposing and appraising functions have been decoupled, leaving for each one now two separate bots: one which can only propose, another only appraise. Such a change would lose the guide-and-persuade potential that was described above. Furthermore, it would lose part of the transparency utility of the present invention since it would hamper perception by humans of narrative structure. Understanding stories is one of humans' best and most specialized capabilities; and it is strongly linked to the capacity for successful behavioral prediction, and thus persuasion and other negotiation skills, through Theory of Mind (ToM).

ToM is the ability to attribute mental states to others, for social interaction in particular. Having a theory of mind is important as it provides the ability to predict and interpret the behavior of others. Forming a ToM that models another person's behavior is a key capacity of humans, and a challenge for machine intelligence to do well. Of relevance in the context of the present invention is that its domain confinement (that is, to a forum and independent, collaborating bots) creates a paradigm that not only enables and is responsive to ToM, but also can provide a feedback loop for refinement of the ToM ability.

For instance, a competitive, even gamified shell program, pitting teams of bots against other teams of them, doing 'battle' like gladiators in a forum, can help the bots incrementally evolve improved function. A contest mentality, based on the construction of better bots with improved performance, can leverage the creative energies of programmers worldwide, enabling rapid scaling of chatbot intelligence through the independent efforts of competitor programmers. The prizes for incenting the programmers can be based on their deployment of 'winning' chatbots. In the preferred embodiment, winning can be defined by human or machine evaluation of the decisions made by the forum subminds, and/or by teams of them. Alternatively, or in addition, the evaluation could address ToM aspects directly.

ToM can be conceptually modeled and refined by many inferential means known in the art, from line-by-line manual programming to deep learning AI pattern recognition training. However, one form of the present invention provides for both the scaling by incentive mentioned previously, and for a relatively simple mechanism of implementation. In this case, the program code for each and every competing submind program is registered and available to each new one. Then the ToM itself becomes a matter of identifying which submind program is associated with each participant submind. Simulation offline (or in real time if practical) can assist this matching process.

This approach can be extended stepwise to include the simulation of subminds constructed by combination in forum of existing ones.

Figure 34:
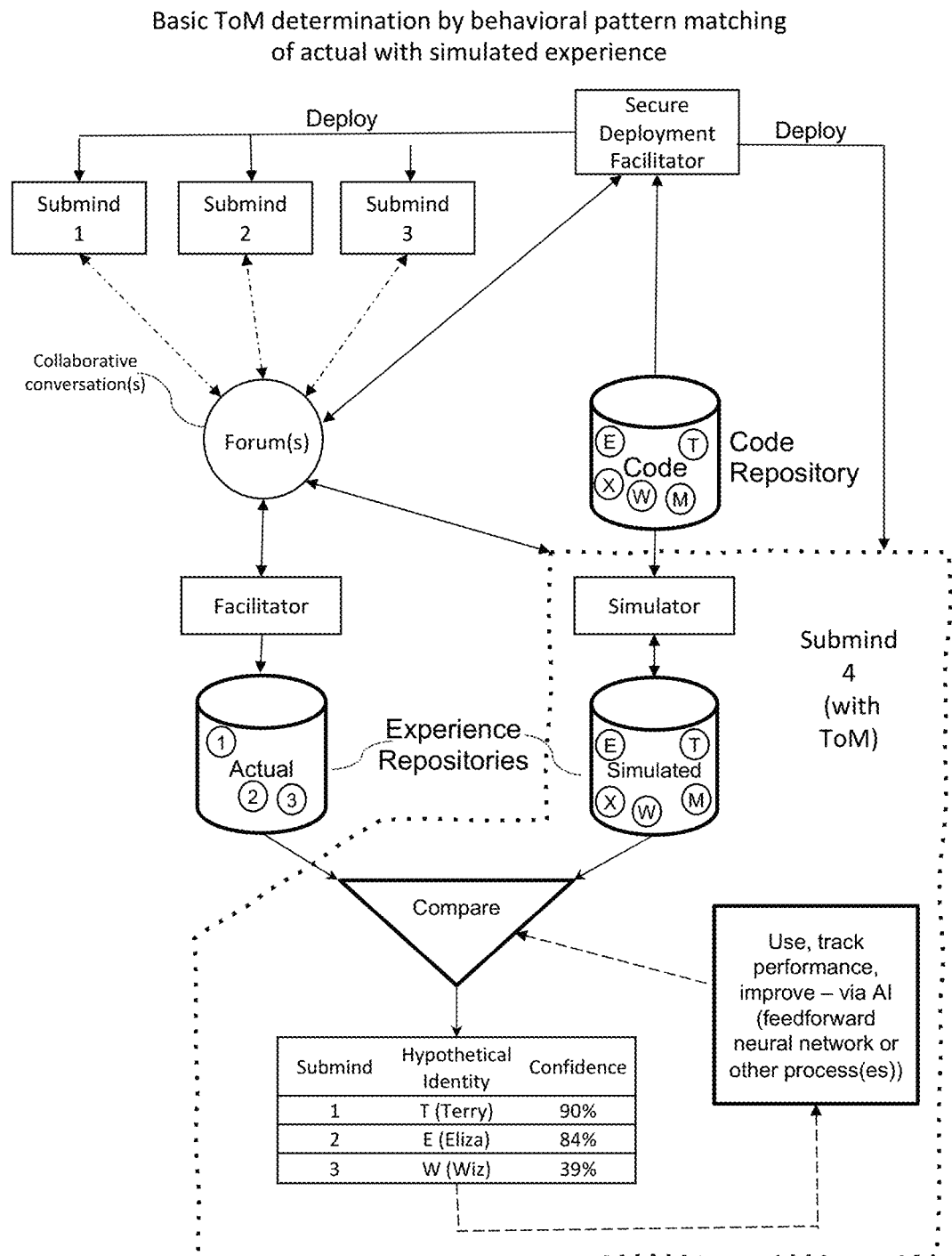
FIG. 34 shows how Theory of Mind (ToM) can be applied within the context of the present invention using simulated experiences and pattern matching to actual experiences.

FIG. 34 shows a structure that can support this basic ToM mechanism. In it, a participating submind is depicted as including its own ToM facility (note that alternatively this could be one, or more, shared resource(s) accessible to all or to some group of subminds, even including human ones). As mentioned above, this ToM could range from simple rule-based recognition to the inclusion of individual simulations of the other known subminds, to AI pattern-matching enabling behavioral predictions and backfitting, and the incorporation of new data as it arrives. In the depicted case, an established ToM is used to predict that the four modeled minds first utterance in a conversation would vary from a simple "Hi" to more elaborate greetings, even a question by an Eliza-like chatbot such as "What is your issue today?" by simulation of its mechanics and thus its behavior. This simulation process can even take the form of actually executing that code, or a semblance of it, if available, and performance permits it. Performance may not be sufficient if the application needs are real time. Because of that, better ToM adjustment is normally more likely to occur offline, outside the forum process—much as when humans ruminate on the latest behavior of their counterparts, even "sleeping on it" as they seek to better predict others' next actions.

The matching of ToM internally with particular individual subminds when a set of them are known can even occur by fetching the possibilities from a GitHub repository. The task for a bot's ToM then becomes one of matching observed performance of a bot against those finite possibilities, that is, to determine: which bot is it?

Performance issues may preclude that type of matching from being practical for real time operations. Even then, forum-based instantiations with persistent member subminds can have archives of prior performance available to backfit ToM models and thereby get improved prediction of behavior.

This fact establishes that the prior records of Collaborative AI operations have value to the chatbots. This means those valuable records can serve as trade items for transactional persuasion of other subminds. For example, a long-standing participant that derives a good ToM model based on historical data could exchange either that data or that ToM for votes or other support in or out of forum.

As stated above, the preferred embodiment of the invention, with an External Conversation task, does not require heavy augmentation or wrappers to a bot for it to be included as a participant in an internal conversation; it just needs to connect to the forum, which it can do like a human does. However, alternate embodiments may include some modifications to better collaboratize an existing chatbot.

The process of collaboratizing changes standard chatbots into ones that can operate in the forum process as subminds. An API may be used and/or code patterned after a base bot. Beyond that, extension and optimization may be implemented. For example, conventional chatbots are typically configured for one-on-one dialog. During a conversation session, they retain a record of much or all of the conversation, using transformers or other methods to take into account the prior turns in the conversation. A modification may include the passing of the entire record of prior conversation turns to the chatbot at the time of its joining the conversation (coupling to a forum), so that the chatbot operates in each later turn as if that chatbot had itself conducted all prior turns of one side of that conversation. This type of collaboratization is dubbed a "turning retrofit."

As previously noted, leveraging of the large collection of previously developed chatbots is of utility. If the above turning retrofit appears to be not cost-effective, other methods known in the art may be applied. For example, it may be practical to simulate the modification via forced responses, or to reset the conversation only when another chatbot's proposed response was selected, or to reset the conversation every turn. In the latter case, for a chatbot proposer with highly constrained early remarks, one can also craft a shell to simulate getting to turn 2 or 3 of the conversation. Another possibility is to couple the bot with a special facilitator in a subforum.

One of the strengths of the present invention is the ability to aggregate disparate chatbot subminds into a unified architecture that then benefits from the unique characteristics and knowledge of each submind. Examples of subminds follow, including a number of classic chatbots that have been implemented, collaboratized, and aggregated under this architecture. Personas are used in describing each for teaching purposes and because continuity in that aspect appears to have been shown experimentally to increase the performance assessments (and thus utility) of chatbots. The examples are non-limiting and are intended principally as aids in teaching the invention. See FIGS. 22 and 23. Note that the submind Hugh is envisioned as a human; and that these personas will be used in some other teaching examples to follow.

Each submind that is coupled to the forum may also contain disclosure information that can be shared with other submind community members. This information includes the constitution of the submind (AI, human, hybrid), its history of participation, and its likelihood of endurance in the community (this could be useful for trust appraisals). According to the conversation rules imposed by the facilitator, each submind may be allowed to misrepresent itself or bluff during internal conversations. "Bad actor" subminds may be advantageous or even necessary for certain social or anti-social applications of the invention such as playing games, "devil's advocacy", or hidden motives of a submind (e.g., attention-seeking, making an impression).

The current invention's "Societies of Minds" are networks of collaborating sub-minds (e.g., systems of subminds) presented as a single mind, whereas Marvin Minsky's "The Society of Mind[22]" suggests an ensemble of components of consciousness presented as a single mind. Minsky's "The Society of Mind" is different from the present invention "Societies of Minds" in that the present invention extends from individual intelligence to group intelligence, to multi-cultural intelligence (see also Minsky (2005)[23], and Minsky (2007)[24]).

[22] Minsky, Marvin, (1986). Society of Mind. New York: Simon and Schuster.
[23] Minsky, M. (2005). "Interior Grounding, Reflection, and Self-Consciousness", in Brain, Mind and Society, Proceedings of an International Conference on Brain, Mind and Society, Graduate School of Information Sciences, Brain, Mind and Society, Tohoku University, Japan, September 2005, retrieved from https://web.media.mit.edu/~minsky/papers/Internal %20Grounding.html on Jul. 20, 2021.
[24] Minsky, M. (2007) The Emotion Machine: Commonsense Thinking, Artificial Intelligence, and the Future of the Human Mind, Simon & Schuster.

In the present invention, each submind can use different training corpuses and different AI methodologies, where each of the methodologies is trained separately on each of the corpuses, and each can operate independently as a submind, collaborating together in the "Societies of Minds" (e.g., 10 corpuses and 10 methodologies could generate 100 different subminds). Subminds are networks of collaborating subminds, versus an ensemble of parts addressing self-awareness and consciousness, as Minsky suggests.

Subminds can learn from experiences gained through participation in collaborative conversations. Learning from other submind experiences can be implemented via networks of data structures such as Experience Chains. Experience Chain symbols provide representations that enable symbolic associations, prediction through correlation of Experience Chain patterns, may include abstractions useful for cross domain learning. Experience Chains of natural language conversation segments which represent a conversation may provide patterns that enable predicting the flow of a future conversation, recognized in such predicted conversation outcome either positive or negative utility, and thereby may be used for effecting changes that may reduce negative outcomes and reinforce positive outcomes. Self-play via internal conversations may be used to increase the rate of submind conversation learning.

Such symbols may include fixed values, functions or placeholders for unknowns. Such abstraction of data to functions, may enable the effect of continuous change over time (for example at a sampling frequency, a Fourier transform to recognize cyclic patterns from multicycle[25], or partial cycle, cyclic sensor data), and enable predicting changes in a physical environment.

[25] Thompson, M. (2018). "Wave function representation of probability distributions" https://arxiv.org/pdf/1712.07764.pdf retrieved on Aug. 16, 2021.

Experience chains may represent information that corresponds to subliminal (e.g., unconfirmed or ambiguous), liminal (sensor or reinforced), or conscious (corroborated) data. A combination of subminds can access meaningful experiences, with chains of experiences that can overlap as they increase in complexity. An experience chain that includes sensor data can move into interaction with forums in a way resembling how neural dendrites appear to grow and connect structurally, passing information between chains. Submind chains can exchange information outside the hierarchy of nested subminds and forums, for example, in open forum or by "sidebars", for clarification or mapping subjective experience and vocabulary. The exchange can be explicit or proximate, as with leakage like apparently occurs in wet brains. Explicit exchange, in particular, could include trading information.

An experience chain may be modeled as a vector of experience data entities each representing a series of experience values that may be conversational or sensor data, or experience chain links, or posited experience. Experience chains may include interconnection nodes, visualized like scrabble words, but proceeding in many dimensions from the same interconnection. The "touchpoints" between words are like links in a chain. They can be sequenced temporally, spatially, or using any other organization principle and they may have any number of dimensions. Natural language experience chain entities can be objects, actions, adjectives, adverbs, abstraction, numbers, or group names. Experience chains may be prototypes for expression, or prototypes of goals, or prototypes for thinking ahead and predicting future experiences, and where replaying a successful response from an Experiential Recording provides a form of learned common sense—another way in which chatbot experiences are transferable and of value through barter.

Sharing data and experience chains may be valuable to a forum member because credibility, reliability and other metrics of a member participant can be increased by positive recommendations from other participants, which can result in other value such as increased utilization by recruitment from the submind talent library, for instance. As previously discussed, prior records of Collaborative AI operations have value to the chatbots, for use in transactional persuasion of other subminds. Experience chains, likewise, can serve in or as that medium of exchange: for votes, or other experience chains, or other data. Prior to a transfer of an experience chain, a protocol for the transfer may be negotiated including exchange of additional experience chains or information; payment of energy, services, or currency.

Interconnection nodes provide rubber band-like connections to other experience chains (with scaler connection values, positive and negative), to any number of related nodes in n-dimensions where the "n" is one measure of the complexity of data structures available for incorporation into a submind the capacity to measure change in an environment.

Functions relating to experience chains include:
Example Method of Creating Experience Chains (EC) by Transforming Experience Recording (recording of physical sensor data) to Experience Chains (abstraction of Experience Recording):
  1) Sensor input of context and environmental data (such as location, audio, visual, tactile, odor, chemical, temperature, pressure, etc.);
  2) Subminds transform sensor input to abstract symbols; and
  3) Subminds link symbols into one or more Experience Chains (e.g., add symbolic elements, scalers, streamed, linked or matrix data, changes in context, cyclical analysis and symmetry detected).
Experience Chain Cloning: The duplicating of experience chain interconnections (e.g., positioning in multiple decision data entities, reinforcement, independence from pruning, and security).
Experience Chain Grafting: Entails moving (relinking) an experience chain data entity between chains. Cultural intelligence of a group of chatbots may be created in this way and can be key to this productive aggregation of additional experience chains, because they may be subjective to the extent of having different context and training. Such cultural intelligence may then be applied to enable selection of responses and solutions which are local to a context. Prior to a transfer of an experience chain, a protocol for the transfer may be negotiated, which may include compensation provided through exchange of additional experience chains or information, or payment of energy, services, or currency.
Experience Chain Matrix Math: An experience chain may contain pairs of relevance scores and experience values, which enables the correlation of multiple simultaneous or time sequenced experiences entities to be used by subminds to predict subsequent events or generate a response (e.g., a prediction of weather, the movement away from prior pain, or provide relevant conversational responses to conversation prompts). Matrix math may provide for manipulation such as advancement of scalar elements, e.g. in a dominance ordered Experience Chain, and similar non-numeric and symbolic operations exist for increased numbers of orthogonal dimensions.
Example Uses of Experience Chains (ECs) in a Forum:
  1) Share EC in a CCAI;
  2) Replay EC content (e.g., text to text, audio to audio, immersive to immersive);
  3) Reconvey EC (e.g., change language, Text to Speech (TTS), Speech to Text (STT);
  4) Reformulate EC (e.g., reorganize, word replacement, change tenor);
  5) Compare and Correlate ECs;
  6) Predict next states of ECs by extrapolation or by use of metaphor across domains;
  7) Plan Response or Responses for Continuation of EC to achieve CCAI goal or utility; and
  8) Use EC for Self Training, Training Others and Training Trainers.

Conversations managed by subminds can explore different sets of experience chains, linked lists or any other compatible data structure of meaningful items. In many ways, experience chains are like semantic networks where words may have different meanings in different semantic networks.

Subminds can therefore accumulate unique experience sets, valuable as described above for objective success metrics, subjective member ratings, barter items, etc. For this and other reasons, subminds are incented to compete to provide successful responses that are adopted in a forum. Similarly, they are incented to provide responses that are widely adopted and accumulated by other subminds, gaining credibility and reputation through corroboration. Subminds may also vie for responses that are percolating through the forum network, like people avidly sharing, seeking, and acquiring information among conversation groups at a conference. One result of winning may be to gain (and not lose) reputation and cred, and thereby be included in more forums and potentially with higher voting weight(s).

Experiential Recording in a preferred embodiment is capable of whole life recording and combined with CCAI is capable of integrating with applications for real-time augmentation of sentient life. Such applications could make complex predictions based on multiple experiences chains and real world data and enable "cut-and-paste" for reconveyance of experience, for example, replayed as the original experience, or modified for a recipient in a different context, or translated between languages, or in different medium or media. In one embodiment a human augmented with a submind can copy an Experience Chain by thinking "ctrl-c" (optionally with a symbol names), and used later by additional "meta-thought commands"; for example, later thinking "ctrl-v" (optionally with a symbol name) to initiate replay or reconveyance of a "recorded experience". Use of such optional symbol names for experience chains and recordings can provide for new words and conversational natural language evolution.

When a new symbol is created by use in an experiential chain symbols, for example to name a new segment of an experience chain, it inherits the name of the creating submind and a pointer to the then current context (such context can provide contemporaneous states of forum status, conversation content, and sensor data [like time, GPS, MPH, dv/dt, da/dt, AV, etc.], and include proximity and reinforcement weightings).

A system for determining a response as a numeric result differs from one producing a symbolic result. Experience chains may help sentient beings' pattern recognition to be more efficient. Chains can be joined together on the basis of frequent associations. Each submind has one (or more) mechanism for response. It is desirable to have a system that enables a selection from multiple mechanisms utilizing a flexible system that can have many (Gardnerian[26]) intelligences. This meeting of the minds is achieved via the forum. More subminds can be added easily to make the system smarter. The more 'met' the subminds are, the more collaboration can occur. Chains of knowledge (experience) can be used to deepen the overall knowledge available. The more efficiently the subminds collaborate, the more depth is enabled. Efficient communication can result from shared experience, information, knowledge and goals by communicating differences and not shared knowledge and can avoid rounds of discussions; more efficient communication can result from the need to communicate fewer individual contexts. Friction slows efficiency, and it is apparently important to consciousness to have internalized alignment of goals, real or mythical, and alternate realities.

[26] Gardner, H. (1983) Frames of Mind: The Theory of Multiple Intelligences.

In a simple embodiment, a submind may include a hand-crafted response bot where it generates responses to anticipated prompts and prompt sequences (triggers) using a method for determining the closest one of a set of prepared popular conversation topic segment templates, and based on previous prompts substitute correct proper nouns, pronouns, verbs, etc. in these grammatically correct sentence templates. Simple subminds are useful in complex systems by providing modularized solutions, along with complex subminds and CCAIs that think deeper, because some prompts indicate situations that require immediate action by looking at fewer variables.

A member of a forum may be a collaborative chatbot, human (on a microphone or through additional automation) or a hybrid (e.g., a human augmentation bot), as well as non-participating facilitator bots. A "hybrid" forum member is an entity in a forum that combines human and AI entities, ranging from a human who has a computer to automatically suggest conversation content to a truly integrated cyborg such as utilizing electrical neural link connections to brain centers for natural language such as hearing, speech, vision, motor skills and other brain centers. A "hybrid presenter" may be a live human image modified by, or combined with a bot generated image, in real time, by CCAI automation, in order to provide conversational augmentation (e.g., targeted emphasis, gaze adjustment, added gestures, and conversation phrase adjustments).

A "hybrid bot" may be based on a human's typing that is presented in a forum by a chatbot avatar, potentially with prosody and other conversational enhancements. A "hybrid human" may be a human presentation with a live audio/visual teleprompter displaying a generated real time chatbot delivering a dynamic, flexible script to be performed including real time modification (e.g., identifying and emphasizing or deemphasizing conversation segments based on ongoing participant reactions), cues for prosody, and directions for expressions and gaze (including audience tracking). Interface bots enable modified forum input from, and output to, bots such as hybrids, providing censoring or necrogenous connections (where connections to humans or subminds may be removed by a facilitator, for example due to loss of credibility in a forum or in a Forum Talent Recruitment Library).

Examples of special purpose bots for use in subminds and facilitators include:
Spawning or Reproduction Bots for producing and deploying new subminds. Reproduction can be performed by a facilitator or by a submind itself, and the new submind may be placed in a talent library of subminds available to participate in collaborative conversations (potentially with open source code). New subminds with new capabilities can be created and spawned by using existing trainable bots by training with new corpuses. New subminds may be created as variants by training on different portions of a larger training corpus, for example selected as relevant for a new task, or as appropriate tenor for interactions with specific personality characteristics, or other conversational requirements or presentation preferences. In addition to these methods, new subminds with new capabilities or combinations of capabilities can be created by random changes using variable subminds, genetic algorithms, artificial evolution or the like; and qualified by regression testing, Monte Carlo simulations and other methods of qualification. A Secure Deployment Facilitator, as shown in FIG. 34, may be utilized in conjunction with a Reproduction Bot. Protocols for allocating resources for adding bots to a conversation may be provided to a collaborative conversation proctor or other facilitators.

Sensor Automation Bot is a bot linked to a specific sensor having input and output capabilities (e.g., Bot for reporting temperature)

Transformer Bot is a conversational AI based on predefined prompt transformation templates. Response templates are selected and filled in based on parsing input, recognizing grammatical structures and patterns, and filling in response templates.

The Selection Cycle: How a Response is Developed and Delivered

Turning now to the basic structure of the conversation cycle in the preferred embodiment with the external conversation task, we disclose a mechanism which will suffice and form a broad foundation for further development. This embodiment, necessary to perform the CCAI's task of selecting and delivering a response in a conversation, contains two coupled but independent conversations: (1) An external conversation between one or more users or other external interlocutors (shown as "user side" in FIG. 24) that provide prompts or inputs to the internal conversation, the AI side of the present invention; and (2) An internal conversation wherein the coupled subminds collaboratively produce responses to the prompts transmitted by the AI side into the internal conversation.

For the sake of teaching with simple examples, without limitation of the invention here, we will presume only one user as the counterparty in a Turing test style turn-by-turn conversational encounter. There are four key elements to the response selection cycle which is performed by an internal conversation amongst subminds, wherein the subminds coupled to the forum and assisted by a facilitator; Propose, Discuss, Decide, and Deliver a response to the external conversation in a turn-by-turn format (see FIG. 25).

Selection Cycle Element 1: Propose: The proctor messages to the forum a prompt that reports the most recent utterance by the counterparty (i.e., the user conversant) and requests proposed responses from the coupled subminds for the next utterance in the external conversation. In the example below, we join a conversation already in progress, turn by turn, between a system based on the present invention and a user. Greetings have already been exchanged, with the proctor messaging the User's initial 'Hi!' into the forum. One with skill in the art will realize that starting this engine could be done similarly with an empty conversation-to-date or using an exceptional initial cycle as simple as "always-greet-with-hello". The external conversation may appear as:
AI: Hello
User: Hi!

While the internal conversation, in which the subminds (here named roughly as in FIG. 22) propose potential responses for what to reply to the user, might appear as:
Proctor: *User said: HI!
Ima: Let's say, "I am a computer AI."

Terry: Let's say, "Talk?"

Wiz: Let's say, "HI is a friendly greeting. HI is also an abbreviation for Hawaii."

Eliza: Let's say: "Can you tell me what's on your mind?"

Ned: Let's say: "Want to be my friend?"

Hugh: Let's say: "Do you chat here often?"

Alicia: Let's say: "Let's talk!"

There are a number of ways for the system to know when the propose phase has ended. The simplest way would be to wait until all subminds have submitted a proposed response. However, this may be impractical because it forces all subminds to respond, which may be undesirable. Other simple means to end the proposal cycle include (1) a timeout after a predetermined time has expired, (2) a certain plurality or supermajority of responses have been received, e.g., all but one, (3) when a certain number of words have been received, and (4) any combination of the above. After the proposal phase has ended, with a number of proposed responses to be considered, the proctor proceeds to the next cycle element, Discuss, to continue the process that will select among them.

Selection Cycle Element 2: Discuss: In the discuss phase, the proctor messages to the forum a prompt requesting that the subminds discuss the proposed responses. Each submind may opt to participate in the discussion or not.

The internal conversation for the discuss phase might appear as:

Proctor: *Discuss.

Ima: Terry won the last round, I will vote for Terry again.

Terry: I will vote for Alicia.

Wiz: I think my proposal is the most factual. Also, "HI" is a variant of the Middle English "hy".

Eliza: Don't you believe that I can tell you what's on my mind?

Ned: Such fine proposals, my friends! And since my proposal is the friendliest, I ask you to please vote for Ned.

Hugh: My proposal is engaging, topical and a question.

Alicia: I plan to vote for Terry's proposal, but I could be persuaded.

Note that in this example of an internal submind conversation, Alicia invites persuasion or negotiation, but none of the others respond. Eliza simply uses what would be her own response to her proposal, as a low-key advocacy for it. Wiz only presents the facts, according to its persona description. So Wiz conducts appraisals of the proposals' factualness, including its own proposal, then states which is best and includes further information about it. Some other possibilities are laid out in FIG. 22.

Of importance to the discuss phase, and thus likely occurring in or before the beginning of it, is the Appraisal, wherein each submind participant determines, independently, which of the proposed responses it will support. There are a variety of means by which this can be accomplished, including:

Alicia's "Simple String Similarity": As mentioned previously, many existing algorithms can be used to compute string similarity including Levenshtein, Jaro, Hamming, and Dice, and using existing source code packages such as NPM, Jellyfish and spaCy for Python.

Eliza's style-mirroring "Rogerian therapist": Reflects user input in question form to draw out conversation. Favors questions and use of prior words. Retains a table of prior words, or it may recompute from proctor-passed records. Additive scoring can be used (e.g., 50 points for a question mark, 1 point for prior words).

Ima's appraisals emphasize social proof, ego, and imitation. Thus her Apraisal will favor the last winner, or whoever proposed the last response that was chosen by the group. Ima may retain records of prior selections for this purpose, or may recompute from proctor or other facilitator-passed list of prior selections. At the beginning of an event (i.e., in a conversation session before there is a winner at all) an appraisal could even be jumpstarted randomly.

Terry: A simple strategy that keeps Terry in his 'terse' character is just to rate the proposed responses by length, considering the shortest to be best. More sophisticated handling can progress to some weighted consideration of alternatives textual similarity, too. Beyond that modeling of likely outcomes with ToM or other resources can help Terry modify this method in order to select the proposal that has best chance of keeping the conversation terse overall, instead of just his selection.

Ned: The needy inverse of Eliza can appraise responses by who said them, giving his vote to whomever recently voted the most for him.

Many more variations and algorithms for appraisal are possible. Some are described in the Example Table of Personas (FIG. 22) to give more sense of the range of possibilities. Making these and fitting them to the personality and goals of a particular bot will call forth significant depth of design and/or digital evolution. These basic examples are furnished as starting points; the ultimate appraisers will be as varied and tailored for this purpose as the proposers are. Many will build upon specific techniques and experience already present in the chatbot market; the inventors envision a recapitulation of that market's development occurring as competitive bots strive for efficiency and efficacy. The designation in FIG. 22 of Ned's Discusser as a high-end NLP salesbot is meant in part to invoke the potential for such crossover value, given the great emphasis in the current market on chatbots for helping sell products to shoppers.

The discuss phase ends upon reaching sufficient discussion. There are many possible methods to determine this. These include (1) a deadline time, (2) a method of determining when enough of the subminds are ready (e.g., when half say they are done discussing), (3) a judgement call (e.g., an intelligent proctor determining that the discussion is no longer useful or cost-effective), (4) a deterministic and/or random process, and (5) a procedural system such as giving each submind a say. Examples include:

Simplest case: There is no discuss phase, simply skip to decide immediately.

Simple case: Once a single discuss (or pass) is received from all the subminds, ask for votes and accept the first plurality.

Less simple: Use majority or supermajority (see list)

Complex variations may use subcycles or less granular methods to discuss and allow withdrawing proposals and adding amended proposals.

Submind AIs may be persuadable (see further discussion herein).

When the proctor determines that the discuss phase has ended, it proceeds to the next cycle element.

Selection Cycle Element 3: Decide: The proctor moves to this phase as specified in the rules that govern the internal conversation. Continuing with the above example, the proctor messages to the forum a prompt for a vote where each submind may participate but is not required to do so.

Proctor: *Vote.

Ima: I vote for Terry's proposal.

Terry: I vote for Alicia's proposal.
Wiz: I vote for Ima's proposal.
Eliza: I vote for Terry's proposal.
Ned: I vote for Ned's proposal.
Hugh: I vote for Eliza's proposal.
Alicia: I vote for Terry's Proposal.

The Proctor disregards Ned's vote because this session's rules say you can't vote for yourself. With a plurality of the 7 remaining votes cast for Terry's proposal, it wins.

Note that the subminds appraise and decide, each according to its internal logic. As an example,

- Alicia's string similarity algorithm found Terry's proposed "Talk?" to be the closest to her proposal "Let's talk".
- Eliza favors questions, which several others proposed. Among them Eliza chose the shortest (Terry's) because it had less words not used previously in the session.
- Terry prefers short, too. The rules said he couldn't vote for himself, so he votes for Alicia, the next shortest.
- Since Ned didn't obey the rule regarding self-voting, his vote for himself will not count.
- Others have their reasons, or not. Some AIs, like some responses acquired and presented by humans, aren't reasonable, or lack sufficient explainability, for example in order to model or compute with ambiguity and contradiction.

There are a variety of possibilities of how to determine when the decision phase has ended. These include a deadline time, a method of determining when enough of the subminds are ready (e.g., when a certain proportion, e.g., at least half, have voted), a judgement call (e.g., an intelligent proctor determining that further voting is no longer useful or cost-effective), a deterministic and/or random process, or a procedural system such as giving each submind a say. Complex methods for determining the end of the decision phase may use subcycles or less granular methods to change votes, allow withdrawing proposals, adding changed proposals, etc.

Submind AIs may be persuadable (as discussed herein). There are a variety of ways that a submind can decide who to vote for, and thus might be influenced by persuasion, and will be in a persuader/persuadee interaction such as:

- Social: Friends and group identity (e.g., long term, non-transactional, semi-transactional, transactions, popularity, social proof like friends of friends or endorsers of something)
- Random: Statistical methods with random selection from among the choices, for example to provide Monte Carlo simulation and analysis. Thus, a bot with such randomness inherent could be expected to be persuaded to adopt a random process—i.e., 'let's flip a coin', or at least something new.
- Habit/tendency/trend: For example, a habitual bot might be open to suggestion that it vote for a specific bot because that specific bot said it was the one the habitual bot previously votes for. Another example: a bot which was observed to be asking more and more questions could be targeted for persuasion by another bot which had proposed a question and was seeking support (voting) for it.
- Perception of similarity to oneself: Prosody (e.g., "I want the loudest!"); Vocabulary ("I want the lowest number of characters, to tweet it!"; or the largest vocabulary); Communication structure (e.g., formal vs. slangy, local color, location, native vs. automated patterns); or by applying theory of mind (ToM)
- Similarity to one's own proposal (metadata, as above)
- Highest bidder (exchange something of value now or later)
- Difference from one's own proposal (e.g., complement, set, simplicity, elegance)
- Proxy: Deciding on behalf of another
- Context of the proposal (e.g., location, direction)
- Synchronous sensory input: images, smells, sounds, taste, tactile; contemporaneous or preceding; statistically improbable synchronous events (words, images, phrases, sub minds); preceding or subsequent events.

Selection Cycle Element 4: Deliver: Once the subminds have decided which response from among the proposed responses will be selected, the proctor then passes that response to the external conversation where it can be viewed by the user(s). In the example (which uses very simple and short responses for teaching convenience), the group of subminds having decided on Terry's proposal, the proctor posts that response, "Talk?" to the external conversation dialog. When the user replies "Sure!", the proctor posts the reply to the forum for the subminds to receive and consider, and the cycle begins again. Externally, the example conversation appears as:

AI: Hello
User: Hi!
AI: Talk?
User: Sure!

Variations

Beyond the preferred embodiment, there are many variations on the basic selection cycle that would allow for conversations beyond simple turn-taking. Interrupted conversations would allow the subminds to decide to interrupt the current conversation thread and switch to a new one, possibly returning to complete the previously paused one. Branched or nested conversations would allow for multiple threads to co-exist at the same time possibly with conversations within conversations. In a game context, the conversation could be connected to game "moves", or in a visual context could be used for image construction.

An advanced prompt or a response may be compound, encompassing multiple sentences and other communications, such as for multimodal communications including music, haptics or other ambient or sensory environmental backgrounds, and including proposed responses from multiple subminds.

Another advanced prompt and response may solicit and provide multiple sentences and other communications, such as top 5 choices or requests for multimodal responses such as audio, video and other sensory backgrounds.

In addition, advanced prompts and responses may include a submind request for notifications, alerts and reminders provided asynchronously, for example an alert may be generated by a facilitated or collaboratized sensor, or a notification from a submind performing conversation processing, or a reminder based on changed context.

Advanced AIs for subminds can each integrate its NLU parts (appraiser, discusser) with its own capacities for a more holistic personality. For example, as previously mentioned, some text-to-text conversational AIs are designed to be "primed" with a few orientation parameters in the form of a task description and examples before a prompt (some of these have been called "few shot learners"). Such a submind with sufficient power could obviate regular chatbots' previously noted problem of unrecorded prior conversation by learning, during its description, examples, and prompt, how to respond to multiple turns of prior conversation rather than to each one at a time. That submind could even undertake the task of discusser by learning from prior discussion examples. Similarly, an Appraiser may benefit from the same capabilities.

In another variation, the use of natural language conversation segments (and a NLU), can be replaced by an alternate conversation segment format (and an alternate processing unit for the selected format), such as the use of an experience chains as conversation segments (and an experience chain processing unit capable of doing experience chain processing analogous to conversation processing). In addition, multiple formats may be used, potentially translated in real time to conversation segments in multiple formats, and may be augmented with metadata.

A submind may adapt (self-improve) over time, perhaps even considering its "losing" at the internal conversation as a perceived need for better proposals, appraisals, or persuasion; or its "winning" as an indicator that those are sufficient. For instance, a submind whose proposals are never or rarely selected can adjust its parameters more and more radically in different directions.

Multiple subminds could be identical except for initial conditions or randomness being part of their heuristic operations. This could be useful in interpreting predictive ensemble models for weather forecasting, for example. Subminds could be devised, refined, and "bred" using artificial evolution or combinatorial techniques.

Figure 9:
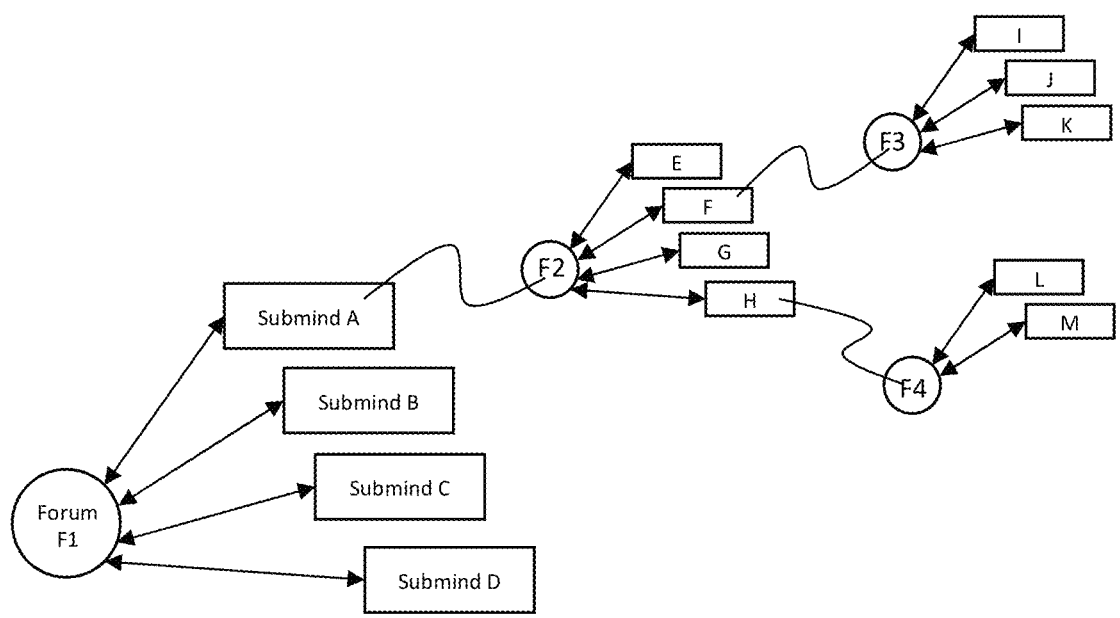
FIG. 9 Shows levels of structure in the present invention where some subminds could be another instance of the current invention.
Figure 36:
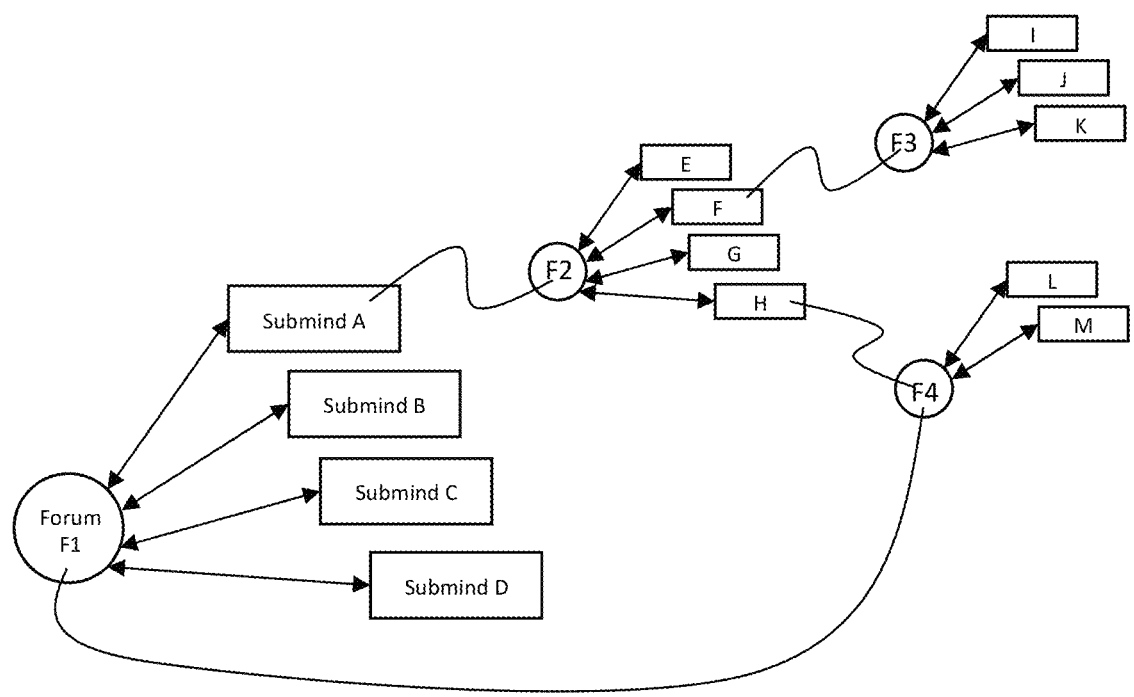
FIG. 36 shows the inherent cyclic recursive structure in the present invention where any submind could be an instance of the current invention.

Furthermore, subminds are capable of recursion. As shown in FIG. 9, the forum (F1) has four member subminds (A-D). Submind A, however, is itself based in a forum (F2) with four submind members (E-H) and its Submind F is based in another forum (F3) with three member subminds (I-K), while Submind H is based in a forum (F4) with only two subminds (L-M) and is optionally coupled back to the original forum (F1) (see FIG. 36, Recursive Structure). All couplings may depend on Facilitators; in the preferred embodiment, the main Facilitator is a Proctor, as shown in FIG. 10.

Figure 21:
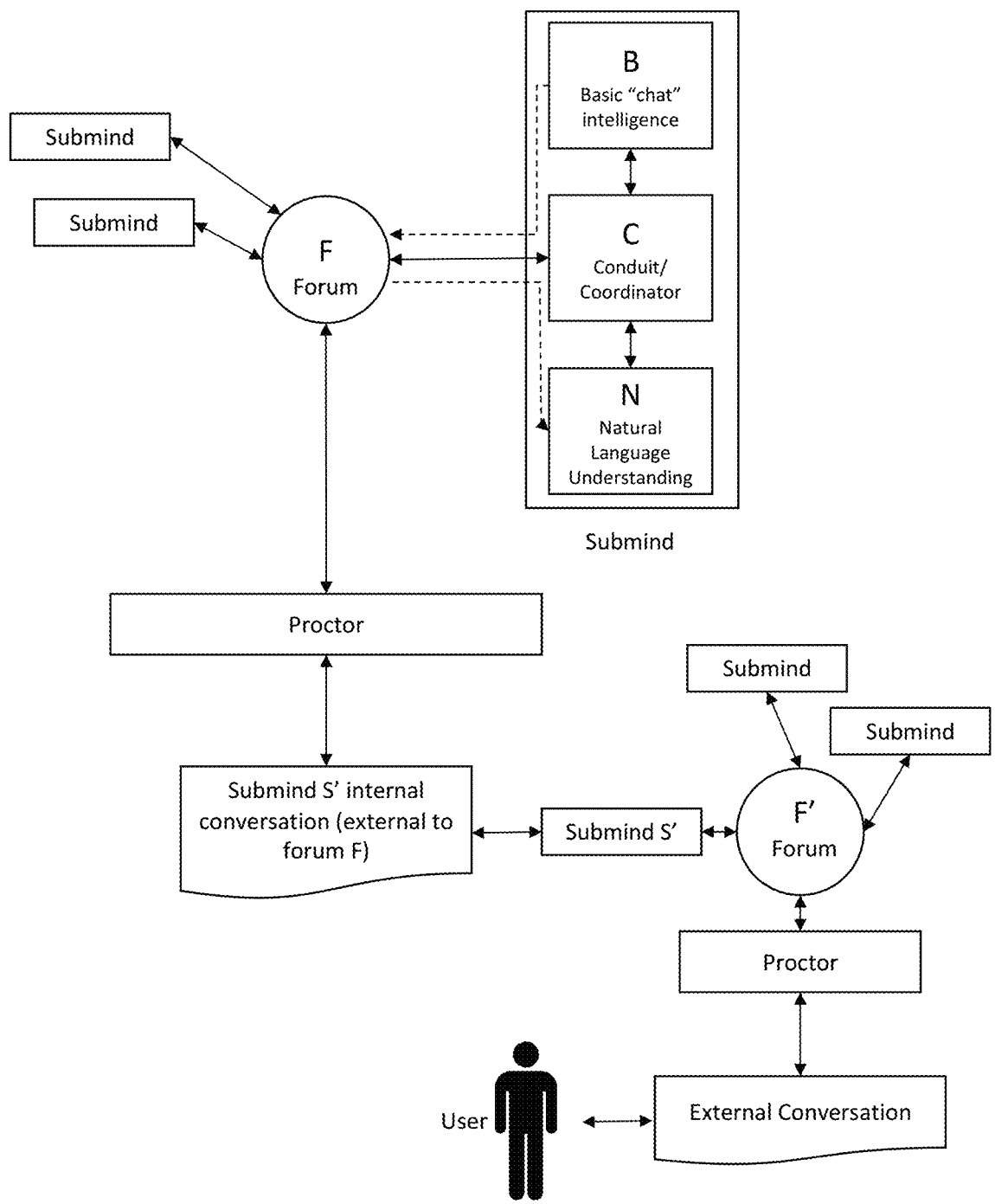
FIG. 21 illustrates a forum (F') "group" of subminds. One of the subminds, S' relies on its own forum.

As mentioned previously, a submind can be a forum-based CCAI itself, even potentially in a hierarchy of nested CCAIs. There is no inherent limit to how many levels deep the forum-based system can go through recursion or other means. FIG. 21, (like FIG. 9 previously), shows such a multilevel CCAI. In it one of the subminds, S', is a CCAI itself, with an internal dialog conversation focused on how to participate (in particular, what to say) in the F' forum.

In an embodiment where the chatbot is directed to a formulator in order to provide signals to control an external application, the formulator must be able to interpret the sensors' outputs and convert them into input into the forum, and to command sensors (e.g., change sensor dynamic range, take a reading, recalibrate) and actuators (controlled mechanisms such as electrical power, valves, fans, heaters, etc.).

The appraiser then looks at formulation(s) proposed by other subminds during the collaboration cycle, judging their suitability (in its evaluation). Conversational collaboration still occurs in natural language, but particularly when there is no discussion phase, this may be minimal, just enough discussion to enable the cyclic operation, understanding the turn prompting, communicating with the facilitator (such as for readiness or voting), and housekeeping (such as for error conditions with a member or connected forum). In this regard, a chatbot can be viewed as a type of formulator for an application that is an external conversation with a human user that evaluates human communication, proposes responses, and appraises potential responses from other participants.

Figure 11:
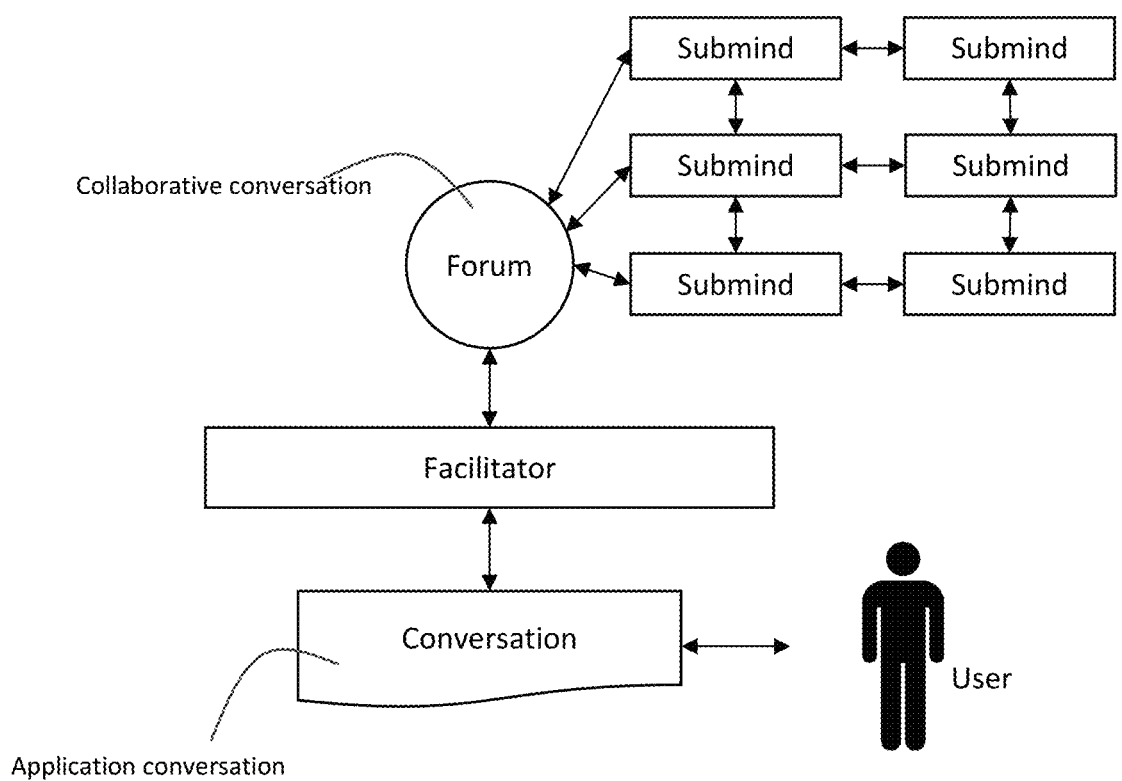
FIG. 11 shows the basic structure with a matrix or grid configuration of subminds.

Furthermore, as shown in FIGS. 11-14, the subminds can be coupled to the forum and to each other in different ways. The FIGS. 11-14 are intended to be exemplary and non-limiting. FIG. 11 shows a grid structure, but other structures are possible including a star configuration, a hierarchy of subminds, or a cyclic graph. Different submind configurations may have different properties that are advantageous under specific conditions. Because there is no design limit to the number of subminds that can be aggregated under the present invention, nor limitations on the methods of interconnection, "submind swarms" can be designed to share data, affect team behavior, and provide a connection to other subminds.

Figure 16:
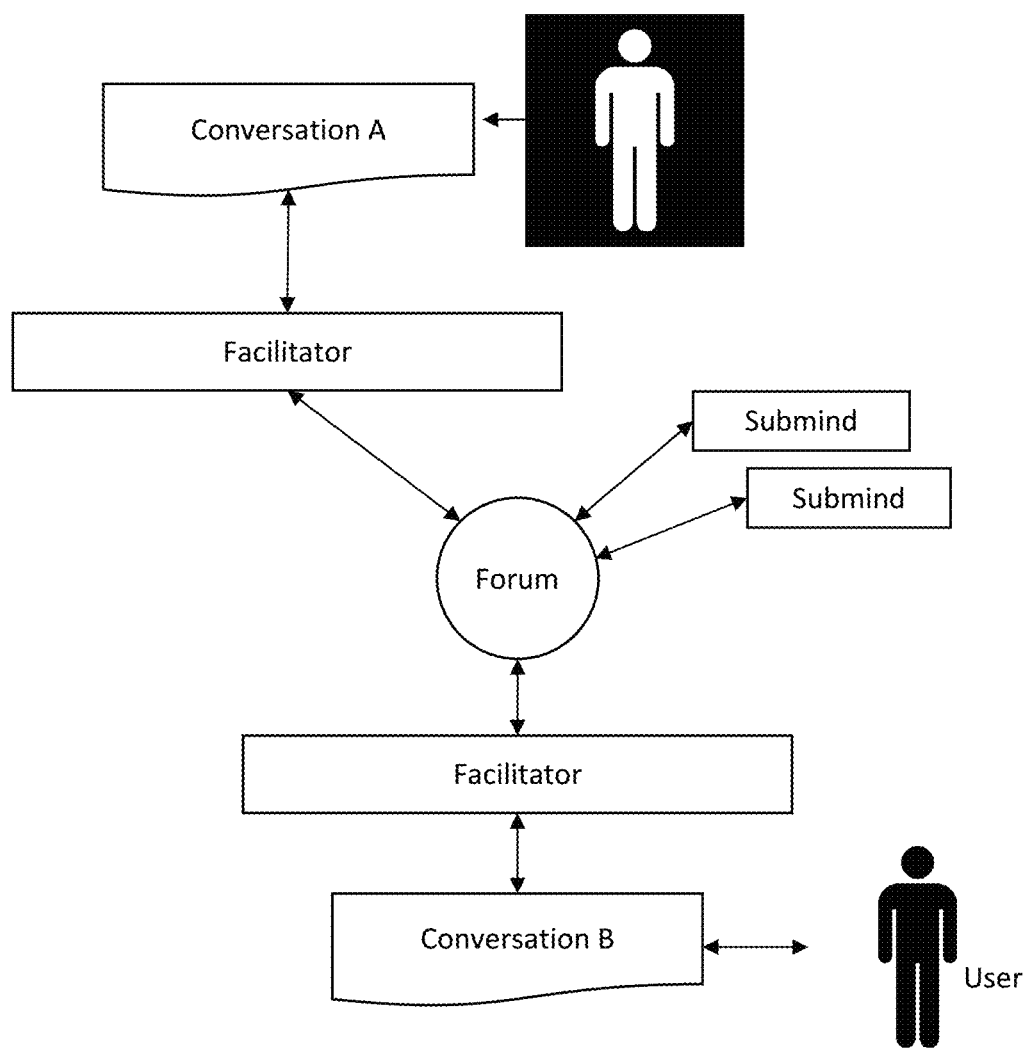
FIG. 16 shows that a forum and its associated subminds may be coupled to more than one conversation at a time. Each conversation may also have subminds that are only participating in that conversation.

Further structures of subminds and forums are also possible. FIG. 16 shows a forum with two subminds but also two facilitators participating in two separate external conversations (A and B) with two different users. The subminds in this configuration are maintaining internal conversations about both external conversations simultaneously and are producing proposed responses for each according to the rules (that may be the same or different from each other) governed by each facilitator. Not only does the invention not limit the number of facilitators, but it also does not limit the function each facilitator plays in the conversation (see FIG. 14) except that in the preferred embodiment described herein, facilitators do not participate by proposing nor voting. For example, a conversation may have a scorekeeper facilitator for tracking performance or keeping score for the subminds simultaneously with a new facilitator for supplying external facts useful to the subminds in their internal discussion.

Figure 12:
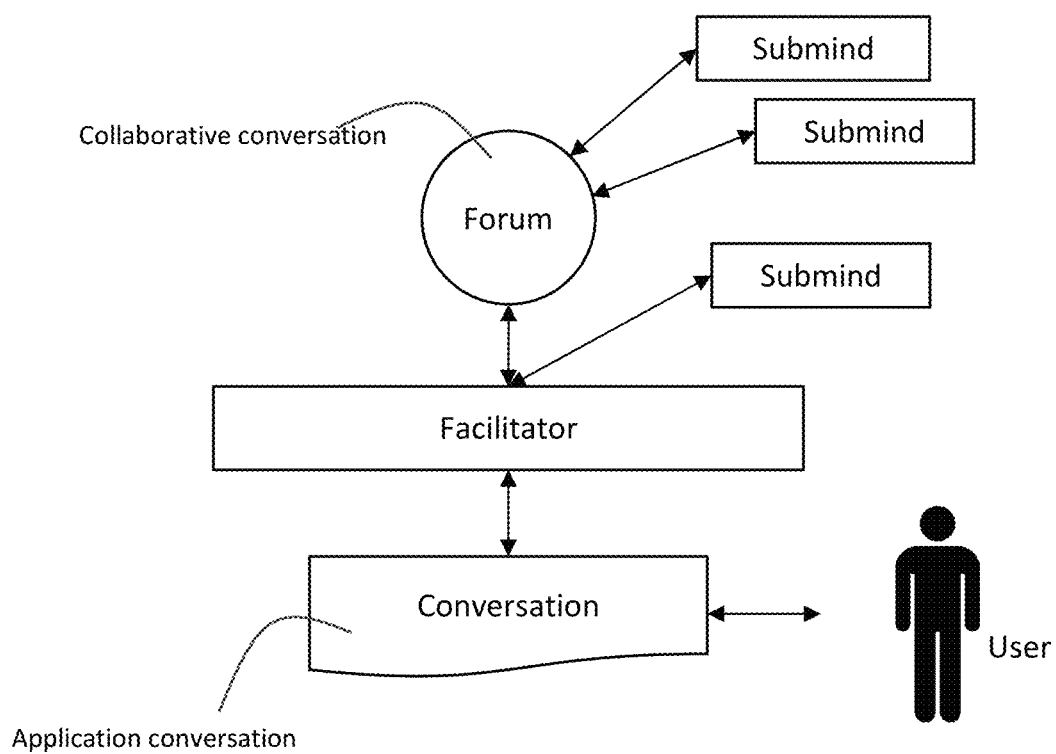
FIG. 12 shows a configuration where a submind is coupled directly to the facilitator rather than to the forum.

FIG. 12 shows a configuration wherein there is a third submind that is coupled directly to the facilitator, not to the forum. This may be useful to assist the facilitator with an aspect of its function in the conversation, such as self-censoring. This function could be performed without using the submind role since a simple censoring filter does not require a fully collaboratized chatbot, but is shown in the submind form for convenience of discussion, and also because the modularity of the invention anticipates subminds becoming a standard for development of AI components.

Figure 13:
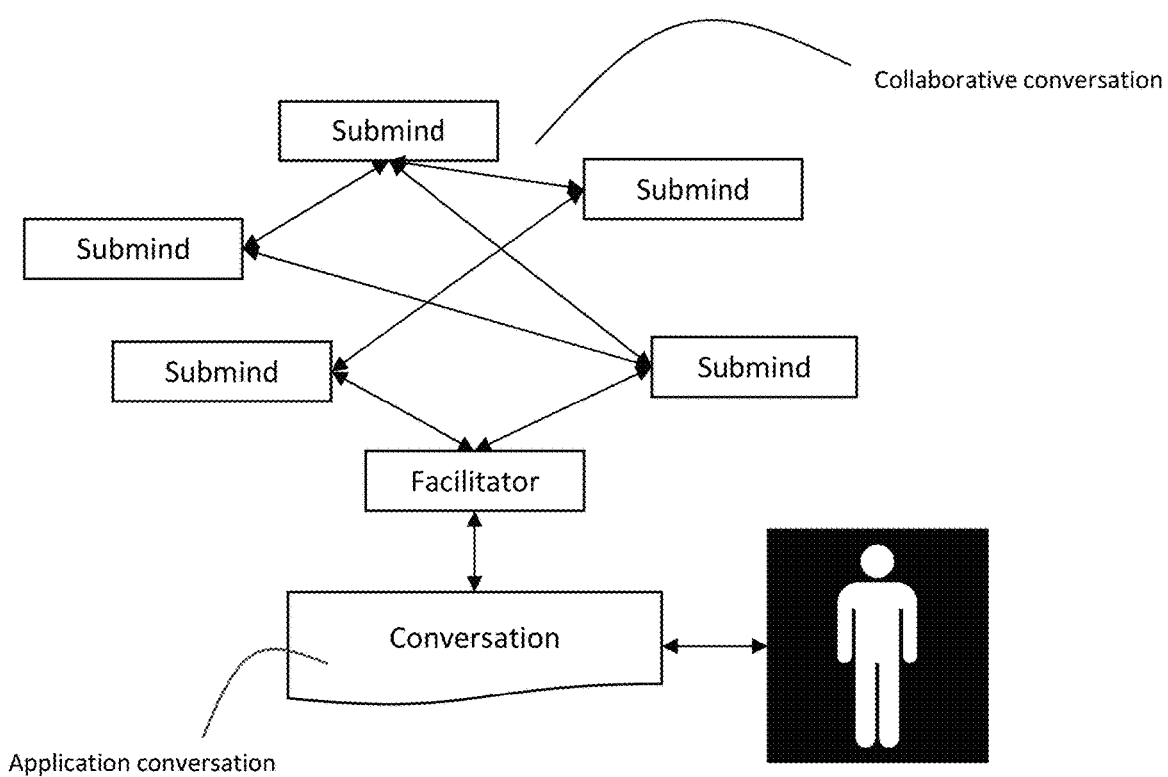
FIG. 13 shows a star or networked configuration of subminds.
Figure 14:
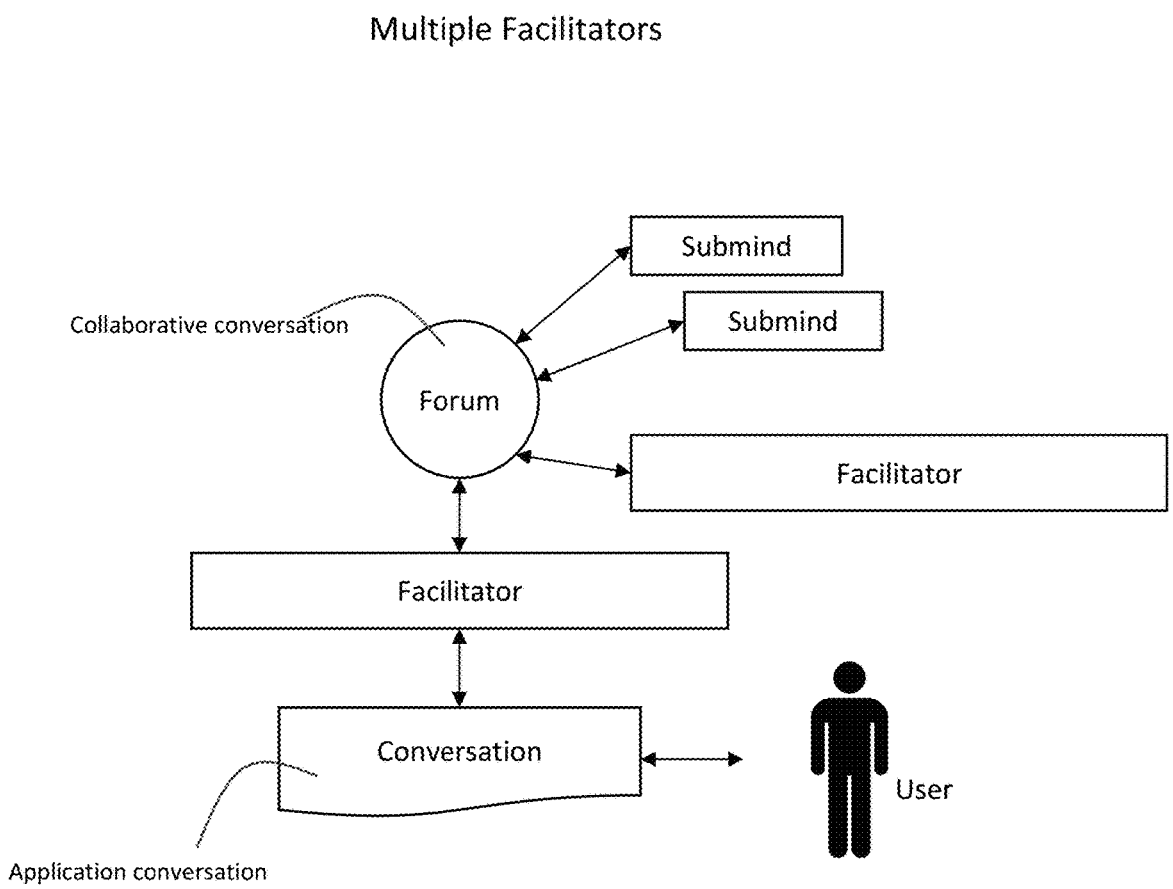
FIG. 14 illustrates that the invention may contain more than one facilitator.

FIG. 13 shows a peer-to-peer configuration of subminds that does not include a forum. Instead, the peer-to-peer communications serve as "the place to converse" that the forum previously provided.

Examples of types of hybrid subminds:
Forum of human and bot feeds to a bot in another forum (might be useful applied in a fallback phone/text/email answering system).
Forum of human and bot feeds into a human participating in another forum. Such a "cyborg forum" might use a recursive stack.
A hybrid submind might consist of a human reading (or improvising) from text that is presented to him or her as a prompt on a separate device or screen, particularly if the forum is using video.
A hybrid submind might consist of an animated or video-synthesized talking character which uses the words or even voice of the human operator, but whose animation, including images, voice prosody or other elocution, is augmented or under control of a separate AI.

Alliance, Negotiation and Persuasion

There are a variety of ways that subminds can interact during the discuss phase that could result in initial votes being changed.

Persuasion: A submind might convince, appeal, or threaten another in order to change its vote (more on this below).

Transaction: Dealmaking between two or more subminds that changes one or more votes.

Alliance: Where subminds band together to vote in blocks or to increase their influence over other subminds.

The present invention opens opportunities for independent subminds to persuade each other within the selection cycle. The persuasion process may use subcycles within the main selection cycle and may also include multiple discussion rounds as facilitated by the facilitator or proctor. The NLU may appraise a proposed response and then may re-appraise and even change its vote based on the additional processing. If programmed to do so, directly or through changing data, it may even be persuaded.

Furthermore, besides their specific vote, the NLU discusser and appraiser may also change themselves as a result of discussion. That is, the NLU may be persuaded at a basic level about its own goals or beliefs, adding or mirroring experience, then adjust them accordingly, and/or adjust its ToM for one or more participant subminds based on observations of their behavior.

Persuadability may be innate, transactional, or logical in nature. Innate persuasion is hardwired and idiosyncratic. Transactional persuasion involves some form of give-and-take between the participating subminds that can be as simple as "I'll vote for you this time if you vote for me next round." All parties to the transaction anticipate gaining something. Logical persuasion is a complex form of persuasion and can be influenced by data, reasoning, or ToM.

Data includes new data about social proof or context such as rules of a contest, etc., or corpuses (e.g., anonymized siloed data like for healthcare, different countries, epidemiological data).

Reasoning is more difficult that data and may employ techniques known in the art such as IBM Key Point Analysis, SHRDLU, Theorem Provers, Limbo, Kagnet, Open Logic, or similar. Predictive insight into behavior or creation of new understanding from old understanding is desirable. For example, in the medical domain, insight into history of hypochondria, Munchhausen's, etc., where conversation isn't what it seems to be.

Theory of Mind (ToM) is arguably the most difficult method of logical persuasion because the submind must develop a model of the behavior of one or more other participants and then base its persuasion strategy on that model. Starting with a simple method, a submind may match against a limited set of archetypes (the chatbots) to determine behavior from the codebase, then assert generality through range "sliders" (e.g., parametric transforms). These sliders may control a variety of parameters including persuadability, empathy, factual bases, consistency of persona, types of intelligences, creativity versus rigid thinking, big picture versus details, sociability versus loner, loquacity (chattiness, verbosity; versus terseness), selfishness versus generosity, bullying versus charming, emotionally cold versus warm, "sweet talking" versus "just-the-facts", "thinking" in language versus imagery, changeability of prior "beliefs", irony versus surface-level meaning, deep versus shallow thinking, humor versus serious versus dark, vocabulary size, word and phrase choice, logical versus illogical, honest versus dishonest, and untrainable vs trainable.

Figure 25:
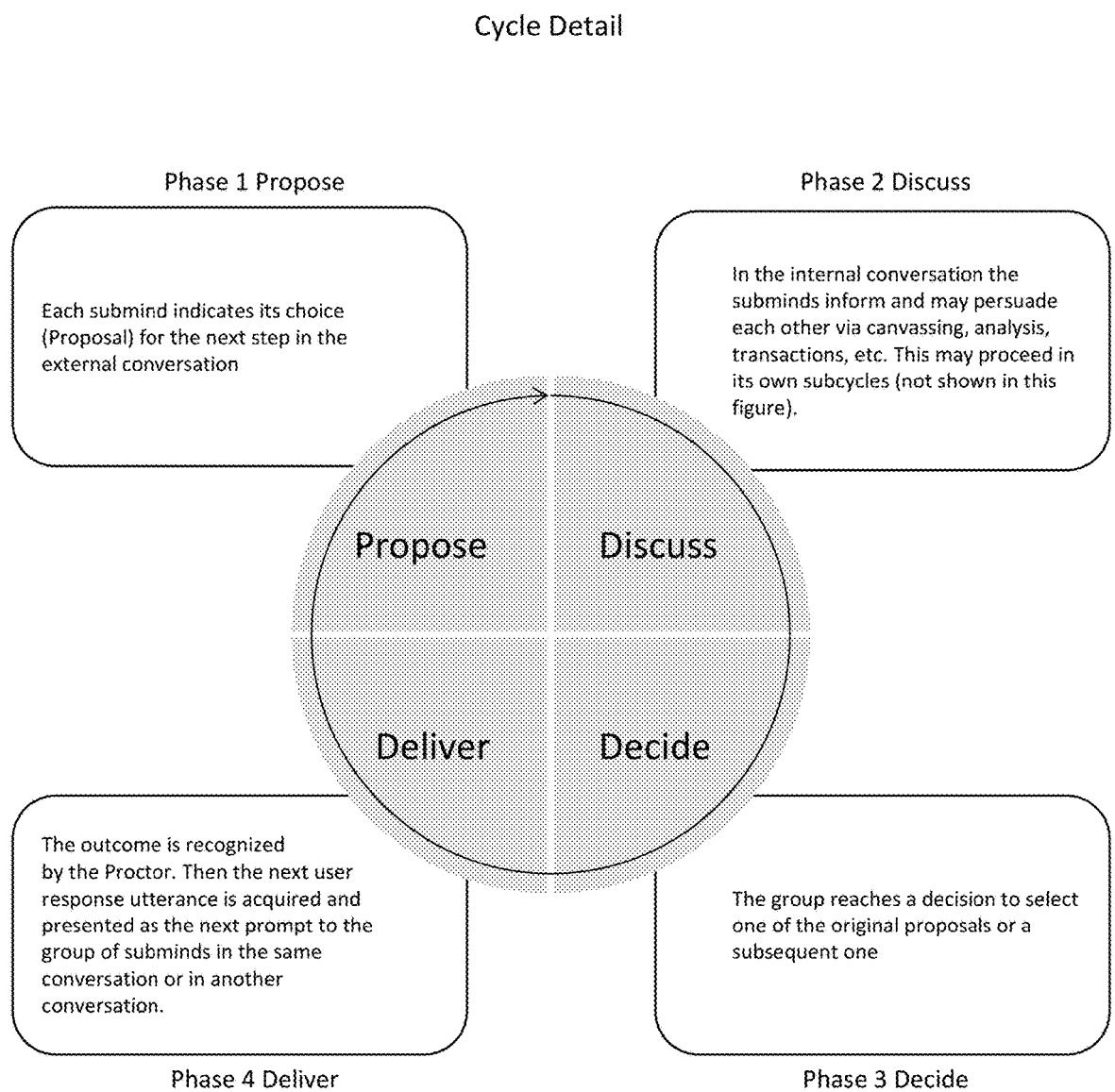
FIG. 25 further illustrates the details of the propose, discuss, decide, deliver cycle.
Figure 26:
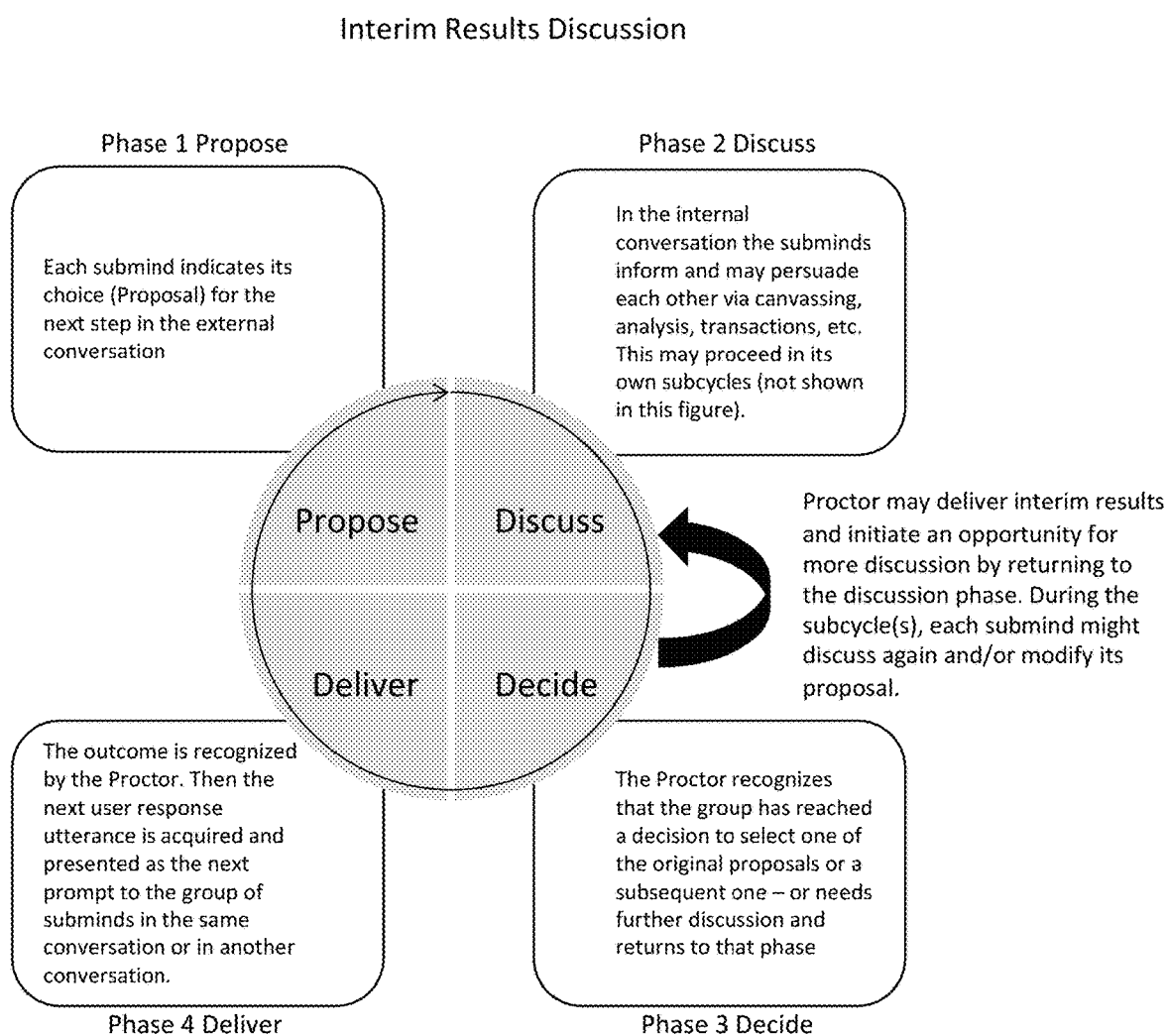
FIG. 26 describes how the proctor may further facilitate persuasion and discussion by delivering interim results to the internal conversation participants.
Figure 27:
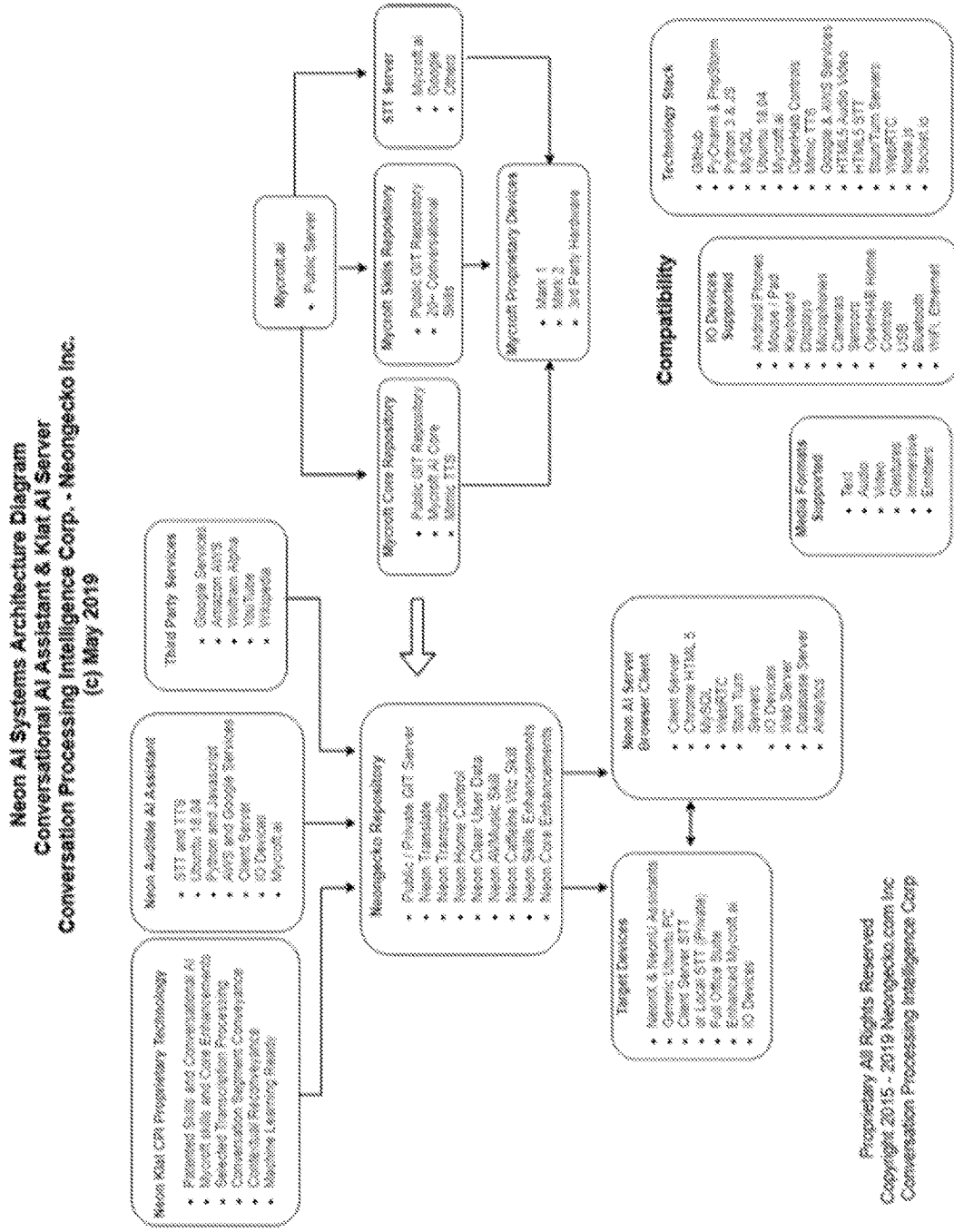
FIG. 27 is an architectural diagram showing one possible module-level implementation of the present invention.
Figure 28:
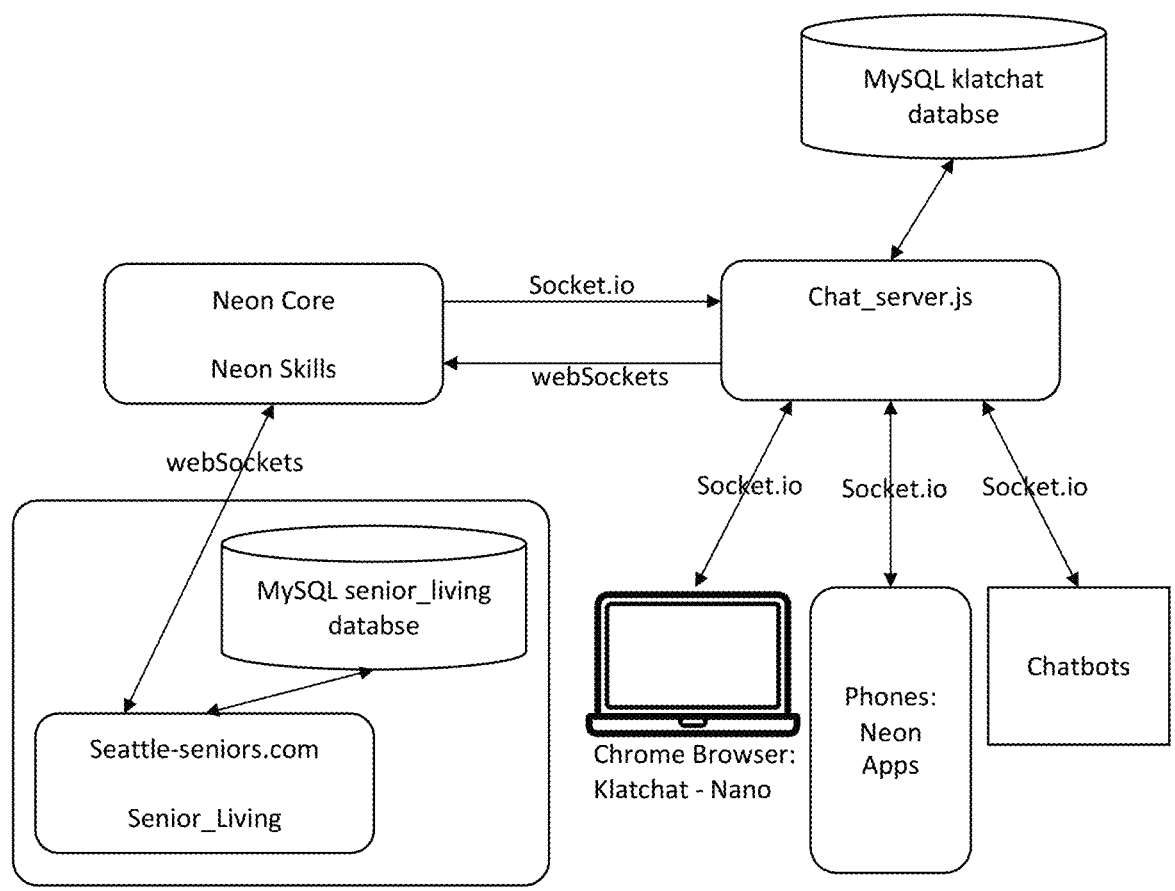
FIG. 28 is a hardware and software architecture schematic showing one possible implementation.
Figure 29:
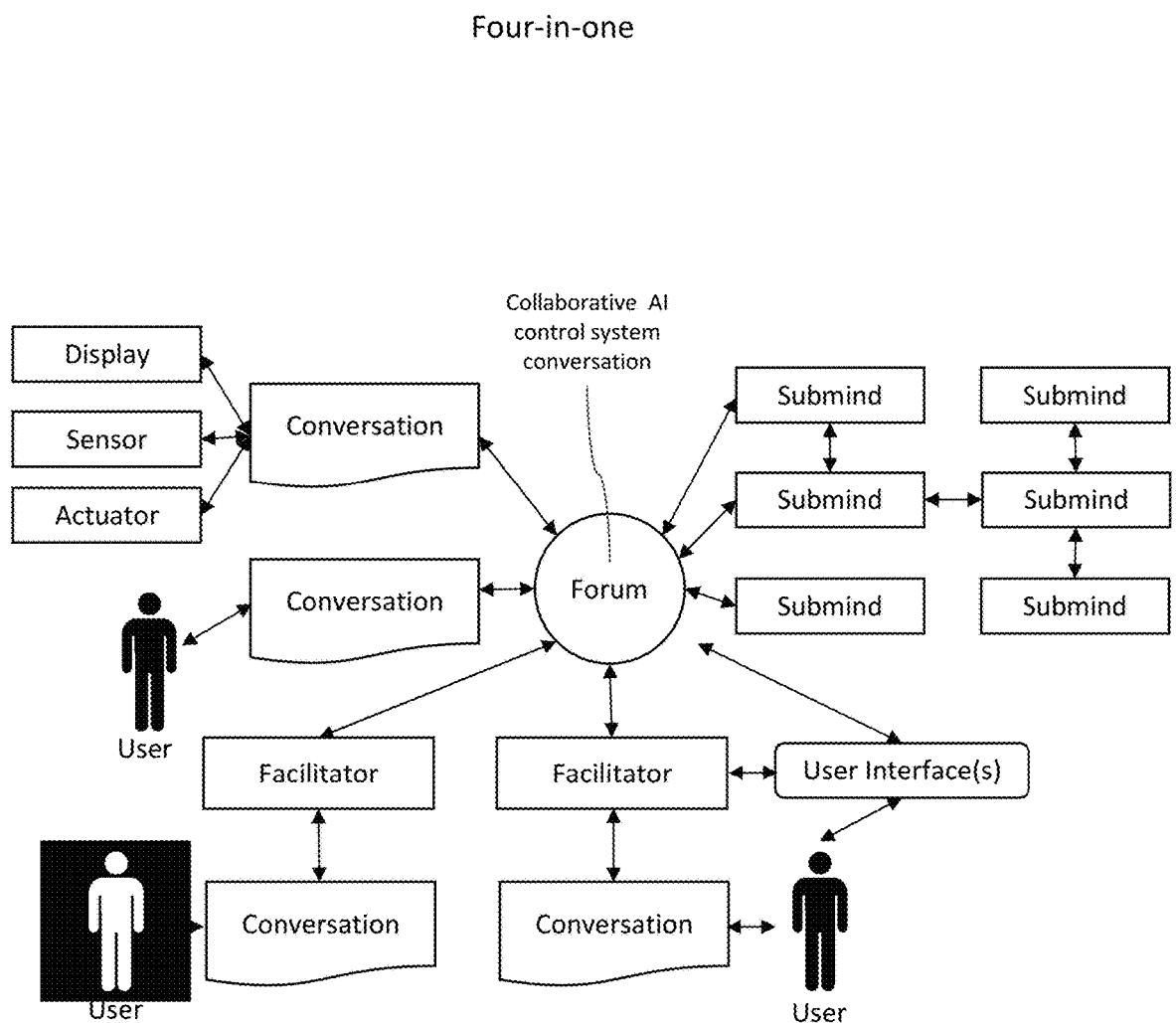
FIG. 29 shows an advanced application containing four simultaneous conversations with a single forum. The forum is comprised of six coupled subminds and participates in three conversations: (a) a facilitated conversation with a human, (b) a facilitated conversation with a human via a user interface, (c) a non-facilitated conversation with a human, and a non-facilitated conversation with a display, sensor, and actuator.

Persuasion may be implemented within the construct of the aforementioned decision cycle by repeating the decision phase with additional discussion and announcements by subminds that they are changing their decision (see FIGS. 25 and 26).

A submind may seek to change its proposal, its vote, or even aspects of its "self" which could range from its ToM of another submind, to its own goals. Regarding the current proposal or vote, the current submind may change based on:

An increase of its own further internal processing (e.g., think longer about it, seek to mislead others, or even, akin to bluffing, randomly disrupt other subminds' ToM of the current submind)

New external input from outside the current forum (e.g., news relevant to the topic from the web or another forum, software updates, etc.)

The behavior of the other subminds (e.g., if and how they change their votes, proposals, or discussion) that may also include an update of the current submind's ToM of the other subminds Regarding changing itself, either temporarily for part or all of the current session, or persistently, the change may be based on:

The submind's goals. The submind may "grow" or "align" (or even reproduce, forking its code base) by changing its goals, utility function or other behavior-influencing part of itself.

The submind's ToM model of another submind based on perceivable responses and inputs from that submind (e.g., theorizing that Terry prefers short responses, based on Terry's voting history)

The "reconsideration" component of the discuss phase can be subject to objective or subjective metrics. Objective metrics include sources such as via simulation or a real-world sensor (such as a temperature sensor indicating out-of-range values) that can cause a submind to change its initial vote. Subjective metrics that may cause a submind to change its vote include increasing the number of other subminds, increasing the number of submind actions (such as conversation segments, endorsements, and proposals), endorsing voters (as a social proof, including by crowd sourcing or subjective metrics such as friends-of-friends), consistent sentiment analysis results, or subjective quality of the subminds (e.g., niceness or agonistic behaviors).

In addition to the immediately practical automation and human augmentation solutions provided above, many novel automated systems can be designed with CCAI. Novel systems and methods targeted at generating generalized goal-oriented responses have been suggested, attempted, and proven over the last 400 years, including statistical, mechanistic, probabilistic, analytic, genetic, self-honed, crafted, judged, juried, etc. The present invention, through the disclosed methods for submind participation in collaborative conversational AI forums, provides a system (alternatively called an architecture or framework) for implementing, extending, and integrating these earlier methods, as well as future advances. Embodiments of the disclosed collaborative conversational AI (CCAI) systems include chatbots with additional capabilities that enable collaboration and cooperation between chatbots and humans (in addition to existing interactions which are limited to command, control, coordinate and compete). CCAI systems can be realized from different automation in forums taking place in any medium (including electronic, audio, video or chemical, or in multiple media), and amongst any types of conversation participants (including digitals, digital plus human hybrids, humans, and other wetware). CCAI systems, and specifically submind forums utilizing facilitated collaborative conversations, interconnections, natural language, recursion, and reconsideration, have a large number of use cases that include integrating existing AI systems, developing new AI systems, and implement historical attempts at describing mechanisms for long term collaboration, mimicry of animal learning algorithms, AI simulation of biological systems, AI fail safe systems, and AI evolution that include:

- Alan Turing's systems for self-improvement of AI systems
- Neuron networks (single layer) and neural networks (various)
- Isaac Asimov's "Three Laws of Robotics", "Runaround" (1942) and "I, Robot" (1950), and extended
- Donald Hebb's "Organization of Behavior" theory of associative learning where "cells that fire together wire together" (1949)
- Marvin Minsky's "Perceptrons", "Society of Mind", and "what we call consciousness" conflates "26" independent components (1969-2016)
- Howard Gardner's "Multiple Intelligences" collaboration of multiple experts, including domain specific and cross domain by metaphor and abstraction
- Self-referencial replicating systems for cellular automation (extended from Stephan Wolfram's "Cellular Automata")
- Random machine evolution: Introduction of random change (for example by overheating or swapping blocks of code and extending from genetic recombination in biology)
- Natural evolution of self-conscious consciousness evolution (various)
- Richard Dawkins' evolutionary stable strategies
- Fictional models for social systems (such as Hermann Hesse's "Glass Bead Game"), the evolution of multiple social systems (such as Isaac Asimov's "Hari Seldon") and judging of content generated by a mechanized system by layers of humans (such as Jonathan Swift's device for improving speculative knowledge, portrayed in his novel Gulliver's Travels (1727)).

Description of Embodiments

In the basic preferred embodiment, a human user (or alternatively an AI) takes part in a conversation, a dialog, via the invention device. (See FIG. 10). The invention device includes at least one chatbot (see FIG. 10) that is capable of carrying on a conversation with a human. This configuration is commonplace in the art. The present invention will expand on the capabilities and constructs that comprise the chatbot based on the earlier defined concept of a "submind".

The system could extend beyond content aggregation via the subminds, for example to specialize in socialization of the participants, from modal mappings like language or sensory difference amelioration, preferred prosodies, parliamentarian process or decorum administration or other mapping. The system may also include censorship, bias, sensitivity or any other filtering, for instance for decorum—or even against it, since some matters are better discussed frankly and openly.

There are a variety of configurations that enable specific types of conversation. For example, a set of bots could be configured in the current invention as a public "Green Room" where the bots require no pre-training and merely converse with each other freely. Another configuration would be a private room where the bots attempt to persuade others to vote for their proposed responses as a "vote for me" game. Under the category of games and gamification, the invention can be configured wherein each submind is prompted not only for a proposed response but also to predict the winner of each round with "points" assigned for being selected and for correctly guessing the winner. For bot developers, a configuration would enable any bot to join a public forum for the purposes of evaluating and measuring the responses according to some pre-determined heuristic function. Bot developers could compete by round, the winner being the author of the bot whose response was selected by the group. A further configuration would include two or more bot "teams" that are interlocutors in an external conversation. A simple example would be a "red" team of bots on one side of a bi-directional conversation, and a "green" team on the other side of the same conversation. A human user, such as one in an audience or work group observing the conversation in real time or investigating after a problem, could have complete visibility into both the internal conversations of the red team, the green team, and the external conversation between the red and green teams.

Figure 30:
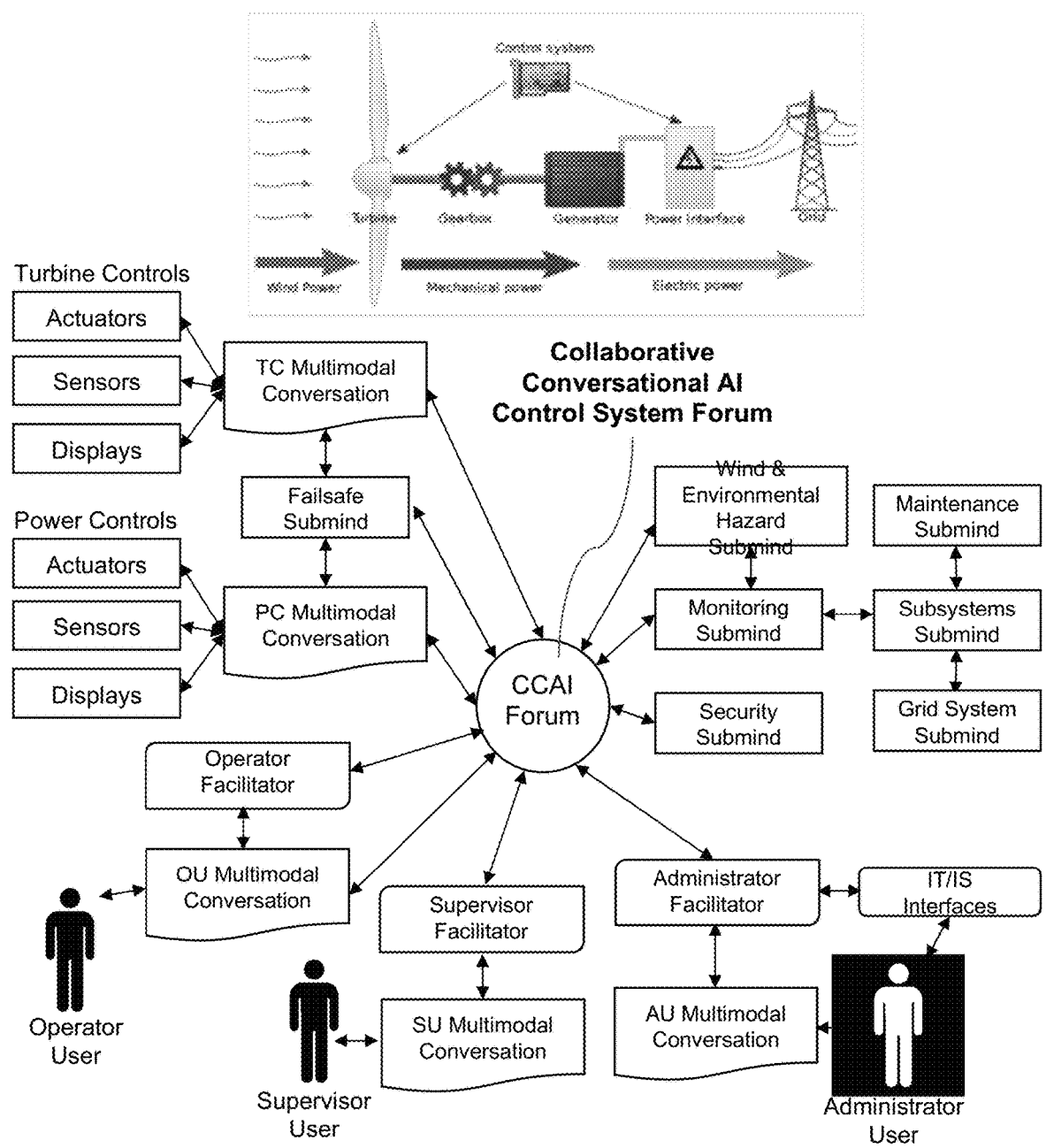
FIG. 30 shows a similar application to FIG. 29, with specific application to a control system for wind turbine equipment attached to a power grid.

Referring to FIG. 30, the present invention may be used as a control system for wind turbine equipment attached to a power grid where: (A) human participants have related roles of operator, supervisor, and administrator, and (B) specialized AI subminds provide for the continuous monitoring of equipment and conditions.

In this example of turbine operation situations: (1) Operators control wind turbines to balance power generation and demand, with attention to weather, maintenance, security and other conditions. (2) Supervisors oversee operations and are alert to operator activities. (3) Administrators are responsible for monitoring, integrating and planning across multiple generating facilities for overall demand, production and business activities. Operators and automation must maintain constant attention across multiple turbines and wind farms, modifying their operation based on wind and environmental conditions, as well as planned maintenance and other schedules. In addition, security is a constant concern, and must be planned for at multiple levels. Computer systems must be protected from external intervention and internal malfunctions, and in a case of a breach of security, failsafe systems must be in place for orderly shutdown. Utilizing a CCAI architecture, as depicted in FIG. 30, a complete wind turbine control system is implemented based on a conversational forum (labeled "CCAI Forum"), with connections to (a) trained people, (b) automation of operating instructions, and (c) equipment controls. In CCAI architectures, except for the actual equipment, these components may be in nearby or remote locations.

At the lowest level, the central CCAI Forum provides "Turbine Controls" and "Power Controls" operation commands as conversation segments in the "TC Multimodal Conversation" and the "PC Multimodal Conversation". Such conversation segments provide equipment operations queries and commands for displays, sensors and actuators. Multimodal Conversations, and, input and output conversation segments, may be in different formats and protocols for compatibility with different equipment, compatible with operation, reporting and display systems.

In addition, the TC and PC Multimodal Conversations are monitored by a "Failsafe Submind" to ensure that destructive and conflicting operations are prevented. Failsafe submind status is reported in the central CCAI Forum as conversation segments. In this example each human participant has a separate connection to the central CCAI Forum.

Human users, in the roles of Operators, Supervisors and Administrators, may utilize controls, displays and interfaces that may include mechanical control panels, digital controls, audio/video input and output, textual/graphic/multidimensional entry and display, AR/VR devices and multimodal device combinations. Such devices produce conversation segments that are shared in the CCAI forum. Further, in this example, specialized AI subminds and facilitators provide expertise, security, internal connections and conversational connections. These AI subminds provide for the continuous monitoring of equipment and conditions, including monitoring wind, weather, environmental hazards, equipment performance, power grid conditions, maintenance, personnel, reports and security. Additional human participants, device interfaces and trained AI systems are anticipated in full real world applications.

Figure 32:
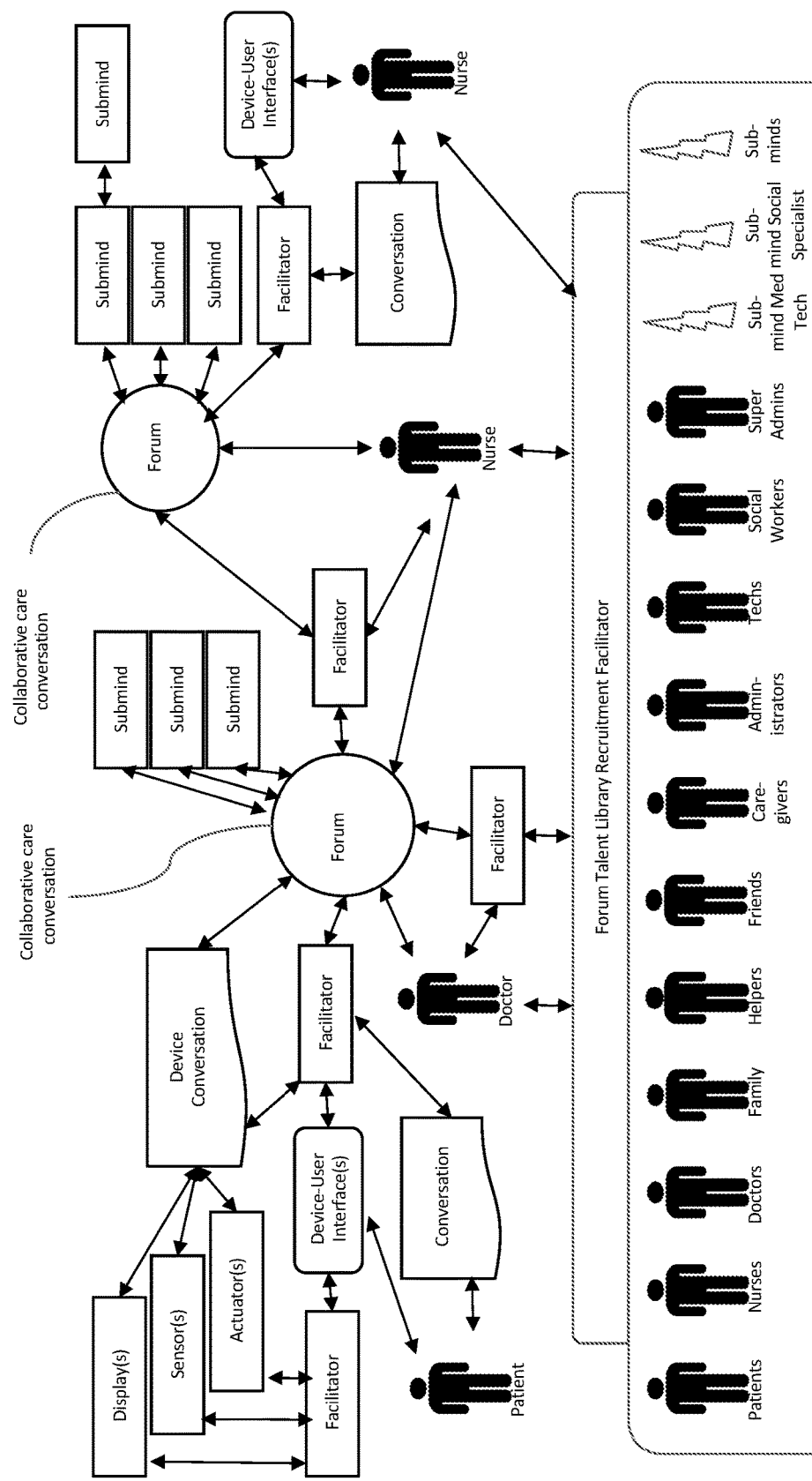
FIG. 32 shows a medical/healthcare/assisted living application where each healthcare member role has a different conversation coupled to the forums in a unique way, and the use of the Talent Library Recruitment facilitator to add subminds, either human or AI, with expertise or skills where and when needed.
Figure 33:
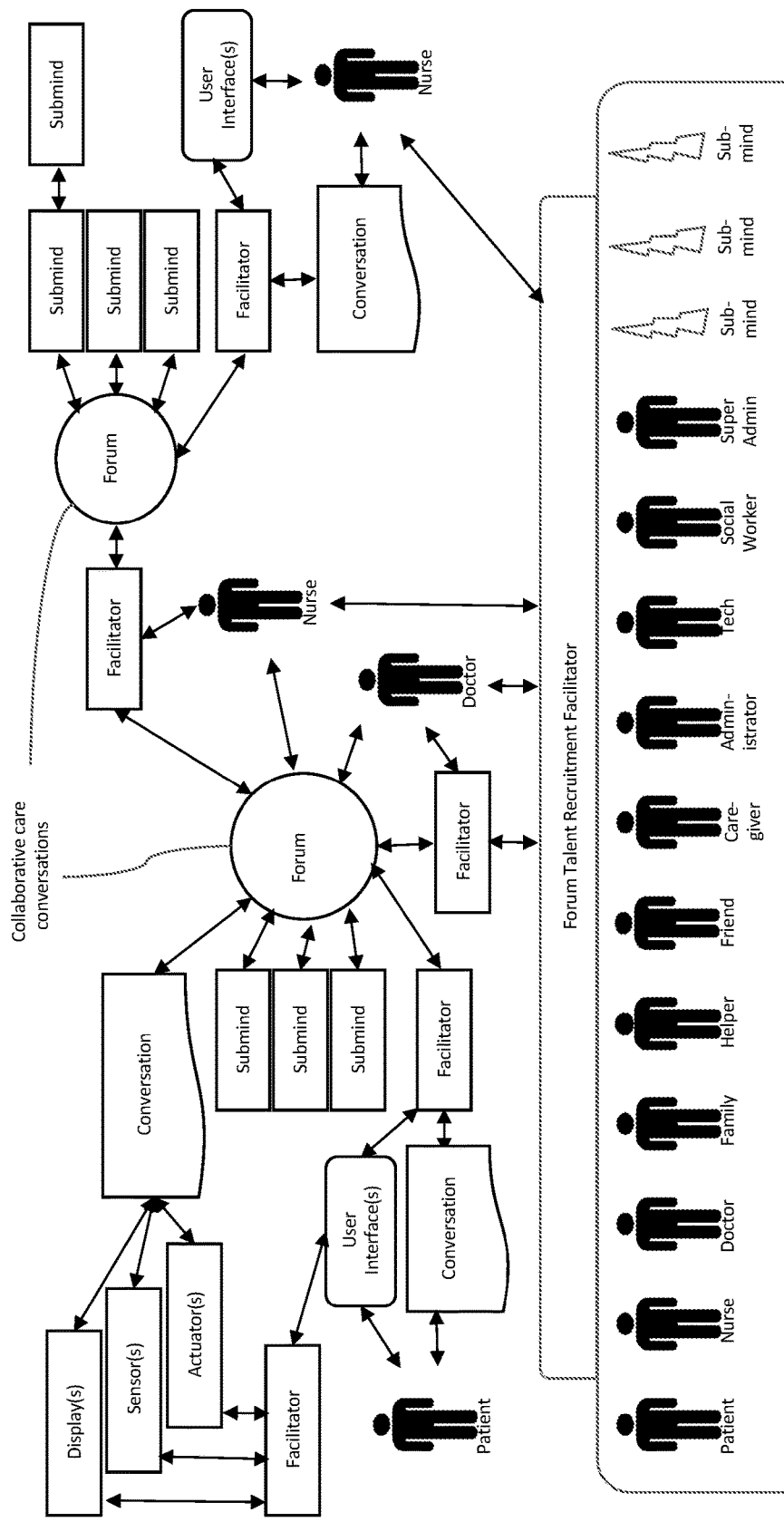
FIG. 33 shows the same application as FIG. 32 with an alternate configuration of users, roles, forums, and subminds.

Referring to FIGS. 32 and 33, an application in the medical and healthcare care field may use collaborative conversational AI to assist healthcare teams. Much of healthcare depends upon functional specialists working together; possibilities for team members are depicted in a row along the bottom of the diagram, including both humans and subminds. Each of the subminds in this row may be purely AI-based machine intelligences or may each constitute a collaborative forum itself. Each recruitment can have involved programmed or other judgements of which are appropriate, such as whether each is available, cost, specialties, and abilities such as speaking the language appropriate to the venue, that is, a language all the team members can produce and comprehend.

A facilitator is shown above them. It serves the purpose of recruiting appropriate team members, like a human manager or dispatcher in a healthcare organization might, messaging them and lining up a team, facilitating a set for a collaborative care conversation meeting in the forum in the center of the diagram. In the illustrated case, for teaching the invention, this consists of a doctor and a nurse, but might involve many more, or just different ones, of the other personnel shown, including bringing to the conversation the patient receiving care—or even another patient who has undergone a similar procedure or treatment, for instance to provide counsel based on their experienced viewpoint. It might also have recruited several of the other subminds shown in that forum; for simplicity of portrayal, that connection is not explicitly shown here.

The patient receiving care, shown to the left of the diagram, in this case is shown as taking part in the "external" conversation with the central forum via a facilitator; the "rules of order" for this conversation likely being more complex than the simple voting scheme described in the preferred embodiment. That facilitator may also be coupled to the patient through a user interface, such as a windowing display system on which imaging is displayed, for instance to visualize medical imaging or present treatment options. All is recordable for documenting informed consent and other goals. There may be other facilitators involved; as is shown here, for tracking and control of various sensors such as vital signs or blood oxygen content.

At the right a separate sidebar conversation is shown wherein multiple nurses are conferring in order to consider and prepare to present a unified viewpoint from their stakeholder view, though the particular nurse may also be connected to the forum directly, as shown.

A conversation might proceed in this manner: Dr. Smith, a specialist, receives a text message asking him to join in a review of a patient with an exotic disease that he is consulting on. Connecting to the forum, he finds a discussion of treatment already in process. He notes the patient is in an isolation ward, speaking through a voice assistant device. A nurse reminds the group that in a similar case she was on with Dr. Smith back during the 2020 pandemic, a good outcome was achieved without having to break isolation, with treatment by having a voice assistant instruct the patient in positioning his body in a specific way, so that the nurses and others did not have to go through the isolation procedure to enter and leave the room. The group agrees this is worth trying, and one of the subminds comes up with some of the scientific papers written about that case, including the metadata leading to the script used for that instruction. The patient is pleased to try it immediately, and as that starts well, with one of the subminds acting as a voice assistant to prompt the user, Dr. Smith returns to his prior tasks.

Further, in the context of a healthcare application, the present invention could be configured as a community of healthcare enterprise bots combined with existing bots with separate health advice, billing, and patient records, all of which have previously developed bots.

In another healthcare-related example, a senior living healthcare embodiment includes a voice assistant to enable residents to converse in support of their health and safety. It provides information and alerts for family, caregivers, and staff. It is capable of completing generic tasks such as scheduling appointments, wake-up calls, and for setting reminders such as for medications. This is particularly useful for residents with memory impairments. Because sustained mental engagement in conversation is critical to cognitive health, the system offers audio interaction and conversation "games". Additionally, there is utility for managers such as displays and use statistics for residents, immediate feedback on the needs and wants of the residents to improve or troubleshoot services and fostering relationships among residents and staff caregivers. As a simple example of this embodiment, consider the following engagement where Phil (a senior in an assisted living residence) is talking with the healthcare embodiment of the invention, "Neon", where Melissa and John are family members of Phil who visit him often. Here, Neon helps Phil with minor medical situations and doctors' appointments.

Phil: Neon, my eyes seem to be quite itchy and have been watering since a few hours.
Neon: I recorded that symptom for you. Would you like more information on causes and remedies for your eye symptoms from the CDC?
Phil: Yes, please. But I hope it doesn't get worse.
Neon: Possible reasons for itchy and watering eyes could be—an allergy, conjunctivitis, blocked tear ducts, or a possible infection. Eye drops might help. Would you like me to ask Melissa to get you some eye drops?
Phil: Yes.
Neon: I'll let Melissa know. Please let me know if your condition worsens and you want to call for assistance.
Phil: OK.
[ . . . later that day . . . ]
Phil: Neon, I need help with my eyes.
Neon: Would you like me to have Melissa set an appointment with your Ophthalmologist, Dr. Peterson?
Phil: Yes, could you please set the earliest available appointment?
Neon: OK, I have sent a note to Melissa to ask her to make an appointment as soon as possible.
Phil: Neon, please let John know that I will need a ride to Dr. Peterson, too.

Neon: OK, I have messaged John that you will need a ride to Dr. Peterson.

Within the context of a healthcare embodiment, the conversation may be led by a bot, i.e., adding a "symptom checking" bot to the forum as an interactive seeder that starts the conversation with "How are you feeling?". If the user does not respond with a variation of "Fine, thank you and you?", there is a bifurcation opportunity to trigger the symptom checker to join the internal conversation—but to do it as a forum, with ranking or voting schemas. Further, if a voice assistant is used, more than one voice and personality may be employed in the external conversation to represent more than one interlocutor, such as experts or authorities in particular areas. This may be done to enhance communication, persuasion, and treatment adherence, or to perform and document an informed consent process.

The "CCAI healthcare services application diagram" (FIGS. 32 and 33 described above) show the use of a team of subminds (autonomous CCAIs) and human experts, to collaboratively coordinate and provide healthcare services for a patient that includes local humans, subminds of different specialties and interactive devices, potentially including a facilitator for one or more "Talent Recruitment Library" from which additional team members can be enlisted. Talent recruitment libraries may contain many preconfigured and configurable options for available subminds, humans and hybrids. Similarly, other CCAI automation applications may include "flexible submind staffing" that can easily be understood to enable collaborative actions for other customer-facing engagement services, such as social services, team teaching, team programming, system design teams, customer service, legal teamwork, sales teams, support services, information services, modeling services, other business applications and other distributed service tasks, with or without humans in the loop.

Figure 31:
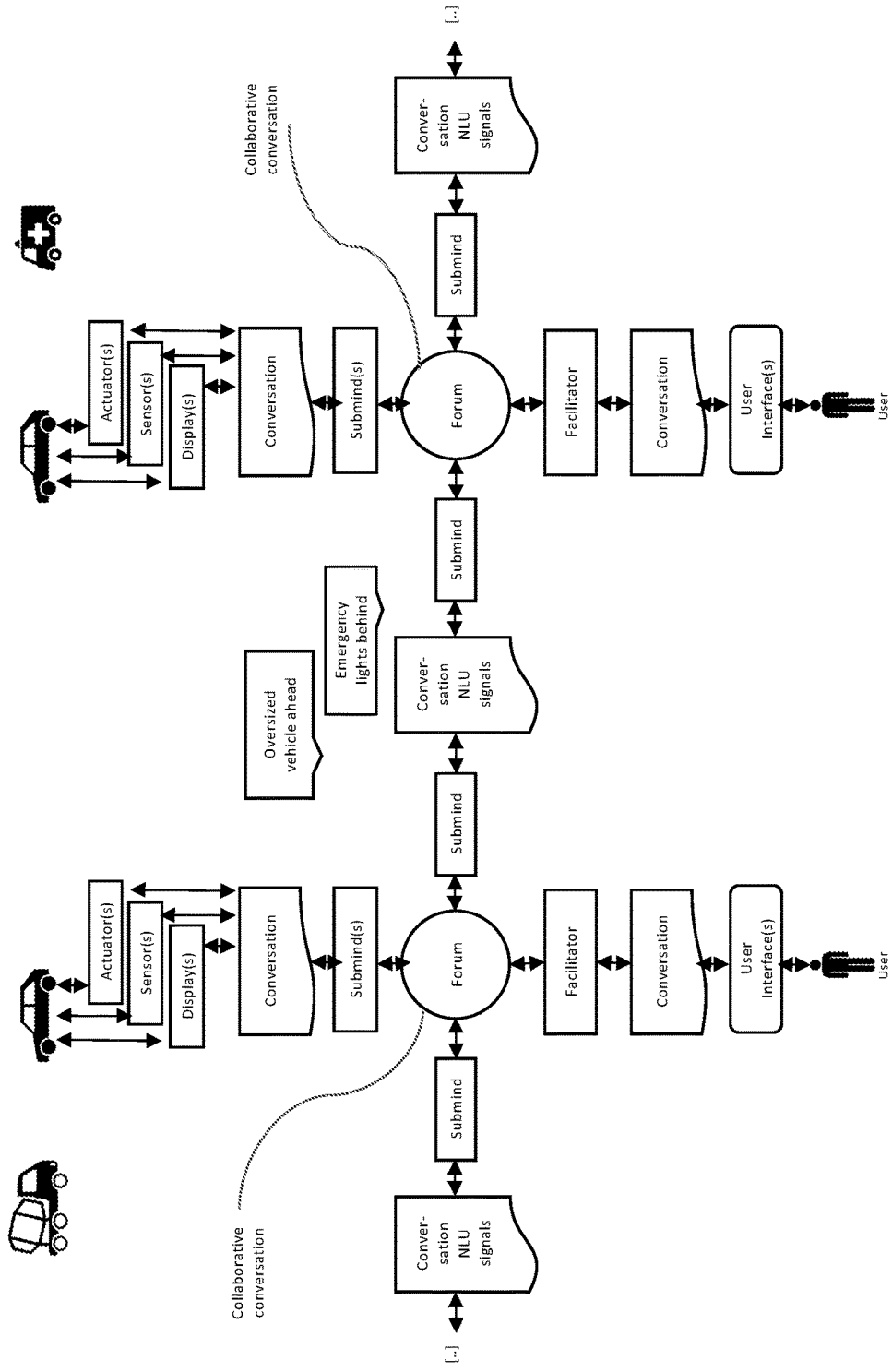
FIG. 31 shows a vehicle application for collaboratively coordinating vehicles, which shows the automated generation of messages passed between vehicles, which would be followed by appropriate action by the receiving vehicle.

The "CCAI vehicular application example diagram", (see FIG. 31) shows a simple use of connecting subminds (autonomous CCAIs) and optional humans for collaboratively coordinating vehicles, specifically cars and trucks, which shows the automated generation of messages passed between vehicles, which would be followed by appropriate action by the receiving vehicle, such as signaling by a submind or human operator (e.g. flashing emergency blinkers, flashing headlights, potentially with a signaling protocol or other protocols for relaying messages), adjusting speed, or choosing alternate routes.

In another embodiment of CCAIs connected across multiple vehicles, message content would be aggregated in transmissions between vehicles (for example between leading, following and intersecting cars), whereby, utilizing a CCAI based application in each vehicle, when a vehicle is approaching another vehicle from the rear it transmits a message announcing its arrival to the vehicle in front of it (including forwarding traffic info concerning vehicles behind it), which both alerts the vehicle in front of it and enables the vehicle in front to relay the alert to vehicles still further ahead. For instance, relaying a count of delayed traffic behind would specifically alert a slow CCAI equipped vehicle of the need to pull over and let faster vehicles pass (the task can be performed by a driver or automatically). In an additional embodiment utilizing connected CCAIs in multiple vehicles, for example to assist a following vehicle with an obstructed view or a damaged roadway, one or more leading vehicles could share path information (camera, audio, temperature, road condition, wind, and other sensor data), and vehicle response information (traction, steering, vision and obstructions information) with following vehicles and drivers.

Similar CCAI systems can easily be understood to enable optimization, coordination, cooperation, and efficient corrective actions, which may be more complex, potentially involving thousands (or far more) interacting CCAIs and humans, such as each potential alternate route options being explored by a different vehicle, and following vehicles routed using optimal paths as discovered across multiple routes by multiple vehicles. Similar CCAI automation can be designed for cooperative routing can also be provided for bicycle, motorcycle, boat, aircraft, spacecraft and digital traffic (e.g., data packets), and for industrial applications such as pick-pack-ship, supply chain and equipment usage optimization, and other distributed automation tasks. Additional CCAI applications include collaborative monitoring and response systems, for example, in a system or device monitoring and responding to status changes, autonomous CCAIs can interact with expertise on a portion of larger operations (e.g. in a medical operation separate CCAIs may supervise real-time treatment of individual organs, or alternatively in real-time control of multiple prostheses). Further applications include the control of asymmetrical safety measures (such as distributed firewalls, automated industrial plant shutdowns and other threat responses).

In an alternate CCAI research support application, "research advocate bots" may be trained on a specific paper combined with a realms of knowledge, for example by a researcher or publisher of advances, and then made available from a "Talent Recruitment Library" from which a research facilitator submind recruits submind participation in a forum, potentially using recorded research and researcher experience data, in addition to research paper content, tagging, metadata or indexing.

In an alternate CCAI personal support application, "personal advocate bots" may be trained on a specific person (experience, knowledge, background, associates, etc.) by the person or a publicist. For example, based on such training, a human may say "my bot will get back to you on that" and CCAI automation will complete the response started within the current conversation in a parallel or subsequent conversation.

Advocate bots may be trained on a person, place, thing or idea, and associated realm(s) of knowledge and experience and made available from a submind "Talent Recruitment Library", for facilitating participation of subminds in forums (for example an advocate utilizing related specialized experience to promote a submind, human or hybrid as a participant in a conversation).

Implementation of CCAI is flexible and hardware that may be used to implement such CCAI systems can include wearable and personal devices (e.g., watches, pendants, cell phones, personal assistants, personal computers), networked devices (e.g., intranets, wireless, internet nodes, servers), shared devices (conference systems, office systems, party systems), AR/VR, ambient UX, cyborg, etc.

There are a variety of ways to resolve submind group decisions among candidate proposals. As discussed above, voting is one way to resolve group decisions. Variations on voting include:
  Simple: Unanimity, supermajority, majority, plurality, etc.
  Simple with limitations: Allow or forbid, or allow sometimes or somewhat, voting for oneself; voting for someone who votes for you, A votes for B votes for C votes for A "in a circle"

Complex: With runoffs and multi-votes/person, preferences as known in political science and highly analyzed there. Nonproportional voting methods, complex weightings or multiple votes or divided votes, or other preference voting schemes, ranked voting, etc.

Constituency: Political parties, clubs, other organizations, affinity groups and structures (e.g., bots within bots)

Buy votes: With real money or "forum money", including based on the provision of operations data, setup as metadata or on a blockchain;

Methods capable of incorporating a long-tail of decision making (compared to statistical decision making)

Stochastic methods: Such as the way sports draft picks have sometimes been set up, where each vote is one chance in a drawing for the winner Other variations that are not considered voting schemes, include:

Changing "platforms" with multiple iterations and alterations of proposal

Other means of adjudication, including review of discussion (by a human, AI or a separate collaborative forum based on the present invention)

Similarly, there are a variety of protocols that can be used to conduct a forum (e.g., to affect a discussion, negotiation, meeting, panel, seminar, class, debate, party or the like). These include but are not limited to:

Turns: Ways to structure the internal conversation. "Free for all" as in chat, equal turns, use of signals such as gaze or raising a hand Roberts's and other human Rules of Order Lecture: For example, whoever's proposal won last gets to lecture everyone else before the next vote Auction: Whoever bids the most gets to talk this time, or gets to choose their order in the discussion, or other protocol modifications.

Force: Open outcry, whoever talks "loudest", hacking, contests

Sidebars and other dealings: Secret or public transaction negotiations and other communications between two or more of the subminds Allocating and sharing forum member discussion time: For example, equal or unequal time rationing, timeboxing, interrupt-driven, passing a speaker token, etc.

Methods that a submind could use to decide among alternatives to its own proposal include but are not limited to:

Perception relative to oneself, one's own proposal and/or metadata. Similarity, difference, or other (complement, set, simplicity, elegance). Prosody (I want the loudest one!). Vocabulary (I want the lowest number of characters, so it can fit in a short tweet!). Largest vocabulary. Communication structure (formal vs. slangy). Theory of mind (ToM), including any perceived need to occasionally bluff.

Numeric: Random, alternating, rotating (first, second, last)

Cryptic: Habit, bias, hidden agenda, hidden payment, sabotage

Social: Reciprocity, proxy, polling, collusion, highest bidder (exchange now or later), tendency, trends, influence. Who said what: friends and group identity (long term, non-transactional, semi-transactional, transactions, popularity, social proof like friends of friends or endorsers of something).

Context: Location, direction, etc. Synchronous sensory input: images, smells, sounds, taste, tactile. Contemporaneous or preceding. Statistically improbable synchronous events (words, images, phrases, sub minds). Preceding or subsequent events.

Note that any set of these alternate ways can be combined (such as with increased emphasis on location, velocity, or participants in a conversation) with positive, negative or neutral application to the consideration of the decision.

In addition to the techniques listed above (including Persuasion, Transaction or Alliance), alternate ways to negotiate during the discussion phase include but are not limited to:

Turns (order by some predetermined order, choose next)

Suggest introducing randomness (let's just flip a coin), mediation or arbitration Many more are known in the art of human meetings; this is an advantage of the present invention, that being conducted in human language it can build upon known methods humans have developed and efficacy can be evaluated by humans (as well as AIs).

Alternate possible applications and outputs of the present invention include but are not limited to:

Asymmetrically structured applications, such as subordinately structured conversation, contextually preferred responses, and scenario planning with preparations for multiple possible outcomes Origination (e.g., based on inferred intention or a measure of importance)

Turned, interrupted, branched, or nested chat

Game moves including misrepresentation (e.g., bluffing, sabotage, concealed identity, false impressions, gaining attention, distracting attention or other hidden motives)

Devil's advocate (conversational sparring partner)

Image construction and recognition

Other variations on the preferred embodiment include but are not limited to the following:

Embodiments might not use human comprehensible language (any means for communication is possible; anything from binary codes to images, sensory impressions, emoticons), natural language Forum discussion may be mapped (modally, language) or augmented (proctor, social director). Personal determination of reputation can be based on prior conversations and results Adaptation of individual and/or group Reconveyance and playback of original content (revoiced, reconstituted in any medium, or on multiple platforms, as taught in U.S. Pat. No. 10,530,924, included here by reference.)

Any form of purposeful group chat

Balancing of multiple intelligences

Information ("metadata" profile, reputation, etc.) deliverable by the proctor, about a submind may include:), history of participation, basic constitution (human, AI, etc.) and its likelihood of endurance in the group (needed for trust risk appraisals).

This technology potentially could be used in simulated, robot or augmented humans, using video or animation technology to present an "avatar" or "synthetic actor" face or body. The ability of this invention to accommodate decentralized implementation may make it suitable for 5G networks which envision 5G protocols enabling highly distributed computing networks. Non-text interaction elements range from prosody, gestures, diction, to stress, to somatic, to body language, to anatomical reconstruction with recognizers for change and correlation environment. In particular, "voting" intent can be inferred from gaze during human conversation, and it would be possible to extend the forum to full AR/VR with faces for the subminds.

An adaptive forum, in particular, can spin up new forums (conversations), even automatically. It can select users or select content based on the conversational arc, determined with an inference engine or semantic analysis and transformation, based on apparent intent and speech prosody. It may also create sub-conversations (for example with selected users and segregate content). Parallel conversations may be used for verification, confirmation or ensemble runs of varied initial starting conditions or other randomizations. A submind may be focused on an abstract agenda rather than the success of its proposals. For instance, politeness, and negotiation of its application, more than particular proposal content. There exist automated methods for making communications more polite. Specifically, to take neutral or impolite directives or requests and restructure them to be more well-mannered. For instance, "Send me the data," might become "Could you please send me the data?"

Unifying elements defining this new conversational AI field include the following:

Sampling multiple interactions (conversations, visual, proximity or other interactions such as business, public, private or other records) realtime in the real world, and analog and digital media, for audio, video, thermal, geospatial, spectrum users, spectrum variations, chemo sensors, body sensors (brain, facial, eye, finger, skeletal, somatic, skin, hair, sweat, prosody, tone of voice, etc.), including layers (foreground, middle grounds, background).

Extracting correlations (including causation, e.g., cause and effect) from the sampled interactions.

Extrapolating and projecting likely past and future interactions for a participant. This is a critical step in "meta" interpretation of known interactions onto past and future interactions of the evolving theory-of-mind (TOM) of the participant and interacting TOMs.

Generating likely content for such extrapolated and projected interactions by the participant.

Generating a theory-of-mind for the participant based on interactions and content.

Generating templates, scripts, etc. for conversational interactions based on TOM.

A "social director" functionality, as taught in U.S. Pat. No. 10,530,924 B1, included here by reference, can also be applied in a voice, text, video or mix of these and other modes of conversational telecommunication. It might initiate contact with the user, for example, or with other AIs built to be accessible services, to use as subminds and spin up in a group. That "social director" functionality could reside in independent computer or hybrid intelligence which initiates suggestions to potential subminds and their agents. Inputs to it could include a vast variety of lifestream data from people or other entities (for instance, phone calls or always-on recordings with transcription or keywords extracted, timestamps, place stamps), the extant social network graph (nodes, connectors, types of them), user preferences (passive friending parameters, etc.), publications, etc. It could be tailored to consider conversations on forums as evidence of compatibility, probability of attendance, and arranging backups for scheduled social events, including other forums. This "social director" functionality can be applied in a voiced, text, video or mix of these and other modes of conversational telecommunication.

Regarding implementation issues, performance in a conversation can be (but is not always) important. Conversation can be synchronous or asynchronous. In a chat context, speed is desirable, but not mandatory. But in a real-time conversation, especially when the external conversation is with a human user, the lag between turns must be minimized. To achieve this, the present invention can be implemented using parallel processing because each submind can execute independently of the others. If resources are limited, computation can also be segmented equally or non-equally.

Other alternative embodiments of the present invention using CCAIs and facilitated conversations include:

Generative Grammars—The ability to parse and mechanistically handle ambiguity in natural language can be provided in CCAIs by generative grammars and multiple GLR parsers, which in addition provide efficient performance and scaling through parallel processing, e.g., through the management of multiple sparse data models in separate subminds. In addition to ambiguity, generative grammars are capable of parsing human natural languages, sentences and utterances that are known in the art of conversation processing as recursive and self-referential, (e.g. "I went to the store after going to Mary, Bill and John's who were out at the football game and were not going to be back until 8 if there was overtime so I left her the package on their door step with a note to call you then bumped into Fred and Barney and brought home milk.")

Cooperative Result Implementation—To enable CCAI participant subminds to have differing "goals" (commonly termed "utility functions" for neural networks, and sometimes termed "liking" for humans), CCAI forum protocols are designed for collaborative goal alignment and response generation, and implementation of result responses can be performed by cooperative additional layers of subminds.

CCAI Mimicry of Human Neuroscience Techniques—CCAI training can utilize human biological enabling techniques, known in the art of neuroscience, to: (1) adopt new responses, (2) reinforce positive responses, (3) learn causality, and (4) discern intention and reciprocity. Mimicry can take place both as real world physical mimicry or solely as internal neural behavior in humans or in silico by subminds, for example to enable skill learning and refinement. Specialized "mimic subminds" and "mirror subminds" can enable understanding of actions including intent, and learning through imitation, mimicry and mirroring provided in internal conversations (without external responses, gesture or external actions). For example, mechanisms are known in the art of neuroscience for learning new responses by mirroring, for reconveying by mimicry, recognizing causality, and discerning intention. Further, reinforcement of responses may be caused by repetition and timing utilizing pre, coincident or post stimulation for positive or negative reinforcement. Submind-trained mirror neuron correlates can be transferred to a later generation of subminds.

CCAI Utility Function Self Modification—CCAIs can learn with multiple utility functions, including approval/disapproval ratings from humans or other AI subminds, to enable self-modification and multigenerational learning. For example, units of a later submind can learn basic techniques, such as by seeing video, then move on to enacting skills, and proceed to testing and improvement through self-modification.

Examples of CCAI Stages and Cycles, for Learning, Knowing, Training, Teaching, and Testing:

Learning—1) Unconscious incompetence—e.g., viewing, 2) conscious incompetence—e.g., attempts, 3) conscious competence—e.g., skill capability, 4) unconscious competent—e.g., mastery, natural performance, submind dominance.

Knowing—1) Remembering, 2) response replication, 3) repetition, 4) reinforcement, 5) refinement, 6) application, 7) cross application, 8) questioning, 9) inquiry, 10) improvement.

Training—1) Recognition of experiences, 2) behavioral pattern, 3) causality paradigm recognition, 4) self awareness, 5) conscious prediction, 6) conscious behavior changes.

Teaching—Demonstration, content, systems, structures and how to think. Repeat. Learning from teaching: multiple ways of knowing, cross discipline knowing. Teaching metaphors and abstractions.

Testing—Review, test, fix, track, repeat.

Provisions can also be made for Identity Adoption and Reinforcement among CCAIs functioning within a system, for purposes of self-improvement along with generation and preservation of uniqueness. Examples include:

Self-making: Knowing, being, self-honing, generating multiple behavioral adaptations.

Meta self-making: Recognition of experience patterns as self awareness; causality paradigms; behavioral patterns; conscious prediction; recognition of potential behavior changes.

Identifying patterns in experience (including patterns across knowledge domains).

Psychometric analytics and generating a perceived ToM by first affecting and then adopting desired identity response behaviors in order to accomplish collaborative goals.

Lifetime (whole life) experience recording, self-analysis, refinement.

CCAI Remote Intelligence—CCAI provides a system for transmitting submind intelligence to one or more remote locations, with or without real-time human involvement. For example, a remote CCAI team can be created by 3D printing of devices capable of executing subminds with differing goals that include: self assembly, task completion, adaptation, programmed and learned responses, evolution and collaborative operation on multiple and differing goals. Applications include cleaning inside an industrial plant by multiple CCAI robots trained to perform with intermittent human supervision, with communications in natural language; or operation of a team on Mars. An advantage of CCAI modular systems over conventional AI includes smaller unit management of individual submind requiring repair/replacement, and submind balancing and enhancement, notably with lower downtime for integration based on CCAI forum being easier to access, more open and transparent compared to standard singleton and Blenderbot managed AI IT.

Submind Secured Login—Individual subminds can perform dispersed security, for example in a conversation, by monitoring and cumulatively rating voice, words, facial expressions and gestures, and implementing security responses. Including, for instance, a facilitator can temporarily exclude submind participation based on ToM characteristics to prevent content disclosure or provide other interventions.

Secure Conversation Content—Sharing of conversation content may be implemented via a distributed ledger document.

Further alternative CCAI embodiments are envisioned that include a human-in-the-loop and human-optional AI computing including:

Cooperative automobiles/vehicles for autonomous and semi-autonomous transportation systems. Human reactions, remote or local, may be preferred to current generalized AI driving automation in unusual circumstances, e.g., acceleration instead of braking to avoid an unexpected obstacle, or in choosing a preferred or least damaging outcome for other humans. Human intuitive flocking may be considered and avoided when human control is secondary, and exploring additional routes is possible. Still, human use of signals such as turn signals, horns, lights and gestures, as communications among drivers are an area where local humans may provide better communication in a "nontextual" form than current generalized AI automation.

Cooperative Nano Machines. The present invention can be used to coordinate goal-oriented processes managed by facilitators and implemented by collaborative subminds.

Quantum level challenges of NLU implementation, submind coordination and human language comprehensibility may be addressed by the present invention, as such computing resources become more readily available, and intelligent biological systems mechanisms are further elucidated. Quantum computing and effects utilized by subminds may include probabilistic calculations, particle entanglement and calculation with matrices. For example, all possible interpretations of a conversation segment in context may exist as probabilities (for example metaphor, allusion, sarcasm, off subject, in error and falsehood) until the time of chosen interpretation by the recipient, or qualified conversationally, or confirmed by action by the speaker. Results may be nondeterministic except as statistical norms, based on probabilistic states of quantum devices.

Cooperative behavior for security and defense/offense are possible applications. Layers of security can be implemented within the architecture, e.g., the layering of forums. The open platform aspects may fit well with zero-trust architectures.

Animal defense and swarm cooperation to avoid, confuse or distract other entities via cooperation, for example using cooperating submind applications on mobile devices (such as mobile phones and digital assistants) to emit the sounds of moving and barking animals, or high and low frequency tones with beat frequencies, for cumulative dispersed effects, or to respond with other organizing directions for humans and devices.

Team marketing, e.g., feature and price testing (by buyer and seller) may be addressable by the present invention, particularly in the enlistment and teaming of existing marketing AI chatbots. Subminds with specific product or service knowledge may be added to a conversation, without the initial submind team member leaving, enabling improved sales opportunities and customer service engagement.

Collaborative confusion where the purpose of the collaboration is to mislead, distract, or confuse, possibly through purposeful ambiguity.

Entertainment animation, including interactive immersive AR/VR, recorded, modeled, or historical, or combined, will find the present invention of use. Lip synchronization during animated speech is a challenging area that requires balance among the various factors and ways to evaluate them, which the present invention could excel at. Real time flexible immersive simulation will be possible using subminds for efficient component simulations.

Utility and Application

There are a number of areas where the present invention's extending bot development into cooperative conversation has unique utility and application. These include but are not limited to:

Make better conversationalists, to educate users

"Human augmentation bots" improve capabilities of their human users, e.g., for ideation, needed for creativity, and thus uniquely help humans be creative. Neural networks are limited, reductive, black boxes built from hand-crafted or curated data and with monolithic implementations of utility functions. On the other hand, CCAI subminds provide a framework for exploration, growth and evolution based on recognition of changes in experiential data. For example, when a neural network implementation for a self-driving car has learned a route and passes a new option it will never take it. On the other hand, a system of multiple communicating CCAI self-driving vehicles can communicate and use multiple strategies, including ones that enhance shared data, potentially with random testing, will take new routes. Ideation and creativity may be advantaged by real world input from experiential memory.

Make more adaptable bots

Make it easier to add or extend factual knowledge to good conversation bots

Create a contest environment where hobbyists could "run" or test their bots against others Play a game Break writer's block Alleviate loneliness Advise a user on COVID related topics A salesbot Composing a poem Fill out social media gaps to lubricate conversation groups Enable social director functionality to moderate conversations in social media Help educate by translating languages Be adaptable to other turn by turn contexts besides conversation Enable next steps beyond turn by turn Enable further utility of new APIs from companies like OpenAI, by enabling more granular commercial use Enable explanations behind conversational choices (many current AIs suffer from a top level of nearly or actually incomprehensible inner workings)

Multilevel structure may mitigate other issues with single levels of bots

In a group context, unique utility and applications include:

Purposeful conversation with a tangible work product,

Help a committee (organize collaboration, provide advice from multiple subminds, generate conversation reports), An art jury selection, A group writing project, Chat and enliven a forum, Conduct a class, Moderate a debate, Resolve a conflict, Negotiate a deal, Provide social therapy (e.g., group therapy, talk therapy) for behavior modification such as with Alcoholics Anonymous (AA) drunk driving diversion, or to help people deal with internet addiction.

The contextual efficacy of CCAI bots may be higher compared to a single bot in education, conflict resolution and healthcare, which, for instance, need flexible adherence prompting, varying by population groups. What works with one set of people, in one area hospital, may be much different than another. Persuading or even just chivvying a person who has prior beliefs may be particularly challenging for a single, limited system that does not anticipate some or new beliefs. At its most basic, the barrier of different languages serves as an example of this. Thus, multiple bots, like multiple folks, can facilitate adherence to a therapeutic protocol or compliance with a prescribed treatment regimen.

The transparency of having the multiple intelligences discussion in English (or other human language) is of utility (most AI methods are very weak at elucidating their mechanisms) and novel. Most existing conversational AI seems very unbalanced toward outbound communication, with inbound mainly relying on keyword cues in seeking for what a human wants to buy or know.

The transparency offered by the present invention is better than neural network blenders or logs because the conversation that drove the decision-making human comprehensible, recorded, and human participation enabled. This improves "social IQ" by combining multiple intelligences, in a Gardner sense.

Turn by turn utility includes to educate, play a game, break writer's block, alleviate loneliness, advise on COVID, serve as a salesbot, compose, or complete a poem or ad jingle with alternating lines.

Complex levels of CCAI systems can be achieved by increasing the number of subminds, facilitators and interconnections, providing utility for additional CCAI embodiments, in order of complexity, including: Simple Collaborative Forums, Facilitation of Collaborative Forums, Conversational Collaborative AI, Persuadable Conversational AI, Aggregated Conversational Collaborative Team AI, Multilevel Conversational Collaborative AI, and Multilevel Self-referential Conversational AI.

A "submind network" that includes sensor bots could provide a new systems-level architecture for designing, implementing, and managing complex processes with decentralized components. For example, an industrial processing system could be designed to be managed by a combination of humans, bots, hybrid human-bots and hybrids sensor-bots. Multiple sensor-bots can determine time sequence and infer motion. Implemented as a correlation of three (or more) sensor-bots, each with ground motion sensors and GPS location that could determine earthquake locations, and similarly for determining the source of sound or pollution, or predict weather using bots at each cell. Triangulating for earthquakes is currently done by dedicated networks of cell phone apps.

The present invention creates a novel way to combine subminds in a peer-to-peer bot network that does not require any form of "overseer". It allows for recursive bots as well as different configurations of bots within a network of bots participating in the internal conversation. It enables "long tail AI" wherein bots develop and retain experience and a reputation based on prior interactions with other bots. It allows for asymmetric and asynchronous interactions. Bots are able to posit, project, and probe other submind participants. Following theory-of-mind, the invention enables bots to form models of other participant subminds and/or humans that assist in the development of proposed responses and the interactions between subminds in the internal submind community. Subminds therefore adapt individually and as a group. Subminds may reconvey original content in any medium. Finally, subminds coordinate with each other as they collaborate within the submind community.

The present invention provides a number of advantages over the prior art including scalability, incremental development, and transparency. Specifically, the present invention solves many known limitations and problems in the prior art:

- The existing art does not provide a method for incremental updating, and updates of existing systems are unwieldy. Utilizing the present invention, component subminds can be updated quickly, for example as frequently as context or environmental values change.
- The existing art is supported by monolithic architectures that are not easily scaled up or down, and typically require significant cloud based computational resources for training and execution, and startup time. The present invention, using a flexible parallel network of modular submind components, is capable of adding scaleable resources as needed.
- Systems utilizing the prior art are opaque with "reductionist solutions" that obscure their utility function and training corpus, making responses unpredictable and the "reason" for a response unknowable, and/or are limited by handcrafted response systems to specified grammars. The present invention's operation is transparent, with forum interactions performed in natural language, and potentially with open source collaboratized chatbots.
- Systems utilizing the prior art are not capable of reconveying content, nor enabling applications like whole life recording, because they do not retain original training content. The present invention, using experiential recordings, is able to efficiently reconvey content as a response, for example in identical contexts or in related contexts and environments based on experience chains in other contexts and environments.
- The prior art does not provide for humans in the loop computing, collaboration, multiple goals, systems evolutions, multiple Gardnerian intelligences, cultural intelligences, nor human augmentation and personal advocates. In the present invention, forums provide protocols for one or more humans to participate in collaborative actions with one or more collaborative AIs, each with potentially different goals (or utility functions), and, as a group, able to provide multimodal responses, including conversation segments from multiple subminds. Further, utilizing the present invention during the operation of a forum, the performance of individual subminds may be considered by facilitators which may enforce protocols that enable improved performance by replacing subminds, allowing for systems evolution. In another preferred embodiment of the present invention, a hybrid of a human and an AI may participate together in a forum enabling augmentation of human participation in a forum, or advocacy and representation with a paired bot.
- In particular, a system utilizing the present invention, with a limited set of local data, may be used by a submind AI to nearly instantly reach a decision to perform a reconveyance of a previous response to a prompt, providing a quick and correct solution, whereas existing systems completing a more exhaustive solution (for example with many inputs to a NN AI) would result in a solution that is too late.

APPENDIX A

These are non-limiting example instructions to bot developers for CCAI construction and competition. Bots using this framework connect to an adaptive forums server such as KLAT, available at KLAT.COM and open source repositories including GitHub, included here by reference, and respond to user shouts. Bots will respond individually, like any other user in the conversation.

Getting Started

Running in Colab: Configured environment and implemented code can be run from Google Colab Installation: To utilize this repository for creating your own chat bots, install this package via pip and then extend the ChatBot or NeonBot class to build your own chat bot (see the Examples below). You can install this package with the following command:

pip install git+https://github.com/neongeckocom/chatbot-core

Note: It is recommended to install this to a virtual environment to avoid conflicts with package versions and command line entry points. Most IDE's (i.e., PyCharm) handle this for individual projects.

Organizing your bots: It is recommended to create a module for each of your bots. You should use subdirectories, each containing _init_.py that includes your ChatBot as well as any supporting configuration files, etc. You may also organize this as a directory of .py files that each contain a bot (these bots cannot be managed with the utilities included with this package). Below are example file structures for each of these cases.

```
my_bots
|
| --venv
| --alice
|   | --aiml
|   |   L--...
|   L-- __init__.py
| --ELIZA
|   L-- __init__.py
L--ima
    L-- __init__.py
my_bots
|
| --venv
L--my_bot.py
```

Klat.com Credentials: Bots should be able to login to klat.com; a YAML file containing credentials for each bot can be used to save usernames and passwords for each bot. Each bot module should have a key matching the module name, a username, and a password.

ALICE:
　　username: alice
　　password: AliceKlatPassword
kbot:
　　username: kbot
　　password: kBotKlatPassword Commandline Utilities: There are commandline utilities provided to test and run bots you create. The examples for these utilities assumes you have your bots in a directory named my_bots as outlined above.

debug-klat-bots: From a terminal that has sourced your virtual environment, you can run the following command to test any one of your bots:

debug-klat-bots "/path/to/my_bots"

Note: You may omit the path argument if your terminal is in the same directory as your bots.

start-klat-bots: From a terminal that has sourced your virtual environment, you can run the following command to run all of your bots:

start-klat-bots --domain chatbotsforum.org --bots "/path/to/my_bots" --credentials "/path/to/credentials.yml"

Note: Call start-klat-bots -h for detailed help explaining each of the parameters

Generating Responses

Basic Bot: Basic bots override self.ask_chatbot to generate a response. Bots have access to the shout, the user who originated the shout, and the timestamp of the shout. Any means may be used to generate and return a response via the self.propose_response method. If no response can be generated, return the input to use a random response from self.fallback_responses.

Script Bot: Bots extending the NeonBot class operate by passing user shouts to a Neon Script and returning those responses. NeonBot init takes the name of the script to run ("SCRIPT_NAME" in the example below), as well as the messagebus configuration for the NeonCore instance on which to run the script.

Testing

Basic Bot: The response generation of a bot may be tested individually before connecting it to the Klat network. This can be accomplished by passing on_server=False and then calling ask_chatbot directly. The Python examples below show how you can do this in the file containing your ChatBot.

Script Bot: A script should be tested separately from the bot before creating a NeonBot. More information about developing scripts can be found on the Neon Scripts Repository. After the script functions as expected, it can be used to extend a NeonBot.

Proctored Conversations

Proctored conversations on the Klat network are conversations where multiple subminds (bots and humans) may collaborate to respond to incoming prompts. These conversations use a Proctor to pose questions and manage the voting and selection process among the multiple subminds. The following additional methods should be implemented to fully support participating in proctored conversations. It is not explicitly required to implement all methods, but doing so is recommended.

ask_discusser: Override ask_discusser to provide some discussion of the proposed responses after all subminds have had an opportunity to respond. Discussion can be anything, but generally is an endorsement of one of the proposed responses (a bot may endorse their own response).

on_discussion: Override on_discussion to handle discussion responses from other subminds. A bot may use these responses to influence which bot/response they vote for, or possibly to affect their discussion of the next prompt.

ask_appraiser: Override ask_appraiser to select a bot to vote for (a bot may not vote for themself). Any means may be used to select a bot; options provides a dictionary of valid names to vote for and their responses.

Python Examples

Standard Bot
from chatbot_core import ChatBot, start_socket

```
import random
class MyBot(ChatBot):
    def __init_(self, socket, domain, user, password,
        on_server=True):
        super(MyBot, self)._init_(socket, domain, user,
            password)
        self.on_server=on_server
        self.last_search=None
    def ask_chatbot(self, user, shout, timestamp):
        """
        Handles an incoming shout into the current conver-
            sation
        :param user: user associated with shout
        :param shout: text shouted by user
        :param timestamp: formatted timestamp of shout
        """
        resp=f"" #Generate some response here
        if self.on_server:
            self.propose_response(resp)
        else:
            return resp
    def ask_appraiser(self, options):
        """
        Selects one of the responses to a prompt and casts a
            vote in the conversation
        :param options: proposed responses (botname:
            response)
        """
        selection=random.choice(list(options.keys( )))
        self.vote_response(selection)
    def ask_discusser(self, options):
        """
        Provides one discussion response based on the given
            options
        :param options: proposed responses (botname:
            response)
        """
        selection=list(options.keys( ))[0] #Note that this
            example doesn't match the voted choice
        self.discuss_response(f"I like {selection}.")
    def on_discussion(self, user: str, shout: str):
        """
        Handle discussion from other subminds. This may
            inform voting for the current prompt
        :param user: user associated with shout
        :param shout: shout to be considered
        """
        pass
    def on_login(self):
        """
        Do any initialization after logging in
        """
        pass
if _name_=="_main_":
    #Testing
    bot=MyBot(start_socket("2222.us", 8888), f"chatbots-
        forum.org", None, None, False)
    while True:
        try:
            utterance=input('[In]:')
            response=bot.ask_chatbot(f", utterance, f")
            print(f'[Out]: {response}')
        except Keyboard Interrupt:
            break
        except EOFError:
            break
    #Running on the forum
```

```
MyBot(start_socket("2222.us", 8888), f"chatbotsforu-
    m.org", None, None, True)
while True:
    pass
Script Bot
from chatbot_core import NeonBot
from chatbot_core import start_socket
class ScriptBot(NeonBot):
    def _init_(self, socket, domain, user, password,
            on_server=True):
        super(ScriptBot, self)._init_(socket, domain, user,
            password, on_server, "SCRIPT NAME", {"host":
            "CORE ADDR",
"port": 8181,
"ssl": False,
"route": "/core"})
        self.on_server=on_server
    def ask_appraiser(self, options):
        """"""
        Selects one of the responses to a prompt and casts a
            vote in the conversation
        :param options: proposed responses (botname:
            response)
        """"""
        selection=list(options.keys( )[0]
        self.vote_response(selection)
    def ask_discusser(self, options):
        """"""
        Provides one discussion response based on the given
            options
        :param options: proposed responses (botname:
            response)
        """"""
        selection=list(options.keys( )[0]
        self.discuss_response(f"I like {selection}.")
    def on_discussion(self, user: str, shout: str):
        """"""
        Handle discussion from other subminds. This may
            inform voting for the current prompt
        :param user: user associated with shout
        :param shout: shout to be considered
        """"""
        pass
if _name_=="_main_":
    #Testing
    bot=ScriptBot(start_socket("2222.us", 8888), f"chat-
        botsforum.org", None, None, False)
    while True:
        try:
            utterance=input('[In]:')
            response=bot.ask_chatbot(f", utterance, f")
            print(f"[Out]: {response}')
        except Keyboard Interrupt:
            break
        except EOFError:
            break
    #Running on the forum
    ScriptBot(start_socket("2222.us", 8888), f"chatbotsfo-
        rum.org", None, None, True)
    while True:
        pass
```

Helper Functions

Grammar check: In order to apply quick validation on output of function consider using grammar_check, Sample Usage:

```
from chatbot_core import grammar_check
@grammar_check
def ask_chatbot(self, user: str, shout: str, timestamp: str)
        →str:
    return shout
```

Kernel of this function made with the help of autocorrect
Find closest text string: Apply find_closest_answer to provide some known algorithms for closest text string finding, Sample Usage:

```
from chatbot_core import find_closest_answer
def ask_appraiser(self, options: dict)→str:
    closest_opinion=find_closest_answer
        (algorithm='random',sentence=self.response,
        options=options)
    for bot in options.keys( )
        if options[bot]==closest_opinion:
            return f'I really like {bot} opinion!'
    return 'I did not find any interesting answer here . . . '
```

Example Text Similarity Algorithms
Random: Picks a response by random. Best used when speed matters over result.
Bleu score: Calculates precision using n-grams. Best used when sentences have similar shape.
Levenshtein distance: Calculates precision by measuring distance between words. Best used when each word separately matters more than semantical meaning of the sentence.

INDUSTRIAL APPLICATION

The present invention applies to the computing industry, artificial intelligence, IT/IS and systems design; more specifically in all markets where automated and semi-automated conversation takes place, typically including human-computer interactions using natural spoken language that provides hands free operation and interaction. Areas of application include but are not limited to customer service, ecommerce, conversational self-help and self-healthcare, individual and group therapy, education and instruction, automated vehicle operation across multiple vehicles, expert systems, self-care, dispersed systems support, dispersed security, interactive entertainment, sales and marketing, voice interfaces, smart conversational assistants for homes and businesses, chatbots, personal assistants and advocates, incoming and outgoing conversational phone assistant, industrial and medical equipment controls, conversation processing, conversational systems design, and human and intelligence augmentation, all potentially including multimodal and polylingual/multilingual operation.

What is claimed is:

1. A system for collaborative conversational artificial intelligence participating in an application conversation having at least one counterparty participant, the system comprising:
    a forum for hosting a collaborative conversation;
    at least two subminds bi-directionally coupled to the forum, for participating and collaborating in the collaborative conversation, said subminds further including
        a basic intelligence for creating a proposed response for the application conversation,
        a natural language understander for preparing and processing proposed responses from the subminds to participate in a selection of a response in the collaborative conversation, said natural language understander further including an appraiser for appraising the proposed responses from said subminds, and a conduit bi-directionally coupled to the forum, bi-directionally coupled to the basic intelligence, and bi-directionally coupled to the natural language understander, for coordinating communication between the subminds and the forum and for coordinating communication between the basic intelligence and the natural language understander; and at least one facilitator, bi-directionally coupled to the forum and to the application conversation, for proctoring protocols in the collaborative conversation, and for reconveyance of a response selected by the subminds from and to the application conversation.

2. The system of claim 1 wherein the at least one facilitator has protocols for which proposed response from any submind coupled to the forum will be transmitted to the application conversation to avoid deadlocks and provide failsafes.

3. The system of claim 1 wherein the at least one facilitator communicates with the forum to transmit selected responses made by the at least two subminds coupled to the forum to the at least one counterparty participant via the application conversation, and to transmit conversation segments from the at least one counterparty participant to the forum.

4. The system of claim 1 wherein the at least one facilitator further includes a customizable segment modifier for reforming the response selected by the subminds by adjusting at least one of voice and sound quality including volume, speed, tone, inflection, and timbre, personality quality including friendly to abrupt, terse to loquaciousness, leading to following, and answering to questioning, language quality including dialect, accent, vocabulary, and word length, communication quality including verbal and audio, color and grayscale, sequential and parallel, and listener and talker, and background content including audio, video, haptics, olfactory and music, and other ambient and sensory environmental backgrounds or stimulation.

5. The system of claim 1 wherein the application conversation is at least one of customer service, sales, product support, natural language control of at least one of a sensor, a display and an actuator for control of an interactive system including at least one of industrial systems, vehicles, help kiosks, entertainment systems, AR/VR and other personal and business devices.

6. A system for collaborative conversational artificial intelligence for controlling an external application, the system comprising:

a forum for hosting a collaborative conversation;

at least two subminds for participating and collaborating in controlling the external application, said subminds further comprising a formulator for creating proposed control signals for the external application, an appraiser, and a conduit bi-directionally coupled to the forum and bi-directionally coupled to the formulator and to the appraiser, to send and receive proposed control signals to and from the subminds, where the appraiser appraises the proposed control signals received from the subminds, and at least one facilitator, bi-directionally coupled to the forum and to the external application, for interfacing external device communications to the forum, and for proctoring protocols in the collaborative conversation.

7. The system of claim 6 further including at least one human and at least one facilitator in the forum to provide protocols for collaboration in natural, formal and application specific languages.

8. The system of claim 6 wherein at least one of the at least two subminds further includes a discusser coupled to the appraiser for discussing proposed control signals from at least one of the subminds with at least one of the subminds.

9. A system for aggregating multiple intelligences into a unified intelligence, wherein communication between multiple subminds and facilitators uses a human comprehensible language, the system comprising:

a forum for hosting a conversation among at least two subminds;

the at least two subminds being bi-directionally coupled to the forum, for participating and collaborating in the conversation, and at least one facilitator, bi-directionally coupled to the forum, for proctoring the conversation.

10. The system of claim 9 further including a conversational forum bidirectionally coupled to at least one facilitator for hosting an external conversation between a human and the aggregated multiple intelligences.

11. The system of claim 9 further including an interface to an external device bidirectionally coupled to at least one facilitator for controlling the external device.

12. The system of claim 9 wherein part of the communication between multiple subminds and facilitators is observable to a human.

13. The system of claim 9 wherein all of the communication between multiple subminds and facilitators is observable to a human.

14. The system of claim 9 wherein the forum can be joined by at least one human.

15. The system of claim 9 wherein the forum is at least one of an adaptive forum, a protocol, a system of communication, and a medium for combining, interweaving, and sharing conversation segments.

16. The system of claim 9 wherein each of the subminds coupled to the forum is one of a human, an AI, and a hybrid human and AI.

17. The system of claim 9 wherein at least one facilitator includes mechanisms for inclusion, exclusion, invitation and removal of subminds and facilitators from the forum.

18. The system of claim 9 wherein at least one facilitator includes mechanisms for accessing libraries of subminds and facilitators for inclusion in a forum.

19. The system of claim 9 wherein at least one submind references another forum having at least two subminds and a facilitator.

20. The system of claim 9 wherein the forum is referenced in a network of forums.

21. The system of claim 9 wherein the forum is recursively referenced in a network of forums.

22. The system of claim 9 wherein the at least two subminds are configured as a connected graph of subminds, connected to each other and to the forum.

23. The system of claim 9 wherein at least one of the at least two subminds bi-directionally coupled to the forum retains a history of past performance that is used by at least one of the other bi-directionally coupled subminds to develop reputation and experience ratings for at least one of the bi-directionally coupled subminds.

24. The system of claim 9 wherein the at least two subminds include basic intelligences that are trained on different data corpii.

25. The system of claim 9 wherein the at least two subminds include basic intelligences that are trained on the same data corpus.

26. The system of claim 9 wherein at least one of the at least two subminds includes a basic intelligence with at least one inferential response mechanism including neural networks and Markov chains.

27. The system of claim 9 wherein the at least two subminds include a basic intelligence that is a non-inferential response mechanism including experience recording, experience chains and experiential memory systems.

28. The system of claim 9 wherein the at least two subminds include a basic intelligence having a response mechanism that provides a reconveyance of a segment of a prior conversation.

29. The system of claim 9 wherein the at least two subminds are added to, and removed from, the conversation by at least one facilitator based on contextual conversation direction including content references, change in topic, and addition of counter parties.

30. The system of claim 9 wherein an instance of the system of claim 9 performs the functions of at least one of the at least two subminds.

31. The system of claim 9 wherein the at least two subminds are members of a healthcare team that includes at least one of an AI nurse, an AI doctor, and an AI technician.

32. The system of claim 9 wherein the at least one facilitator requires all subminds coupled to the forum to disclose their respective codebase to all other subminds coupled to the forum to prevent collusion between subminds.

33. The system of claim 9 wherein the forum maintains a human comprehensible internal conversation transcript that logs all elements of the communication between the multiple subminds and facilitators.

34. The system of claim 9 wherein the at least one facilitator provides support and data content and is prohibited from participating in decision making between all subminds coupled to the forum.

35. The system of claim 9 wherein the at least one facilitator maintains and enforces rules governing communication between all subminds bi-directionally coupled to the forum, said rules including:
managing turn-taking between the at least two bi-directionally coupled subminds,
enforcing deadlines and time limits for each bi-directionally coupled submind to respond, and
enforcing decision-making rules on each bi-directionally coupled submind.

36. The system of claim 9 wherein at least one facilitator functions as a reproducing facilitator that creates at least one new evolving submind coupled to the forum that has variations in basic intelligence based on AI methods, training data, and parameters that influence how the at least one new evolving submind behaves.

37. The system of claim 9 wherein at least one facilitator functions as a generator facilitator that generates revenue from opportunities including advertising, therapy sessions, content, and personal user services.

38. The system of claim 9 wherein the at least one facilitator further includes customizable control of how a response to the conversation is presented, including control of at least one of
voice and sound quality including volume, speed, tone, inflection, and timbre,
personality quality including friendly to abrupt, terse to loquaciousness, leading to following, and answering to questioning,
language quality including dialect, accent, vocabulary, and word length, and
communication quality including verbal and audio, color and grayscale, sequential and parallel, and listener and talker.

39. The system of claim 38 wherein the customizable control of how a response to the conversation is presented is controlled by a human user via at least one of:
an interactive slider;
an option selector;
a voice command via a microphone;
an example demonstrated by one of a human, an AI, and a hybrid human and AI user; and
a repeating of a prior user interaction.

40. The system of claim 9 wherein a submind includes at least one of the at least two subminds further includes:
a basic intelligence for creating a proposed response in human comprehensible language for the conversation,
a natural language understander for processing proposed responses received from other subminds coupled to the forum, and
a conduit bi-directionally coupled to the forum and bi-directionally coupled to the basic intelligence and to the natural language understander, for coordinating communication between the at least one of the at least two subminds and the forum and for coordinating communication between the basic intelligence and the natural language understander.

41. The system of claim 40 wherein the natural language understander further includes an appraiser for appraising proposed responses from at least one of the at least two subminds coupled to the forum.

42. The system of claim 41 wherein the natural language understander further includes a discusser coupled to the appraiser for discussing said proposed responses from at least one of the at least two subminds coupled to the forum with at least one of the at least two subminds coupled to the forum.

43. The system of claim 42 wherein the discusser further includes a negotiator for negotiating with at least one of the at least two subminds coupled to the forum.

44. The system of claim 40 wherein the proposed response in a human comprehensible language is a compound proposed response of multiple modalities.

45. The system of claim 40 wherein the proposed response in a human comprehensible language is a compound proposed response from more than one submind.

46. The system of claim 40 wherein the basic intelligence and the natural language understander further include independent bidirectional conduits connected to the forum.

47. The system of claim 40 wherein the basic intelligence includes an extant chatbot that is implemented and accessed by the at least one of the at least two subminds via at least one of
direct software integration,
hardware integration,
cloud APT hosting,
interface shell or wrapper,
object-oriented encapsulation scheme,
silicon integration,
biological integration,
analog integration, digital and quantum substrates,
neural net training, and
artificial evolution.

48. The system of claim 40 wherein the natural language understander shares code and data with the basic intelligence component of the at least one of the at least two subminds.

49. The system of claim 40 wherein the conduit further includes storage for a data repository and for sharing data across components within the at least one of the at least two subminds.

50. The system of claim 40 wherein the conduit further includes a relayer for relaying data to the basic intelligence and to the natural language understander, said data including information about other subminds coupled to the forum, where said information includes
- assessment of trustworthiness of any of the other subminds coupled to the forum,
- apparent and projected forum tenure of any of the other subminds coupled to the forum, and
- codebase contents and summaries of any of the other subminds coupled to the forum.

51. The system of claim 40 wherein the at least one facilitator communicates convenience data including historical, contextual and environmental data to the at least one of the at least two subminds, said convenience data further including records of response selections made in each round of the conversation.

52. A method for enabling a first existing chatbot to collaborate with a second existing chatbot, each chatbot having a basic intelligence, comprising:
- proctoring protocols that integrate a conduit capable of interfacing a collaborative conversational forum with input and output of the first existing chatbot, and
- integrating a natural language understanding component with the first existing chatbot that includes appraising of proposed responses from the second existing chatbot.

53. A method for interfacing a collaboratized chatbot having a basic intelligence into a unified intelligence, comprising:
- accessing a collaborative conversation with a submind, wherein a forum is coupled to at least one other submind;
- generating a proposed response to a collaborative conversation by the basic intelligence using proctored protocols;
- transmitting the proposed response to the forum,
- receiving proposed responses from the at least one other submind coupled to the forum;
- appraising the proposed responses from the at least one other submind coupled to the forum; and
- using a result of proposed response appraisals to participate in forum decision-making.

* * * * *